Nov. 29, 1932.                F. J. SPRAGUE                1,889,724
            METHOD OF AND APPARATUS FOR CONTROL OF TRAIN MOVEMENTS
                    Original Filed Aug. 7, 1919    28 Sheets-Sheet 1
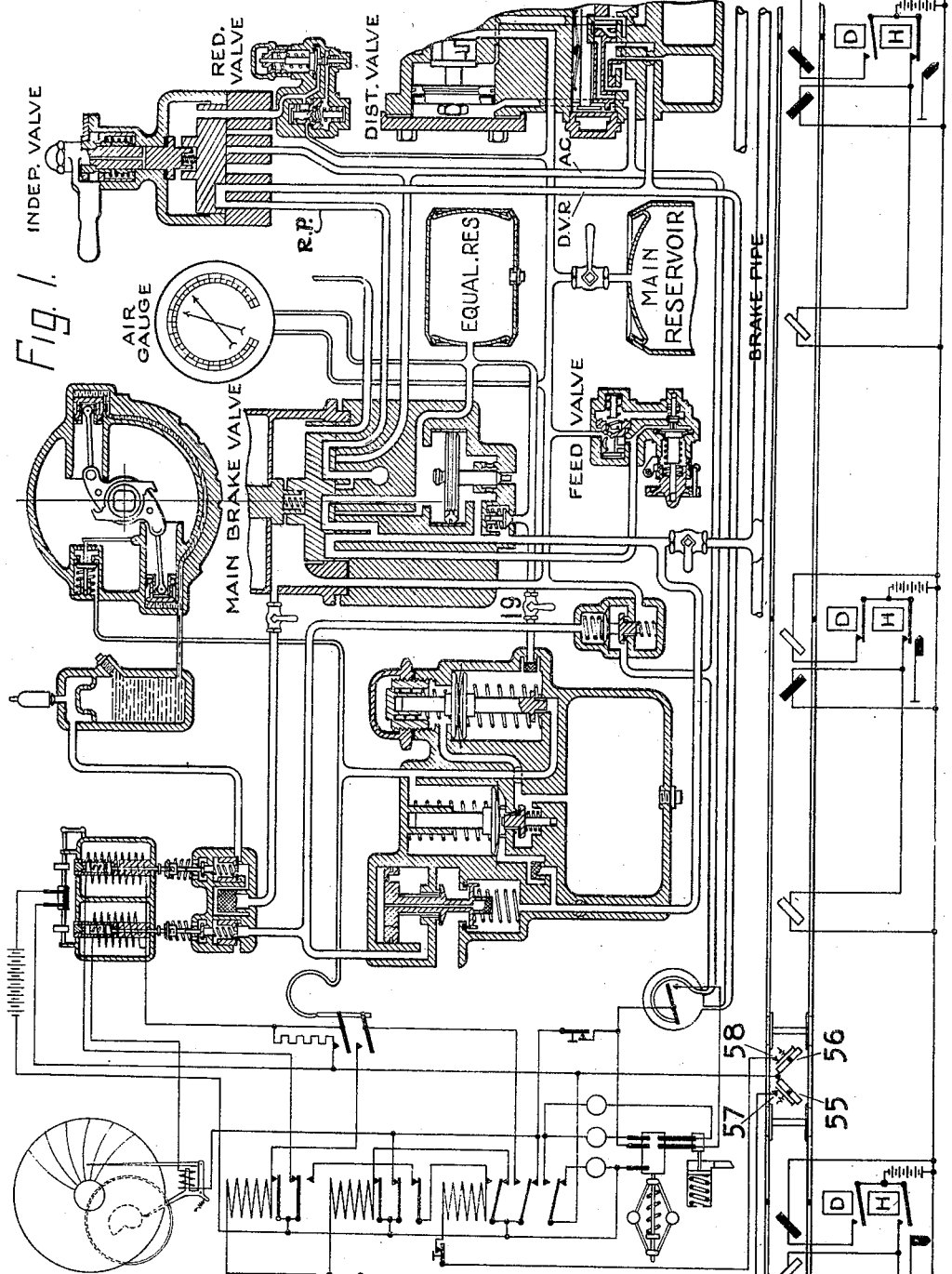
WITNESSES
INVENTOR
BY
ATTORNEYS Nov. 29, 1932.  F. J. SPRAGUE  1,889,724
METHOD OF AND APPARATUS FOR CONTROL OF TRAIN MOVEMENTS
Original Filed Aug. 7, 1919  28 Sheets-Sheet 2
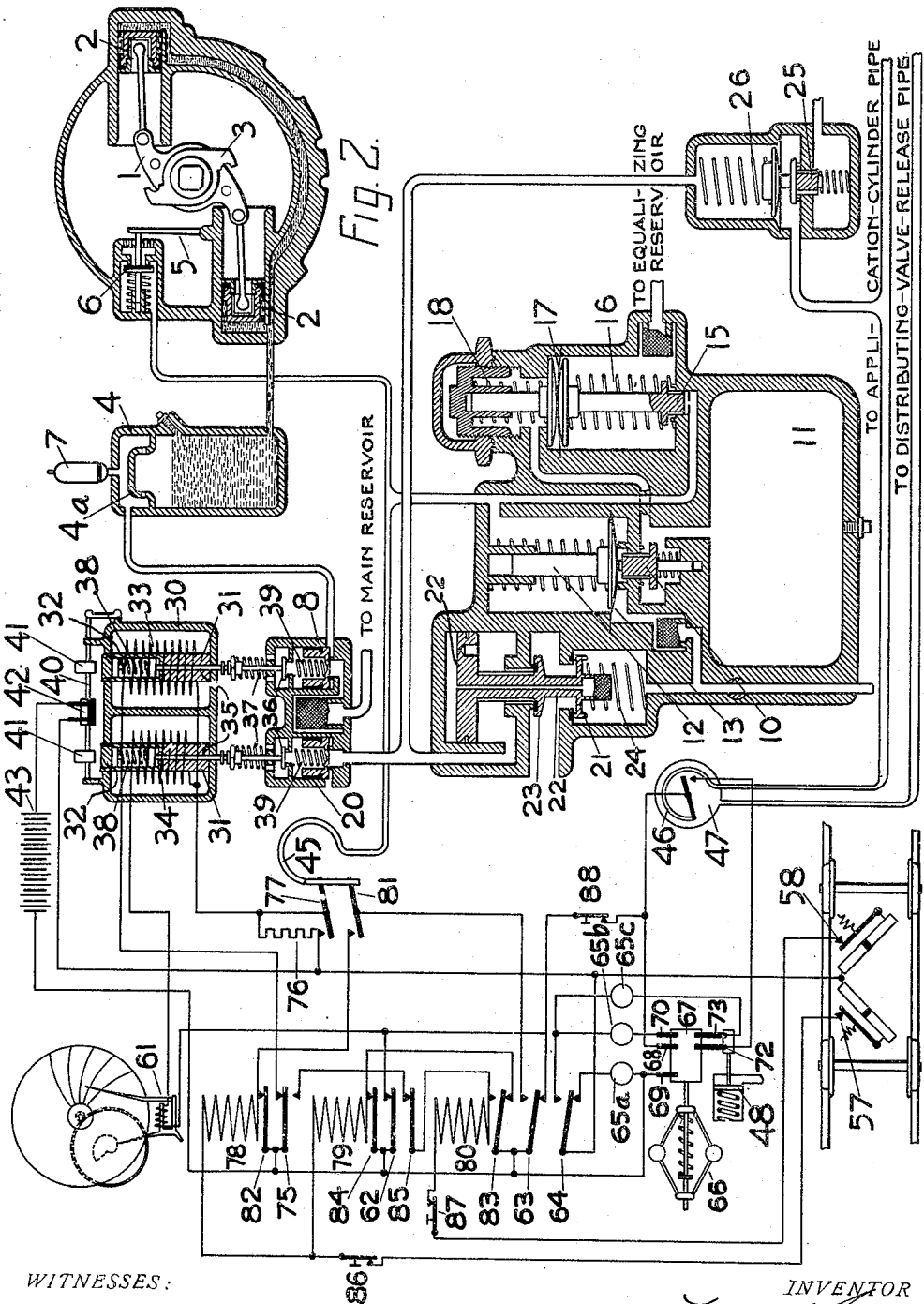

Nov. 29, 1932.  F. J. SPRAGUE  1,889,724
METHOD OF AND APPARATUS FOR CONTROL OF TRAIN MOVEMENTS
Original Filed Aug. 7, 1919   28 Sheets-Sheet 3

WITNESSES:

INVENTOR
BY
ATTORNEYS

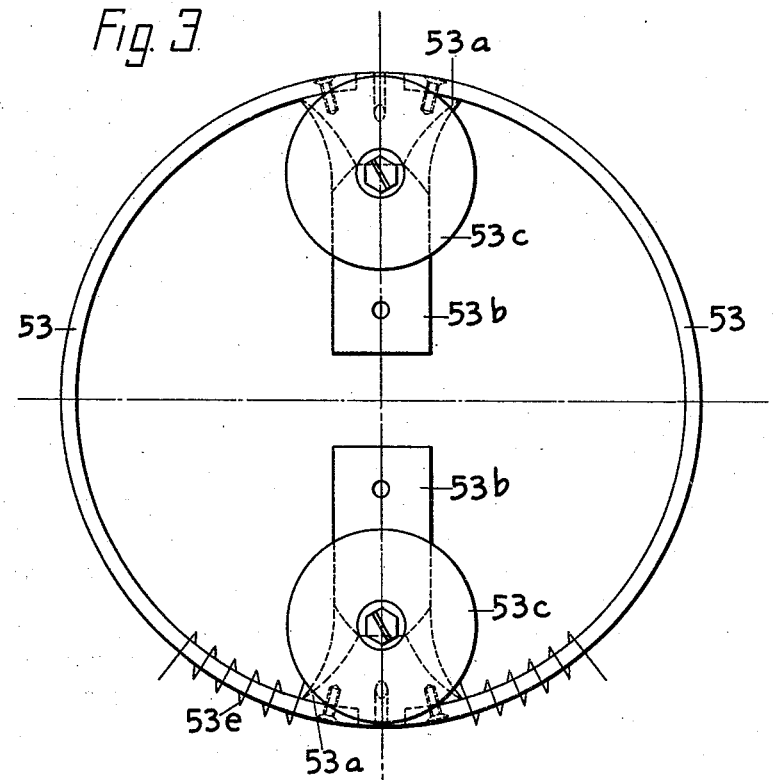
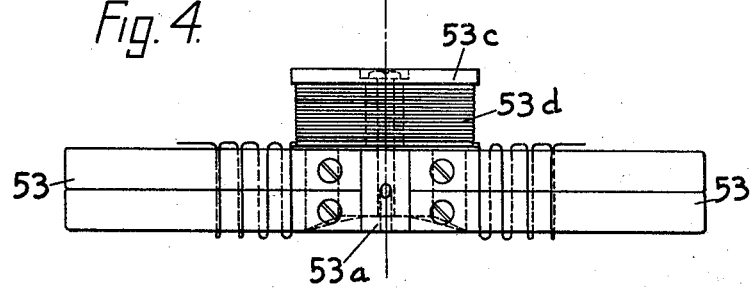

Nov. 29, 1932.  F. J. SPRAGUE  1,889,724
METHOD OF AND APPARATUS FOR CONTROL OF TRAIN MOVEMENTS
Original Filed Aug. 7, 1919  28 Sheets-Sheet 5
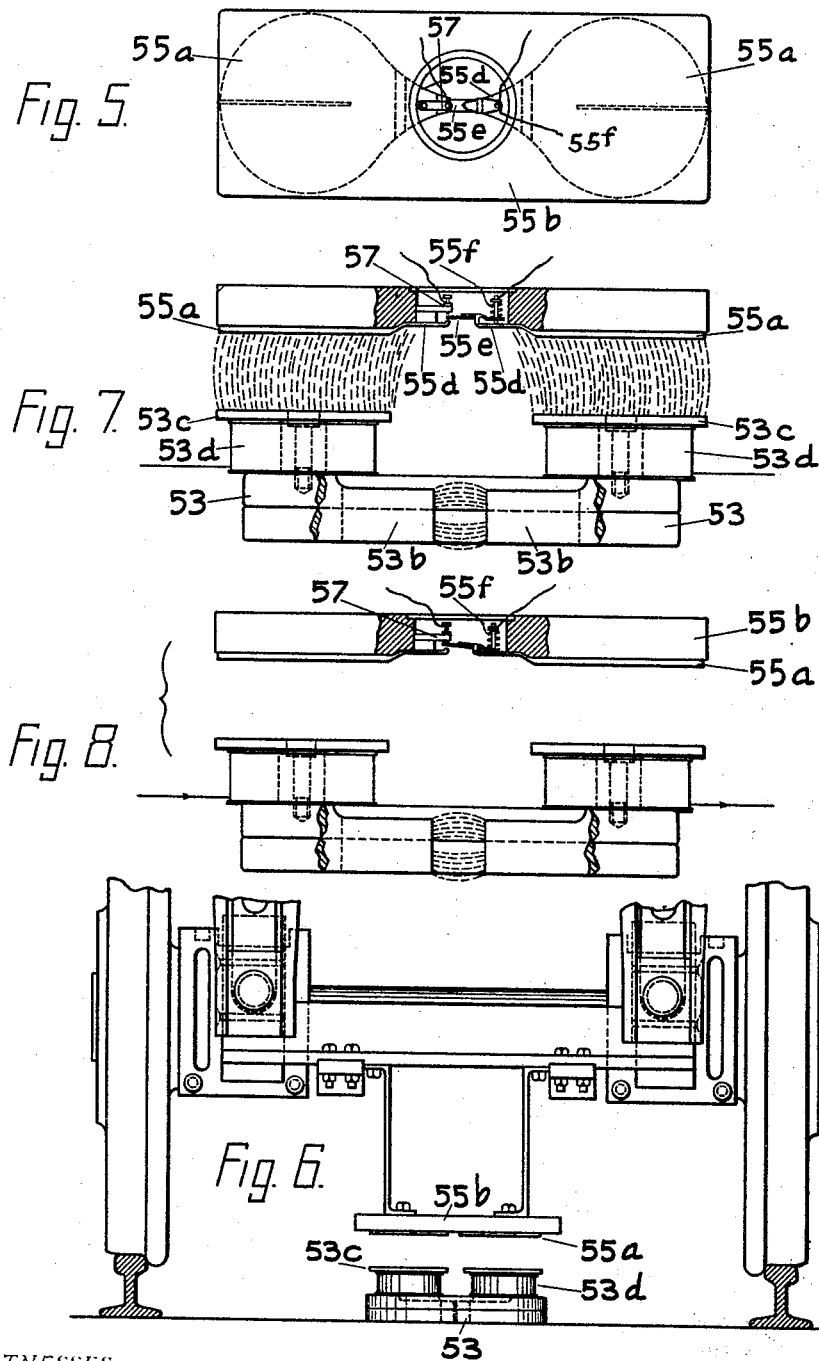

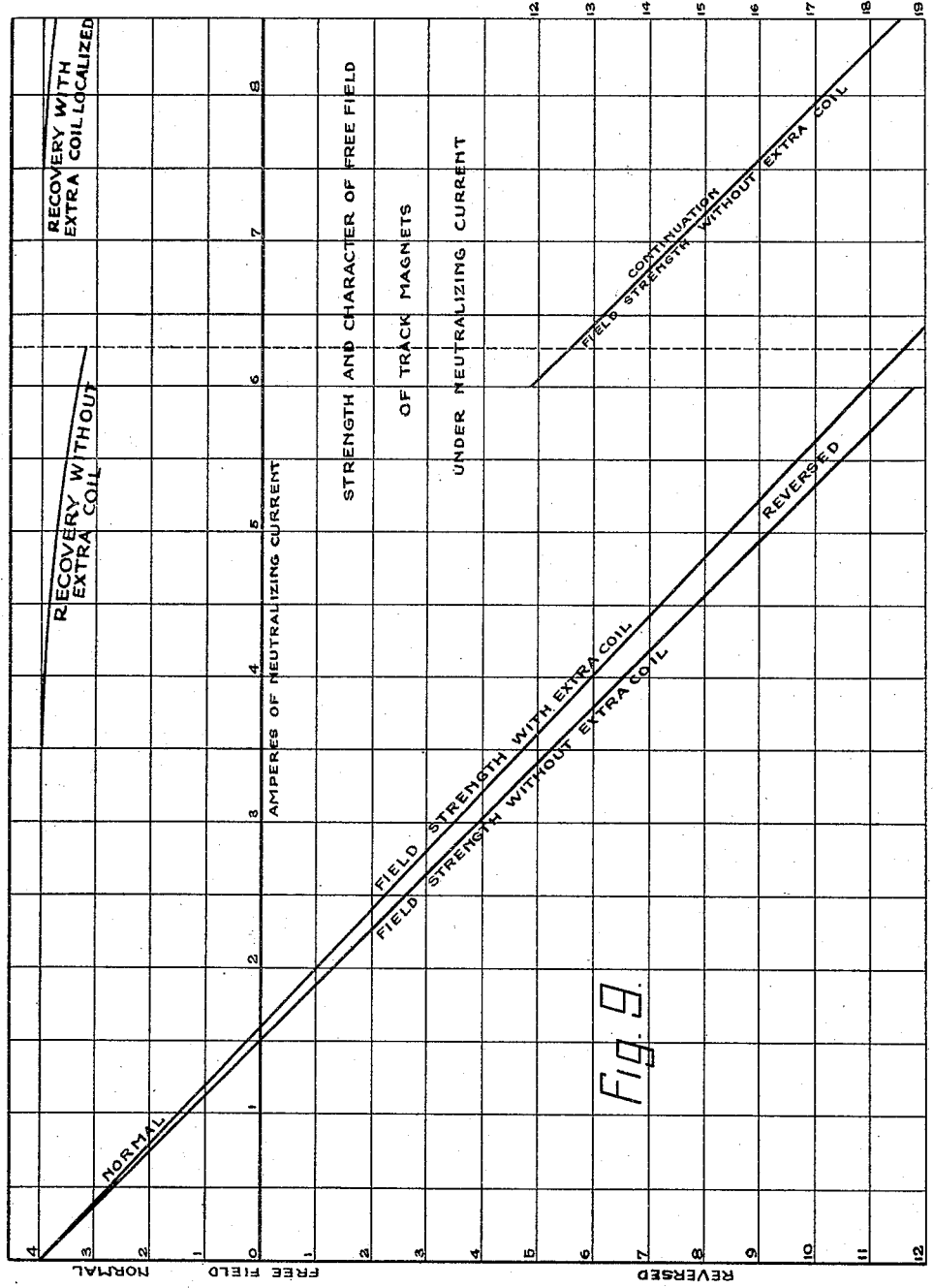

Nov. 29, 1932.   F. J. SPRAGUE   1,889,724
METHOD OF AND APPARATUS FOR CONTROL OF TRAIN MOVEMENTS
Original Filed Aug. 7, 1919   28 Sheets-Sheet 7
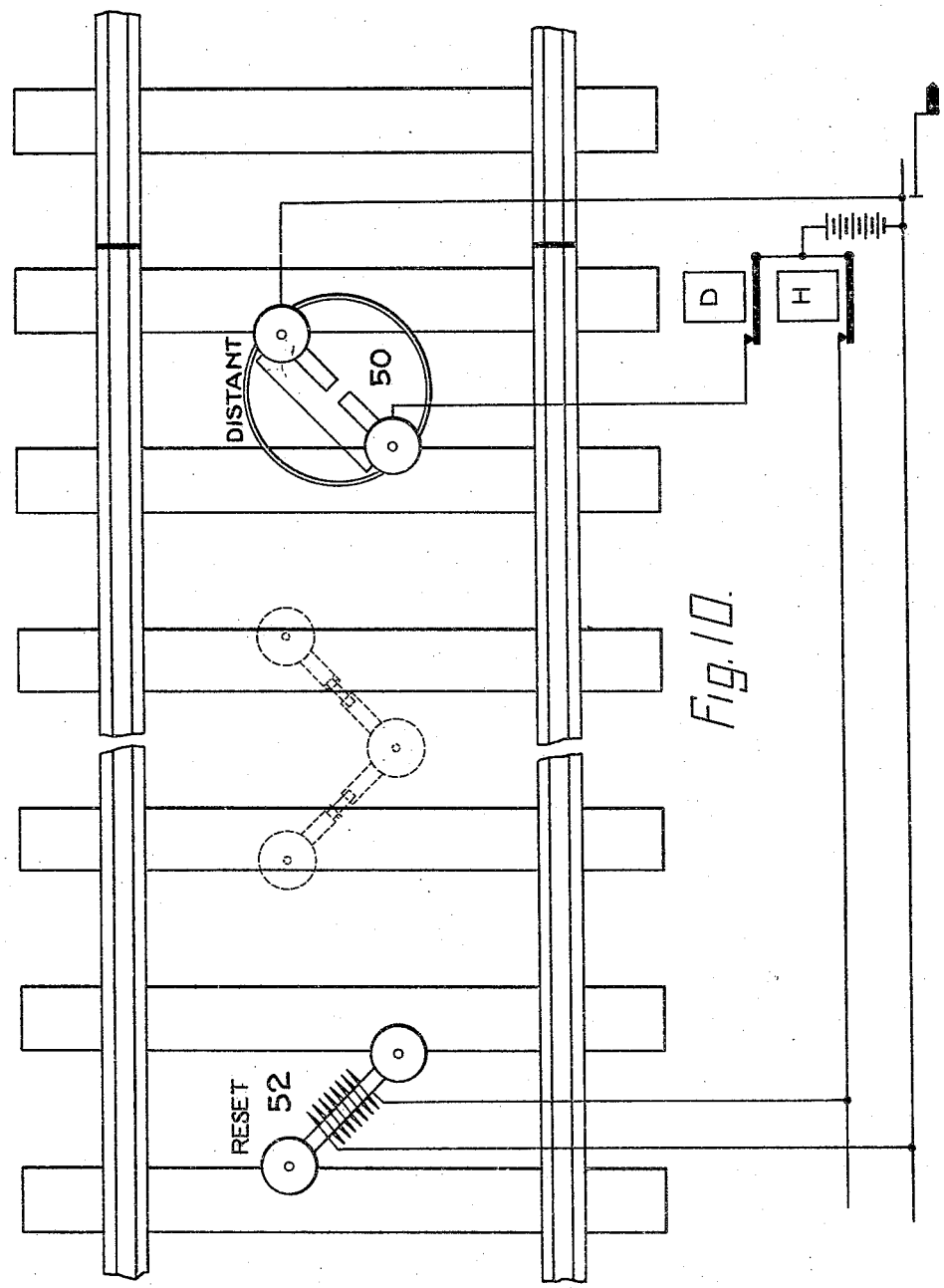

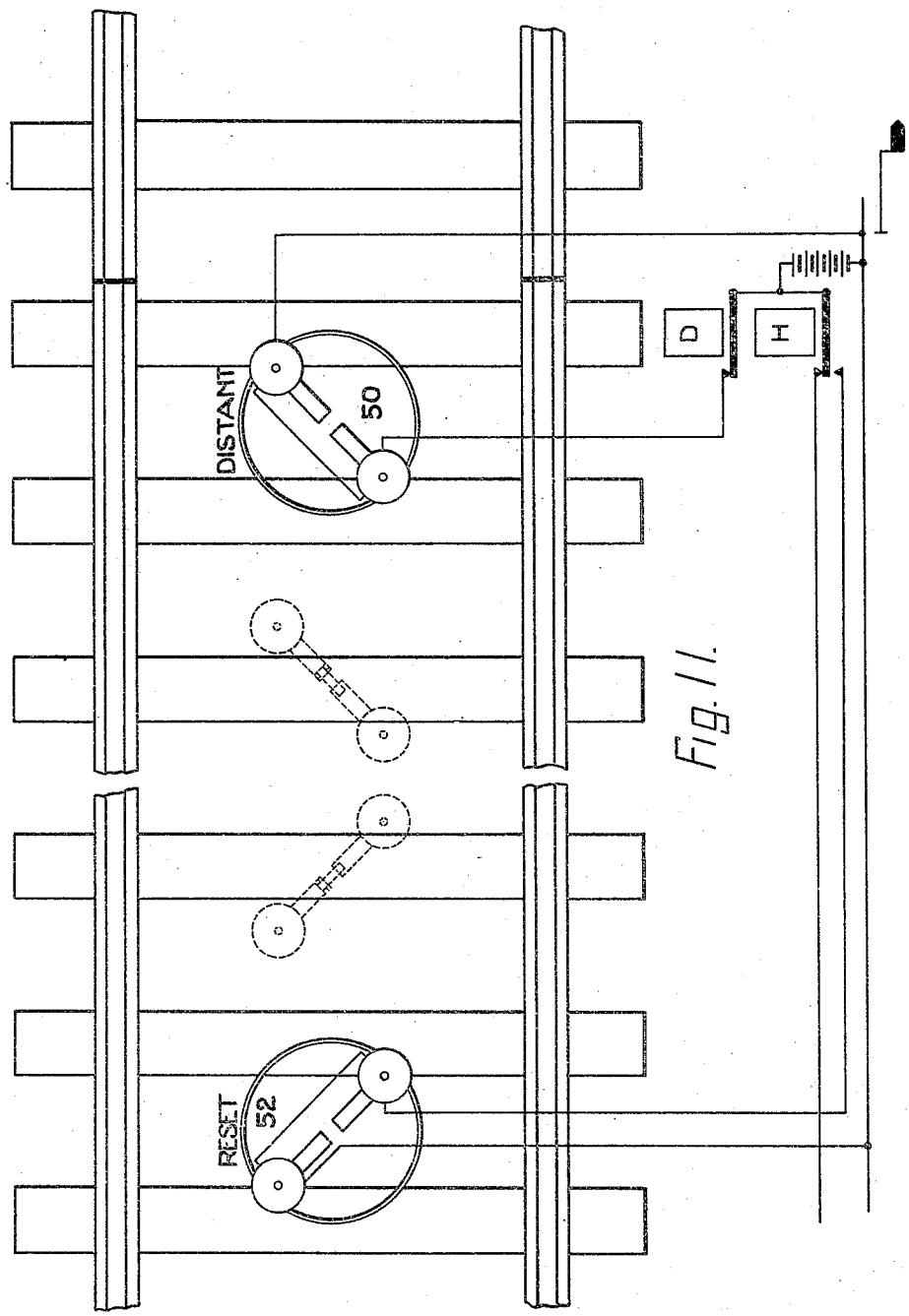

Nov. 29, 1932.  F. J. SPRAGUE  1,889,724
METHOD OF AND APPARATUS FOR CONTROL OF TRAIN MOVEMENTS
Original Filed Aug. 7, 1919  28 Sheets-Sheet 9
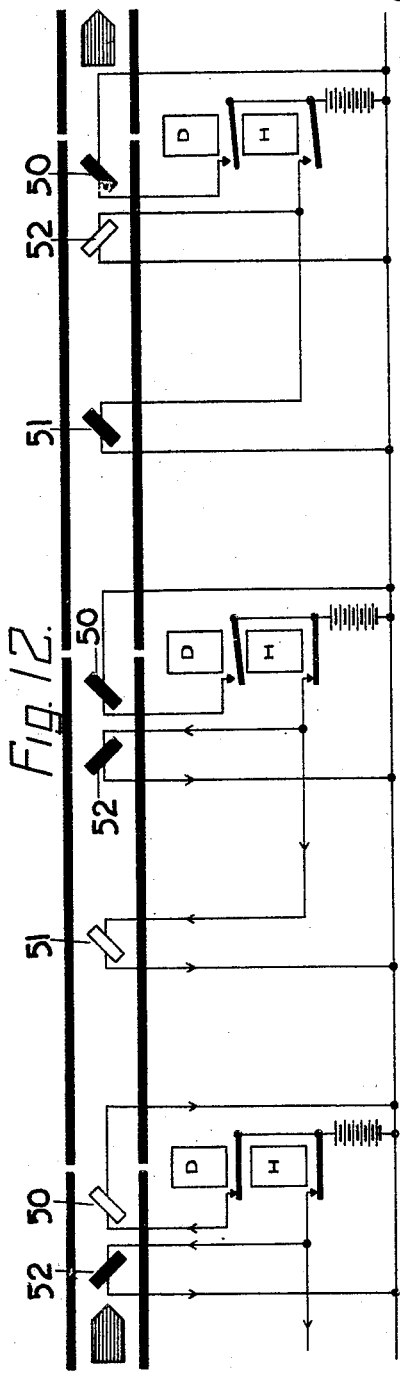
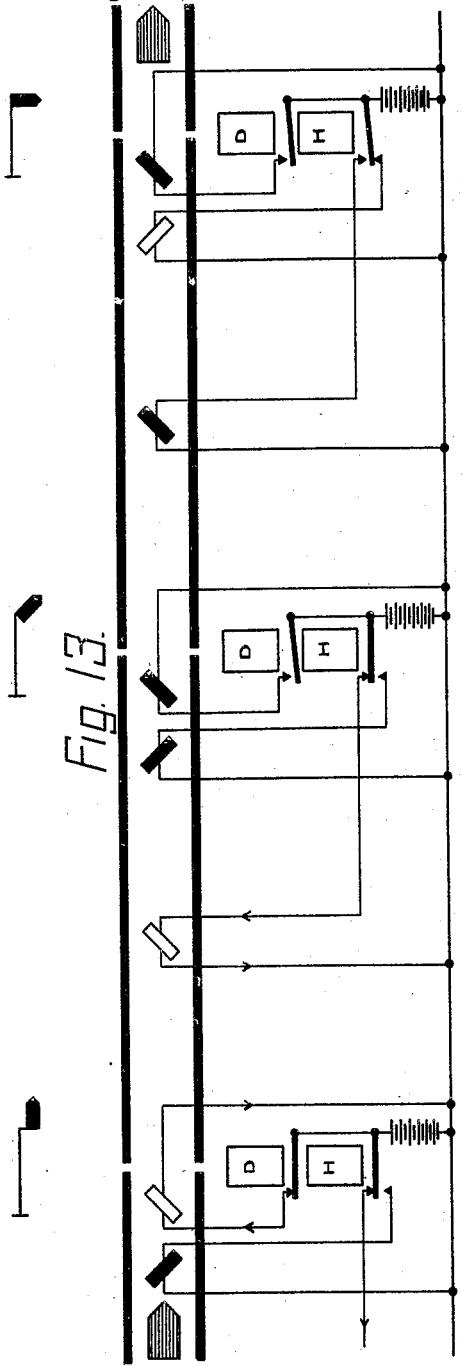
WITNESSES:
INVENTOR
BY
ATTORNEYS Nov. 29, 1932.   F. J. SPRAGUE   1,889,724
METHOD OF AND APPARATUS FOR CONTROL OF TRAIN MOVEMENTS
Original Filed Aug. 7, 1919   28 Sheets-Sheet 10

Nov. 29, 1932.  F. J. SPRAGUE  1,889,724
METHOD OF AND APPARATUS FOR CONTROL OF TRAIN MOVEMENTS
Original Filed Aug. 7, 1919  28 Sheets-Sheet 11
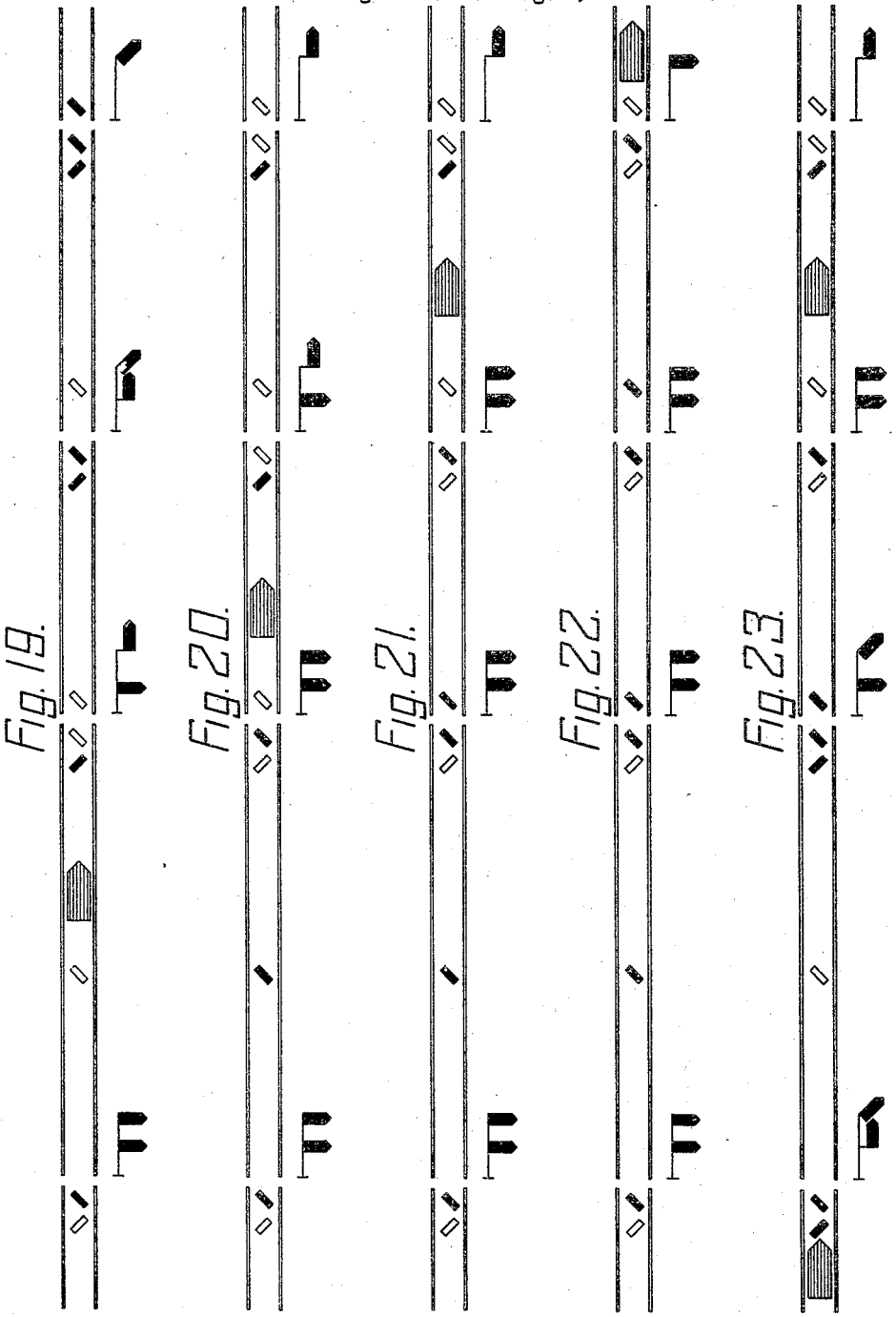

Nov. 29, 1932.   F. J. SPRAGUE   1,889,724
METHOD OF AND APPARATUS FOR CONTROL OF TRAIN MOVEMENTS
Original Filed Aug. 7, 1919   28 Sheets-Sheet 12
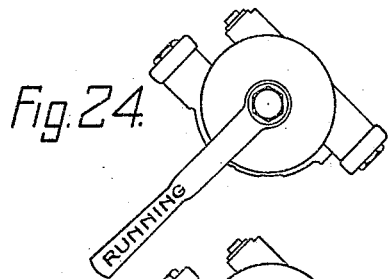  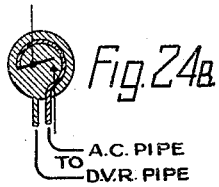
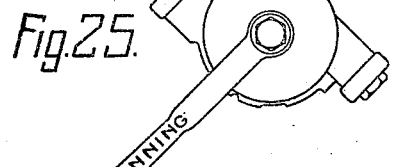  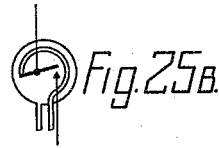
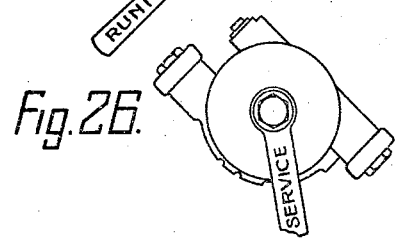  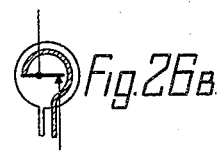
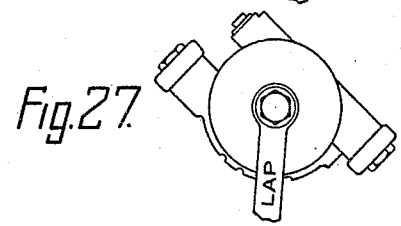  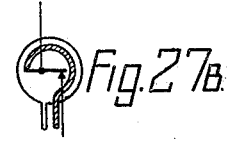
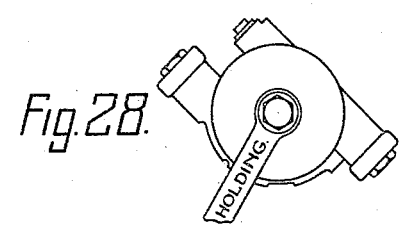  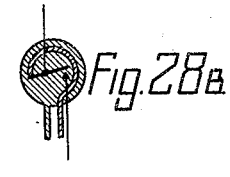
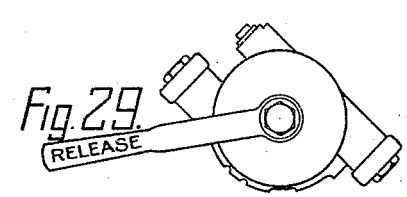  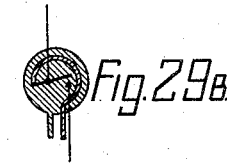

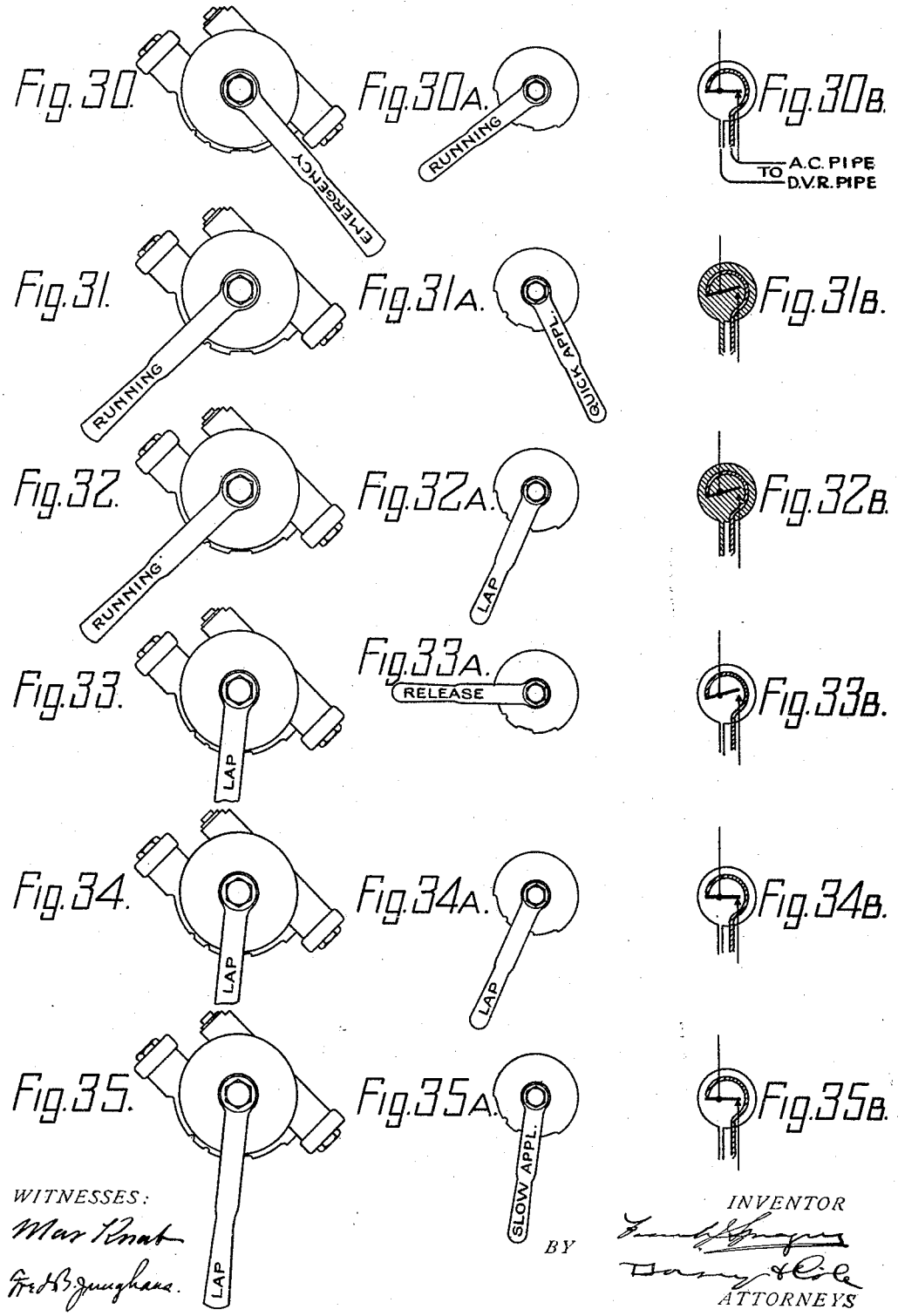

Nov. 29, 1932.  F. J. SPRAGUE  1,889,724
METHOD OF AND APPARATUS FOR CONTROL OF TRAIN MOVEMENTS
Original Filed Aug. 7, 1919   28 Sheets-Sheet 14
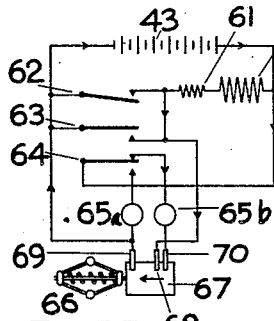
Fig.36.
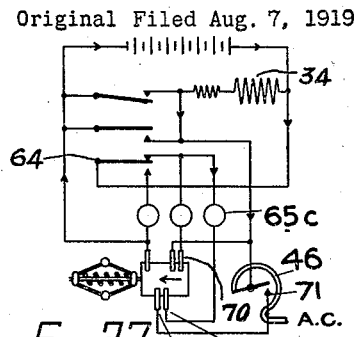
Fig.37.
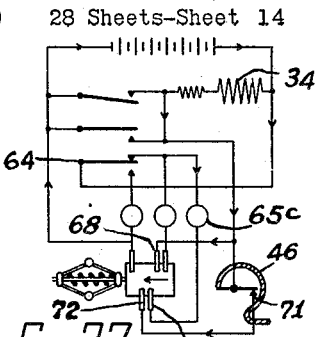
Fig.37A.
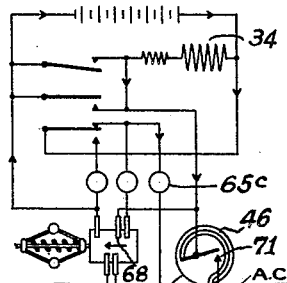
Fig.38.
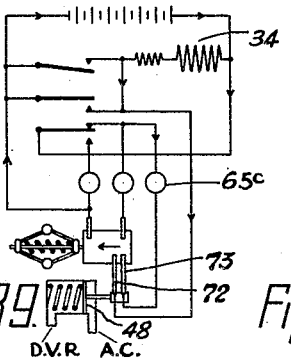
Fig.39.
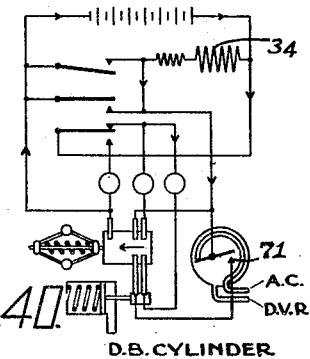
Fig.40.
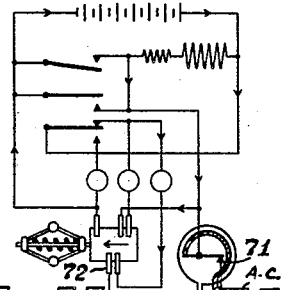
Fig.38A.
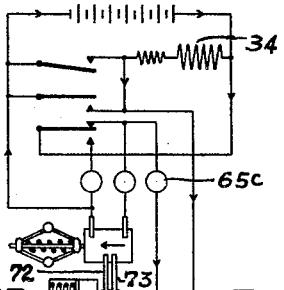
Fig.39A.
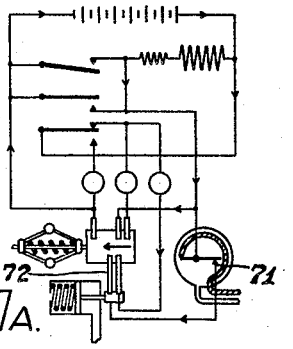
Fig.40A.
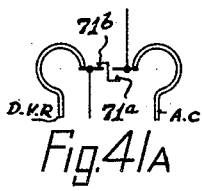
Fig.41A
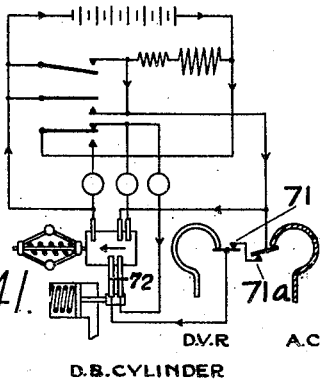
Fig.41.
Fig.41B
WITNESSES:
INVENTOR
BY
ATTORNEYS

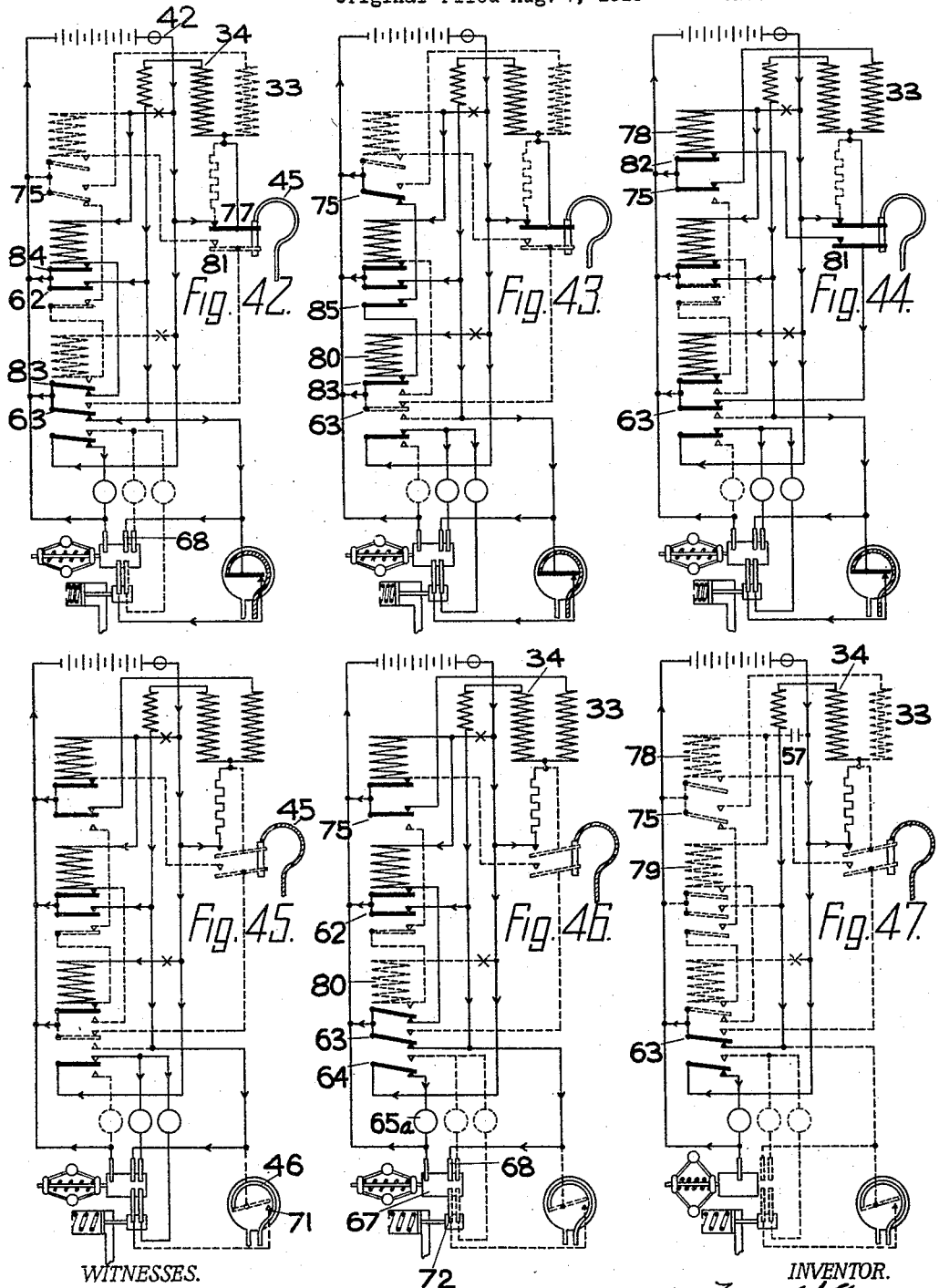

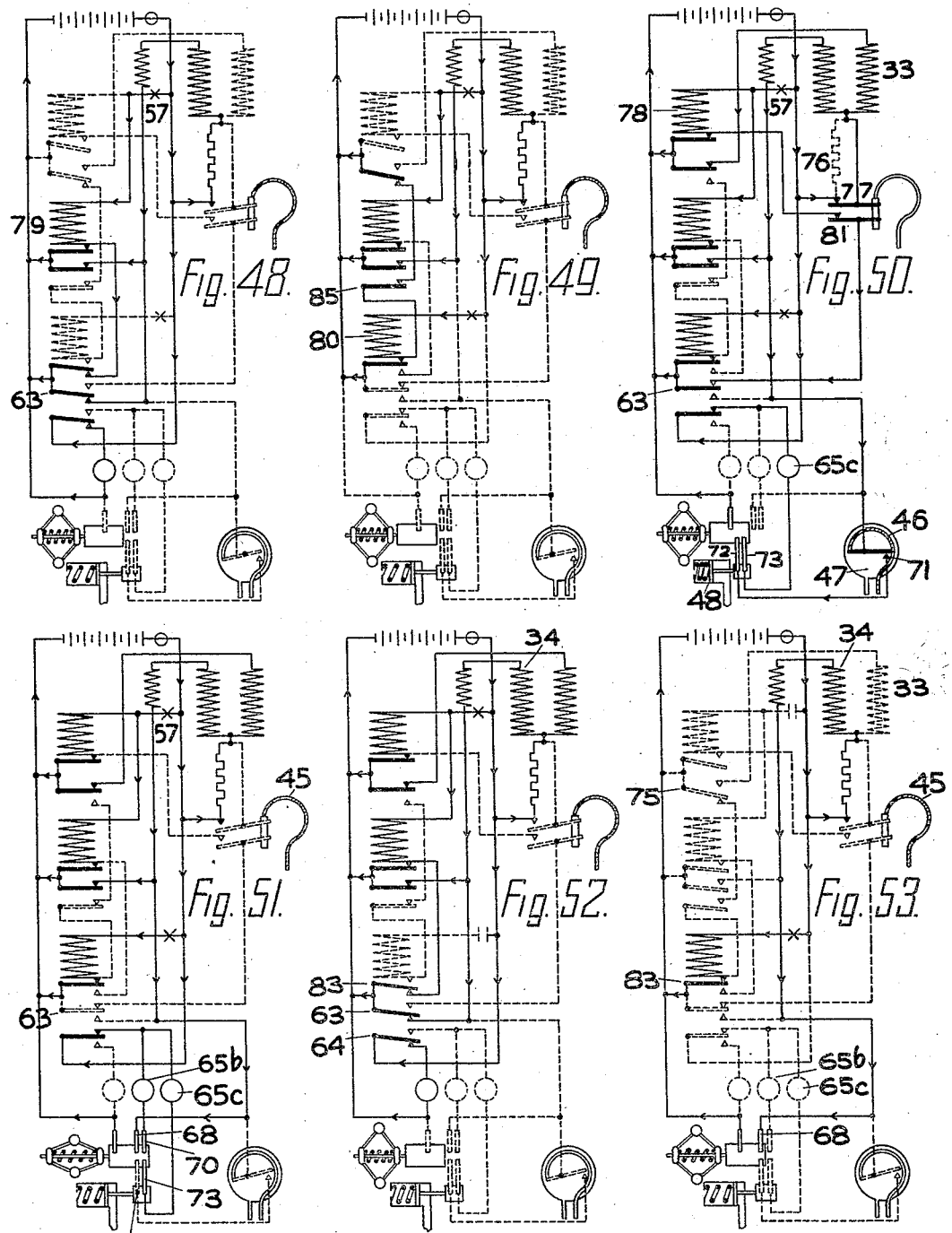

Nov. 29, 1932.   F. J. SPRAGUE   1,889,724
METHOD OF AND APPARATUS FOR CONTROL OF TRAIN MOVEMENTS
Original Filed Aug. 7, 1919   28 Sheets-Sheet 17
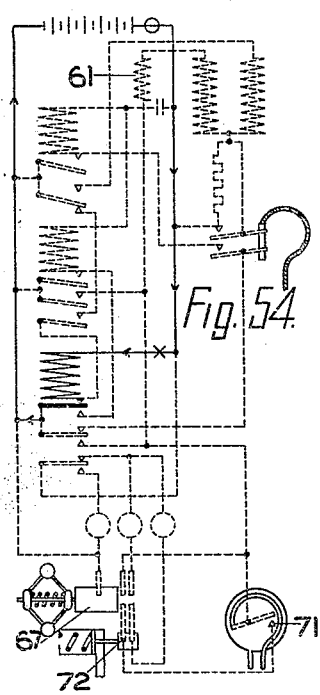
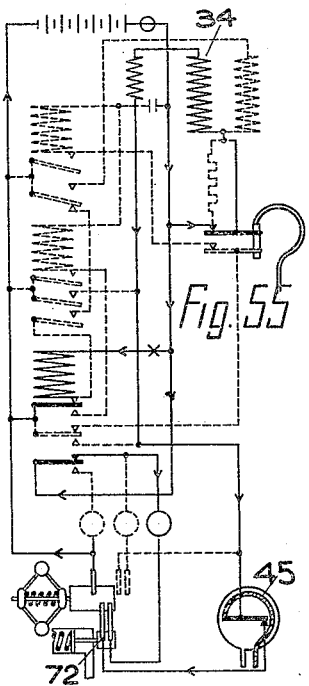
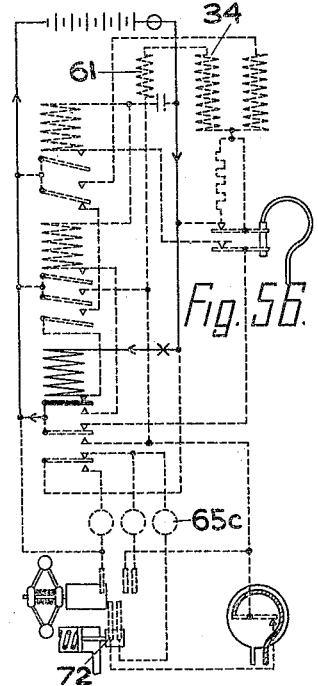
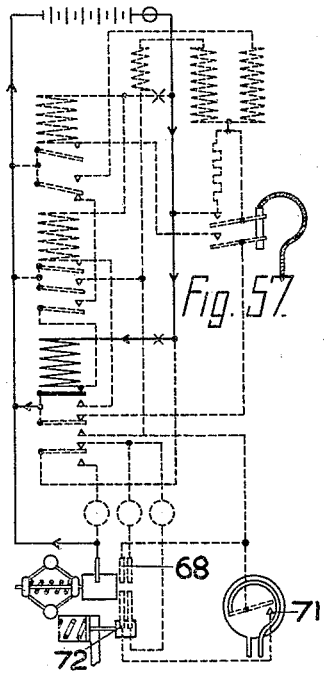
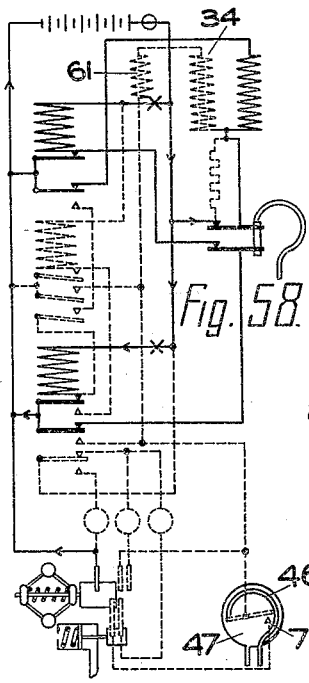
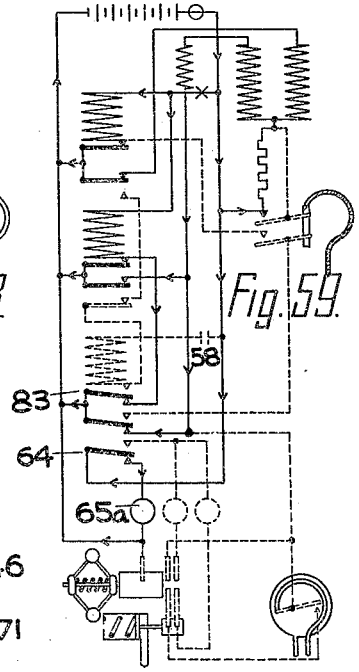

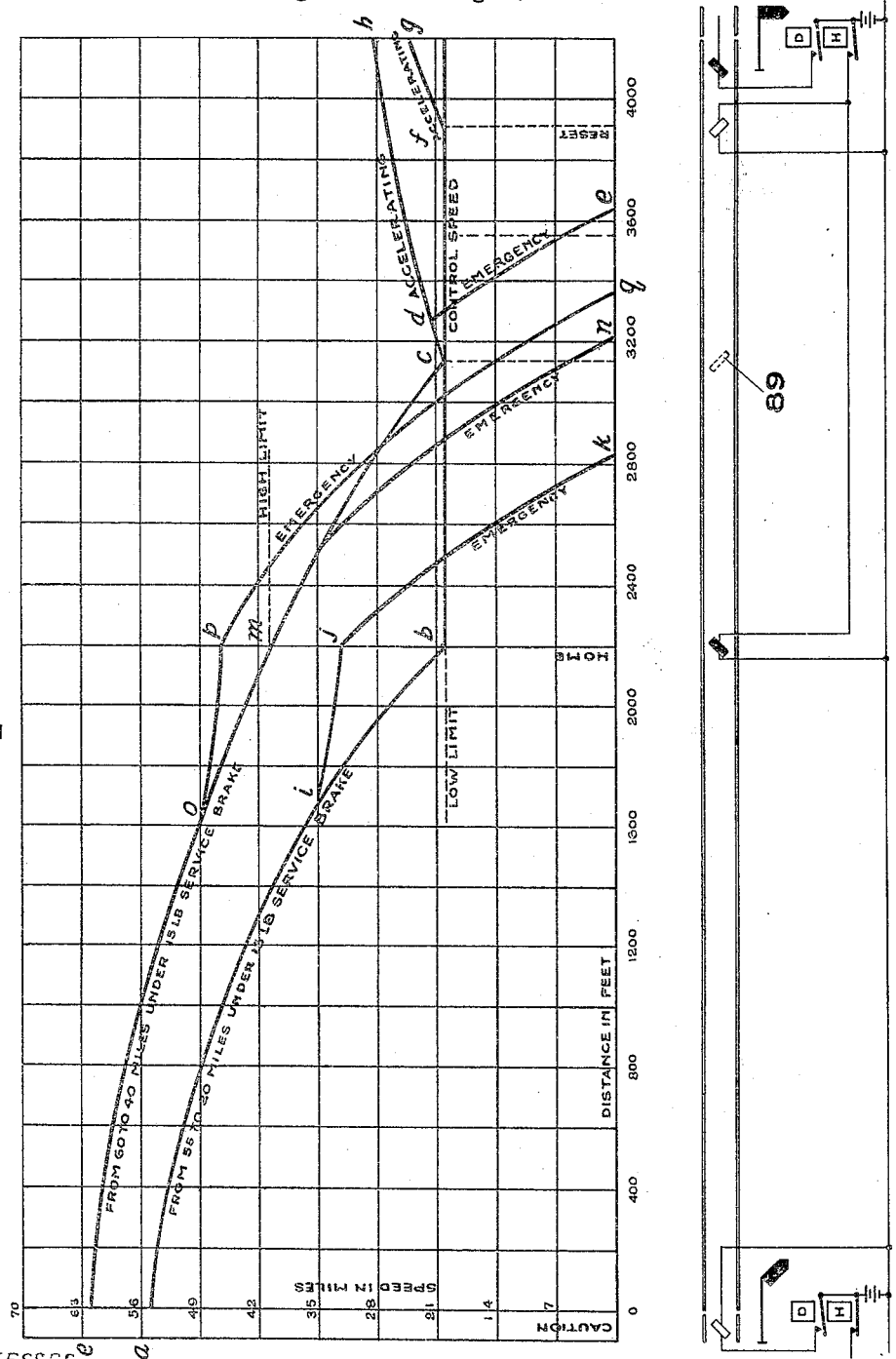

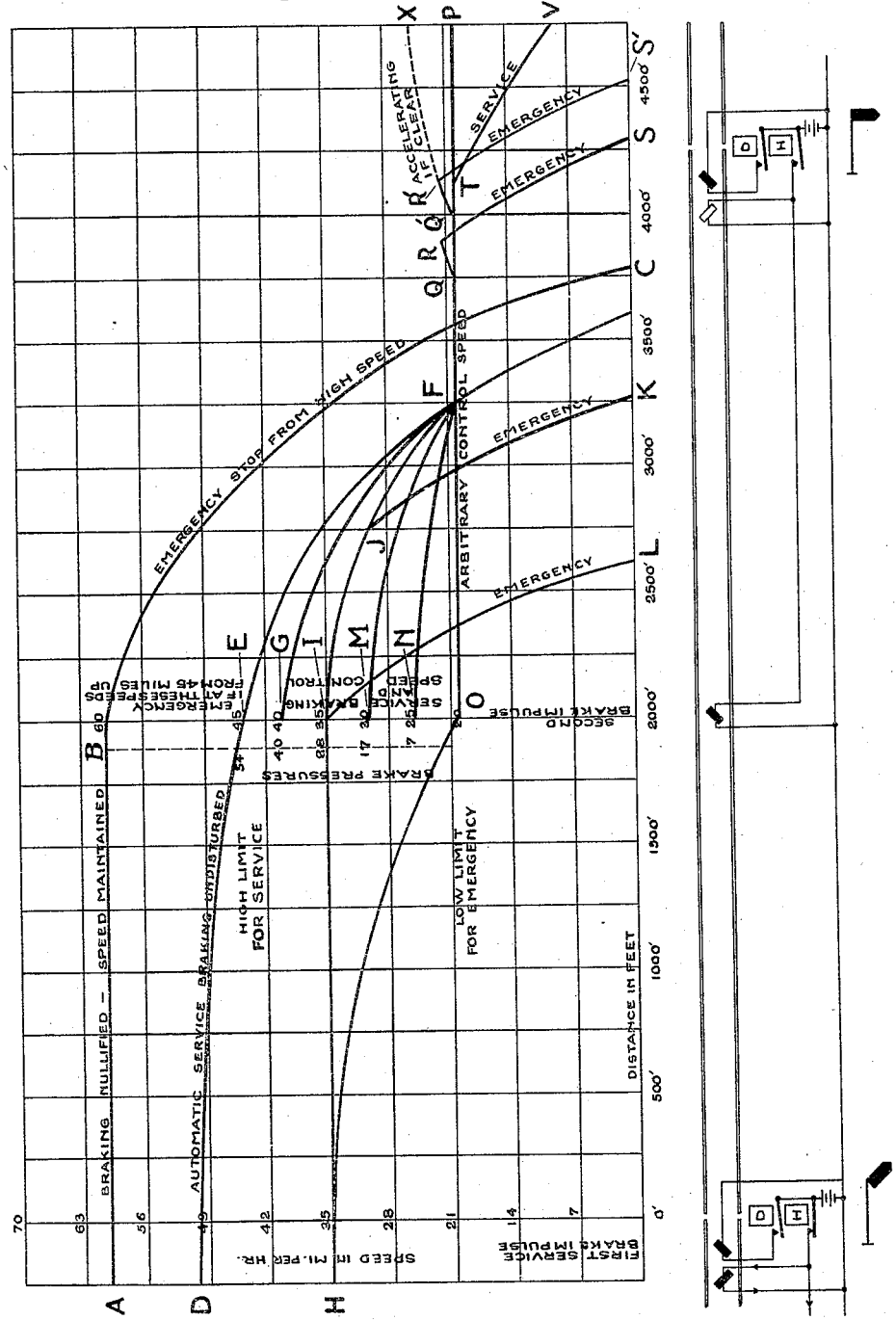

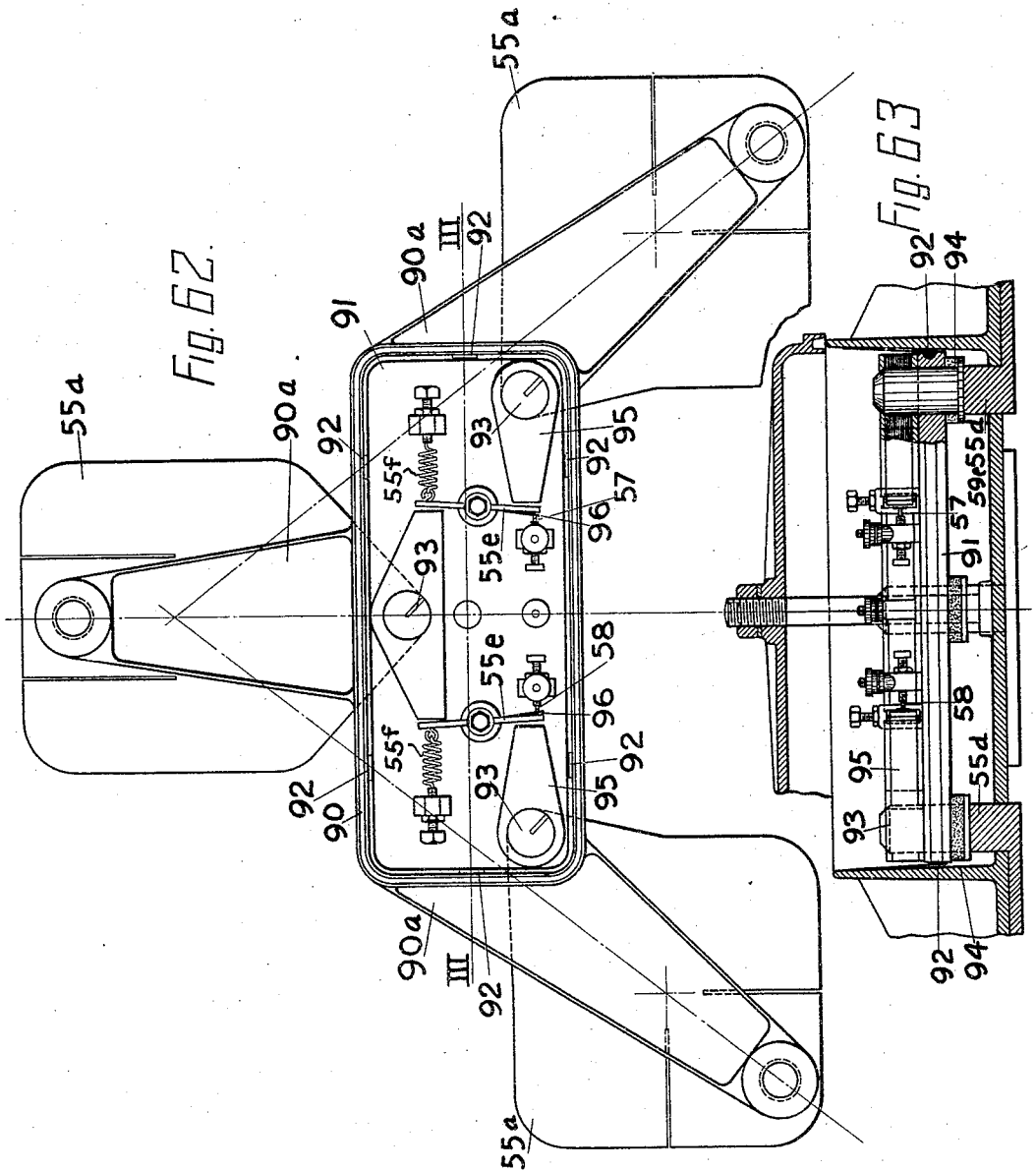

Nov. 29, 1932.   F. J. SPRAGUE   1,889,724
METHOD OF AND APPARATUS FOR CONTROL OF TRAIN MOVEMENTS
Original Filed Aug. 7, 1919   28 Sheets-Sheet 21
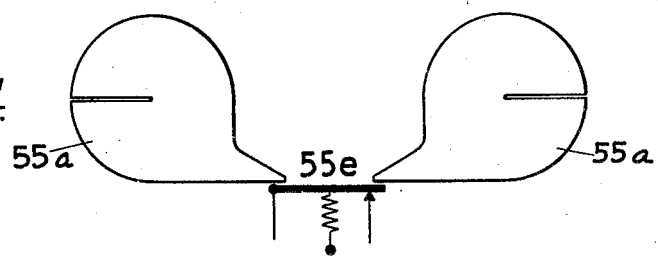
Fig. 64.
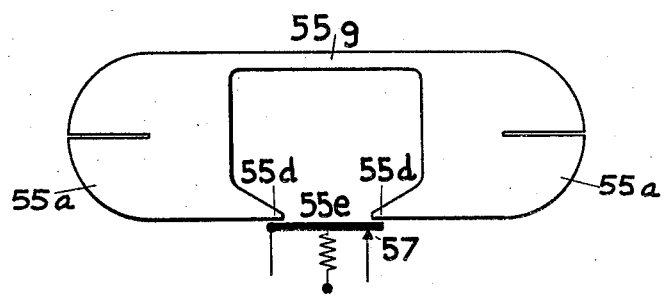
Fig. 65.
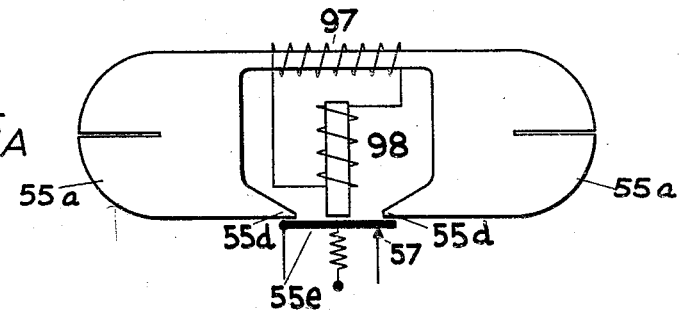
Fig. 65A.
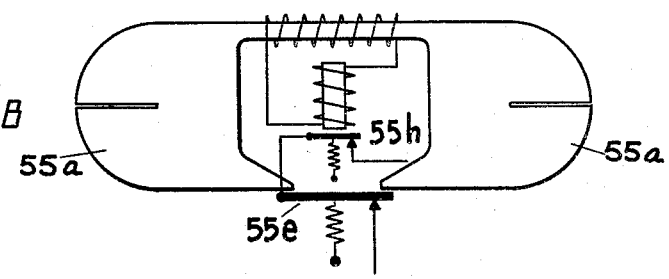
Fig. 65.B
WITNESSES
INVENTOR.
BY
ATTORNEYS Nov. 29, 1932.  F. J. SPRAGUE  1,889,724
METHOD OF AND APPARATUS FOR CONTROL OF TRAIN MOVEMENTS
Original Filed Aug. 7, 1919  28 Sheets-Sheet 24
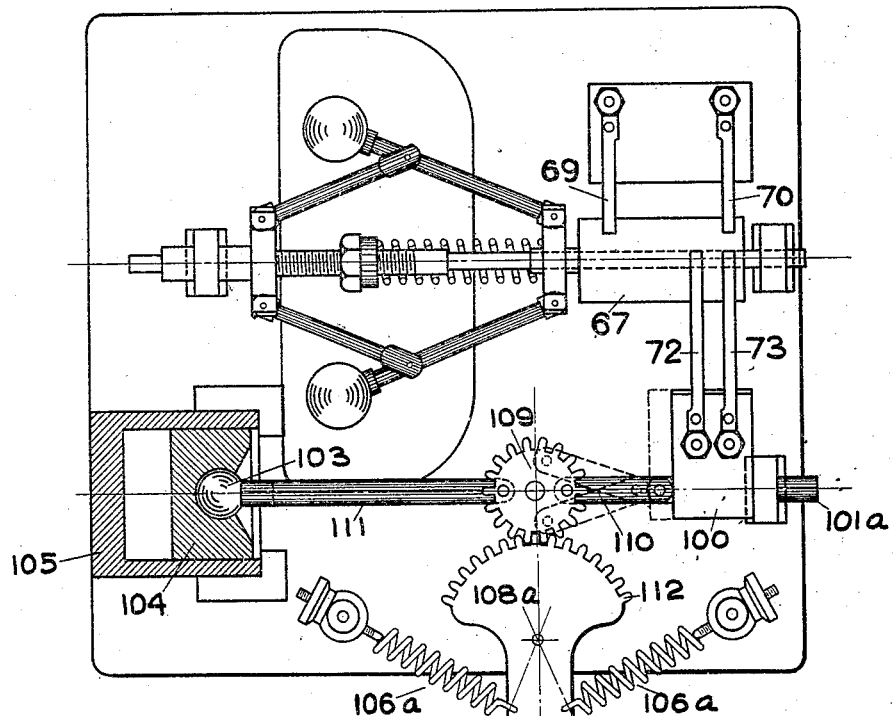
Fig. 69.
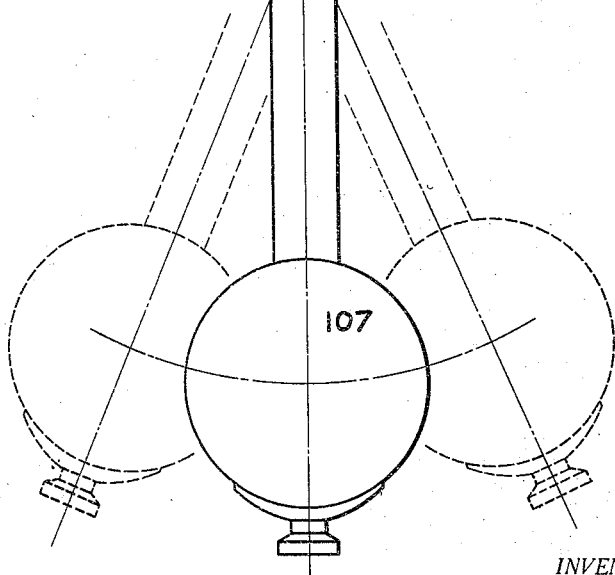
WITNESSES
INVENTOR.
BY
ATTORNEYS Nov. 29, 1932. F. J. SPRAGUE 1,889,724
METHOD OF AND APPARATUS FOR CONTROL OF TRAIN MOVEMENTS
Original Filed Aug. 7, 1919  28 Sheets-Sheet 27

WITNESSES

INVENTOR.

BY

ATTORNEYS

Patented Nov. 29, 1932

1,889,724

UNITED STATES PATENT OFFICE

FRANK J. SPRAGUE, OF SHARON, CONNECTICUT, ASSIGNOR TO SPRAGUE SAFETY CONTROL AND SIGNAL CORPORATION, OF NEW YORK, N. Y., A CORPORATION OF VIRGINIA

METHOD OF AND APPARATUS FOR CONTROL OF TRAIN MOVEMENTS

Application filed August 7, 1919, Serial No. 315,880. Renewed April 20, 1932.

In British Letters Patent No. 18,213 of 1915 and in the divisional patents thereof, Nos. 101,348 and 104,176 both of 1915 (which in disclosure correspond with U. S. application Sr. No. 879,939, filed December 31st, 1914, and which are hereinafter collectively referred to as a single patent) is disclosed a braking system providing for semi-automatic control of trains, varying according to operating conditions, as distinguished from what is ordinarily known as automatic stopping, by establishing a transient connection between the signal system on the road, where one exists, and the braking equipment on the train controlled from the locomotive.

In the system of that patent, when a train passes an active distant track magnet, indicative of caution conditions, the engineer receives in his cab a preliminary audible and visible warning which, if not heeded, is followed by an automatic primary braking, service in character, controlled in rate and amount, and subject to nullification by the engineer. If the train thereafter passes an active home track magnet indicative of danger condition there is then established on the train, at a safe distance from the occupied advance block, an impulse for effecting a secondary braking, full service or emergency in character, which braking will or will not take place dependent upon conditions fully discussed in the said patent. If the secondary braking does take place, the brakes are then removed from the engineer's control until the train is stopped.

Provision is also made for recording the reception of certain brake impulses and brake applications as a check upon the engineer's obedience to signals.

One of the principles underlying the system of the said patent is that the secondary braking is inevitable in case the engineer passes an active home track magnet above a certain predetermined speed, unless the time interval in passing from a correlated active distant track magnet to the active home track magnet exceeds a predetermined amount, in which case there will, in all probability in practice, occur a repetition of the primary braking conditions. Thus on passing an active home track magnet above a predetermined speed either a secondary braking will occur or a primary braking will be initiated. The conditions under which it is possible to pass an active home track magnet are, therefore, more or less inflexible.

The present invention has for its object to provide a braking system which as a whole embodies many of the valuable features found in said patent but which will extend the freedom of control by the engineer and will reduce the interference with schedules to a minimum consistent with the proper handling of the train by the engineer.

Generally speaking, the present system is similar to that of the said patent in the service braking initiated on passing an active distant track magnet, although as will be hereafter pointed out, the particular manner in which the service braking is initiated differs from that shown in the said patent.

Among the features distinguishing the present system from that of the patent are the following:

(1) A wide range of permissible speeds are provided for at an active home track magnet;

(2) Means are provided for effecting a secondary braking at an active home track magnet after passing an active distant track magnet, regardless of time interval in passing from the distant to the home track magnet;

(3) The transmission to the brakes of a braking impulse generated on the train in passing within the permissible speed limits an active home track magnet is controlled by means the action of which varies with the speed of the train and the braking thereof both at the time the impulse is received and thereafter during the existence of certain conditions thereby created on the train. For this purpose said means may be responsive to the speed of the train and to a suitable application of air for braking (i. e. to the braking means) or be responsive to the speed of the train and the rate of retardation thereof however effected (i. e. braking effect), the two elements in either case being each independently adjustable and coordinated in result.

The conditions resulting from the reception of a braking impulse on passing an active home track magnet, and which thus render the train subject to coordinated speed and braking control, persist until they are intentionally destroyed, and until thus destroyed a train which has received a braking impulse at an active home track magnet will be subjected to coordinated speed and braking control, although it may pass over further active or inactive distant or home track magnets during the existence of such condition;

(4) The installation of a resetting device, specifically in the form of a magnet at or near the end of the block, so that the passage of a train over said reset device when active, will destroy the conditions created by passage over one or both of active application magnets, and will restore the control circuits on the locomotive for operation upon passage over an active application track magnet of an advance block;

(5) The use of compound magnets, comprising permanent yokes and neutralizing coils together with other features so arranged that the magnetism of the yokes is stabilized preferably as both distant and home track magnets for transmitting the braking impulses from the track to the train. These application magnets if their neutralizing coils are de-energized give active fields; and means are supplied for de-energizing the neutralizing coils in the absence of caution or danger conditions. The present system, therefore, employs the normal danger principle.

(6) The reset magnets in the preferred form of track equipment are, on the other hand, electro-magnets requiring the presence of current to render them active, and means are provided for energizing them in the absence of danger conditions. Failure of current in the reset magnets is, therefore, in the line of safety, and this cooperating with the same principle in the compound application track magnets effects a normal danger system in most complete form.

The system of the said patent is illustrated as applied to the automatic air brake system equipped with a G—6 engineer's valve. The present invention is illustrated as applied to the E—T automatic air brake system employing the H—6 engineer's valve. While these two automatic air brake systems are for the most part similar in operation and construction, certain features are present in the E—T equipment which are not found in the equipment employing the G—6 valve and which are taken advantage of in the present invention for the introduction of many of the improvements over the system of the said patent. As the E—T equipment is well known to those skilled in the art only so much of the same will be described herein as to permit an understanding of the application of this invention thereto.

Many further advantages are possessed in the system herein disclosed resulting in other features of novelty which will be hereafter fully described and claimed.

Furthermore, many of the units of this system may be applied singly or in varying combinations to produce only certain of the results attainable by the most complete embodiment of the invention; in fact many of the units of the system have the possibility of a wide application for purposes entirely foreign to a signalling or braking system. While the invention contemplates all of these, in its preferred form and for the purposes immediately in view it employs signalling, braking, recording thereof and the inclusion of the control circuits in a single unit.

Referring to the accompanying drawings, in which corresponding parts are designated by similar marks of reference:—

Figure 1 is a diagrammatic representation of a control system illustrating one embodiment of this invention. At the bottom of the figure a track with the instrumentalities forming part of the track system is shown, and above this are shown parts carried by the locomotive. On the right is represented the pneumatic brake apparatus carried on the locomotive, and on the left, the electric circuits and mechanism controlled thereby for carrying, with proper coordination, impulses received from the track system to the brake apparatus, together with the recording means, all as will be hereinafter described. Included in the showing of this figure is a portion of the standard Westinghouse No. 6 E—T brake equipment, including the engineer's main and independent brake valves in running position, the reducing and feed valves, the main and equalizing reservoirs, the main reservoir and equalizing reservoir gauge, the cutout cocks and a portion of the distributing valve.

Fig. 2 is a view similar to Fig. 1 but showing only certain parts illustrated in the former figure.

Figs. 3 and 4 are a plan and an elevation, respectively, of a track magnet embodying one feature of the invention herein described.

Fig. 5 is a plan of a receiver embodying one feature of this invention.

Fig. 6 is an elevation showing the mounting of a receiver, such as shown in Fig. 5, on the locomotive and its relation to the track magnet.

Fig. 7 is an elevation of certain parts shown in Fig. 6 but on larger scale, with the track magnet illustrated as active.

Fig. 8 is a view similar to Fig. 7 but with the track magnet illustrated as inactive.

Fig. 9 is a plot illustrating the cycle resulting from the energization and de-energization of track magnets such as shown in Figs. 3 and 4.

Fig. 10 is a diagrammatic illustration of the arrangement and control of a distant track magnet, compound in character, and of a reset track magnet constituted by an electro-magnet.

Fig. 11 is an illustration similar to Fig. 10 except that the reset track magnet is a compound magnet.

Figs. 12 and 13 are diagrammatic illustrations showing conventionally a portion of a railroad with locomotive thereon, including several blocks and the track magnets, three-position signals associated therewith, and the control of the track magnets, the application track magnets in Fig. 12 being compound and the reset track magnets being electro-magnets, while all the track magnets in Fig. 13 are compound magnets.

Figs. 14 to 23 are diagrammatic illustrations showing conventionally typical signal and track magnet indications with varying train movements on a railroad equipped with the normal danger system of automatic signals with the rear guard caution overlap necessitated by short blocks. Each of the figures shows one long and two short blocks and the ends of two other blocks, with the representation of either one or two locomotives, and illustrates the location and condition of the track magnets.

Figs. 24, 24A, 24B to Figs. 35, 35A and 35B are views illustrating various designated positions occupied by the handles of the engineer's main and independent brake valves, together with the air pressure conditions effected thereby in a contact controlling Bourdon tube and casing, which latter form a feature of this invention as will be hereinafter described.

Figs. 36 to 41 are diagrams illustrating the speed, and in certain cases the braking pressure, control feature of this invention, such diagrams embodying in different degrees the most complete form of the invention shown herein, Figs. 41A and 41B representing various positions of certain contacts shown in Fig. 41 under different braking conditions.

Figs. 42 to 59 are diagrams illustrating conditions arising in the operation of one form of the invention herein disclosed.

Fig. 60 is a plot showing various braking conditions attendant upon the passage of a train provided with means for shifting the speed limit of secondary automatic braking through a signal block section protected by track instrumentalities as represented at the bottom thereof.

Fig. 61 is a view similar to Fig. 60, but illustrating various braking conditions when there is a progressive shifting of the speed limit of secondary automatic braking by coordinated speed and brake control.

Figs. 62 and 63 are a plan and a vertical section of one form of combined application and reset receiver and protective casing, the cover of the casing being removed in Fig. 62, Fig. 63 being taken on the line III—III of Fig. 62.

Figs. 64, 65, 65A and 65B are views illustrative of different types of application receivers.

Figures 66, 67:
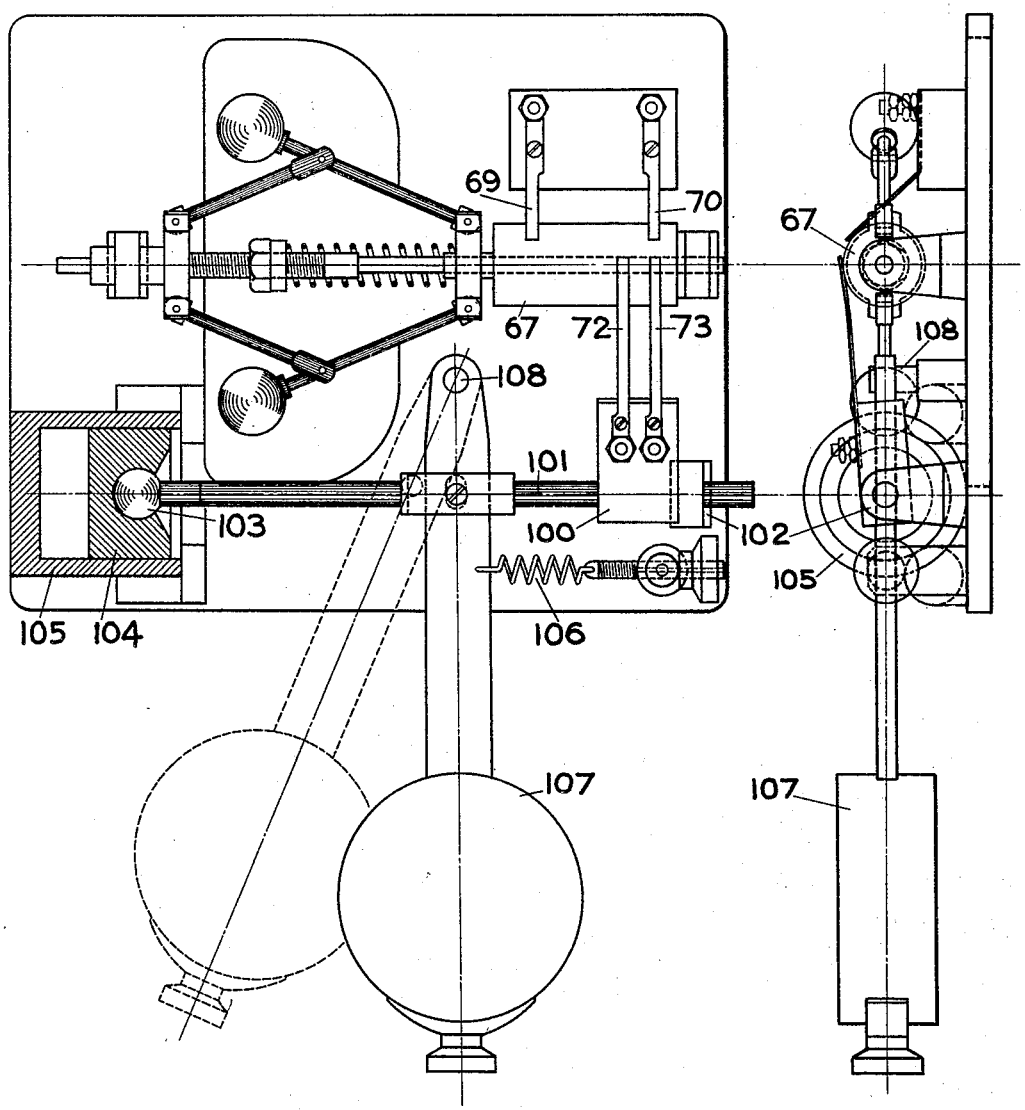

Figs. 66 and 67 are front and end elevations, respectively, of a device adapted to effect, in connection with other features shown in this application, a combined speed and retardation control falling within this invention.

Figure 2A:
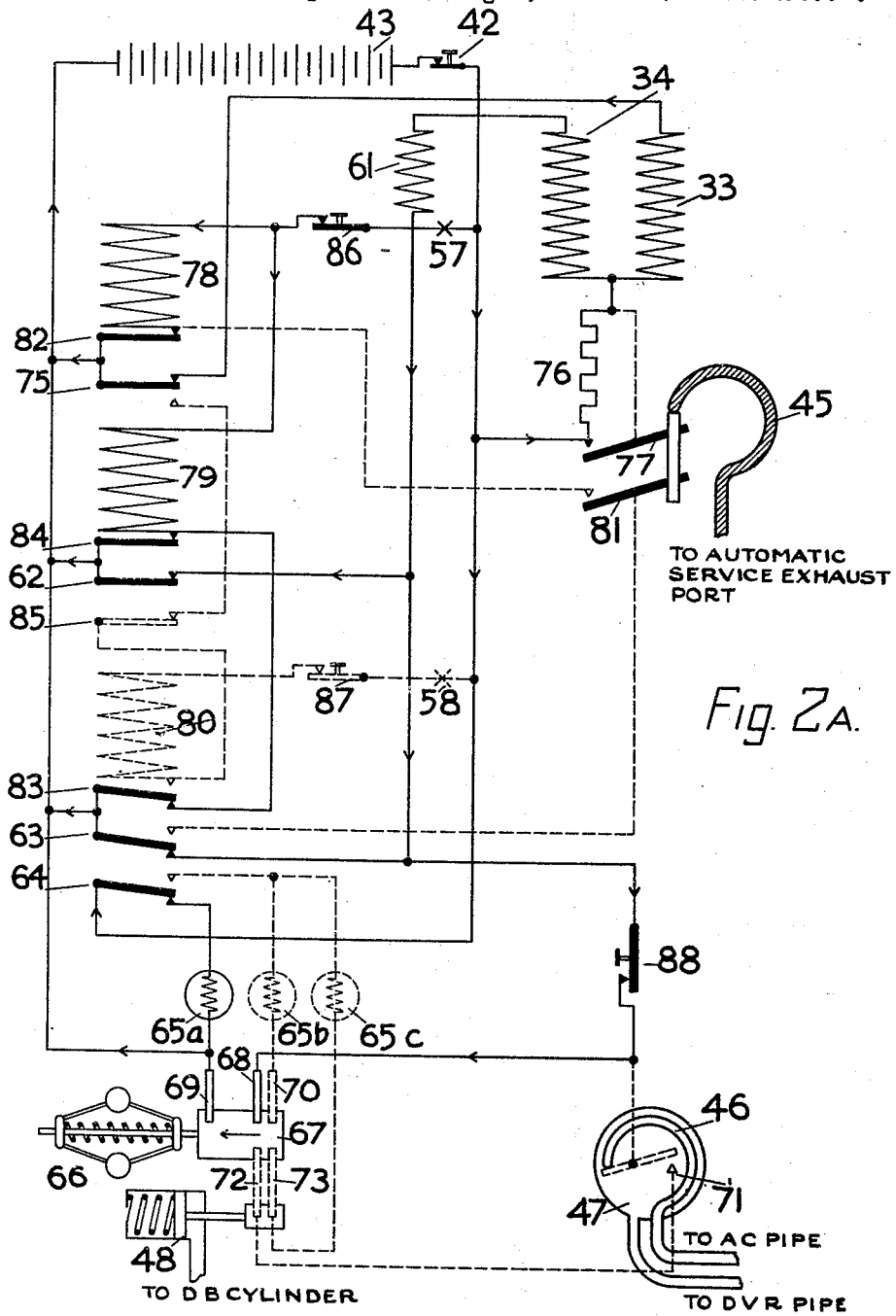
Fig. 2A is an enlarged diagrammatic view of the electrical circuits shown in Fig. 1, and representing certain air-controlled contacts for the circuits.
Figure 68:
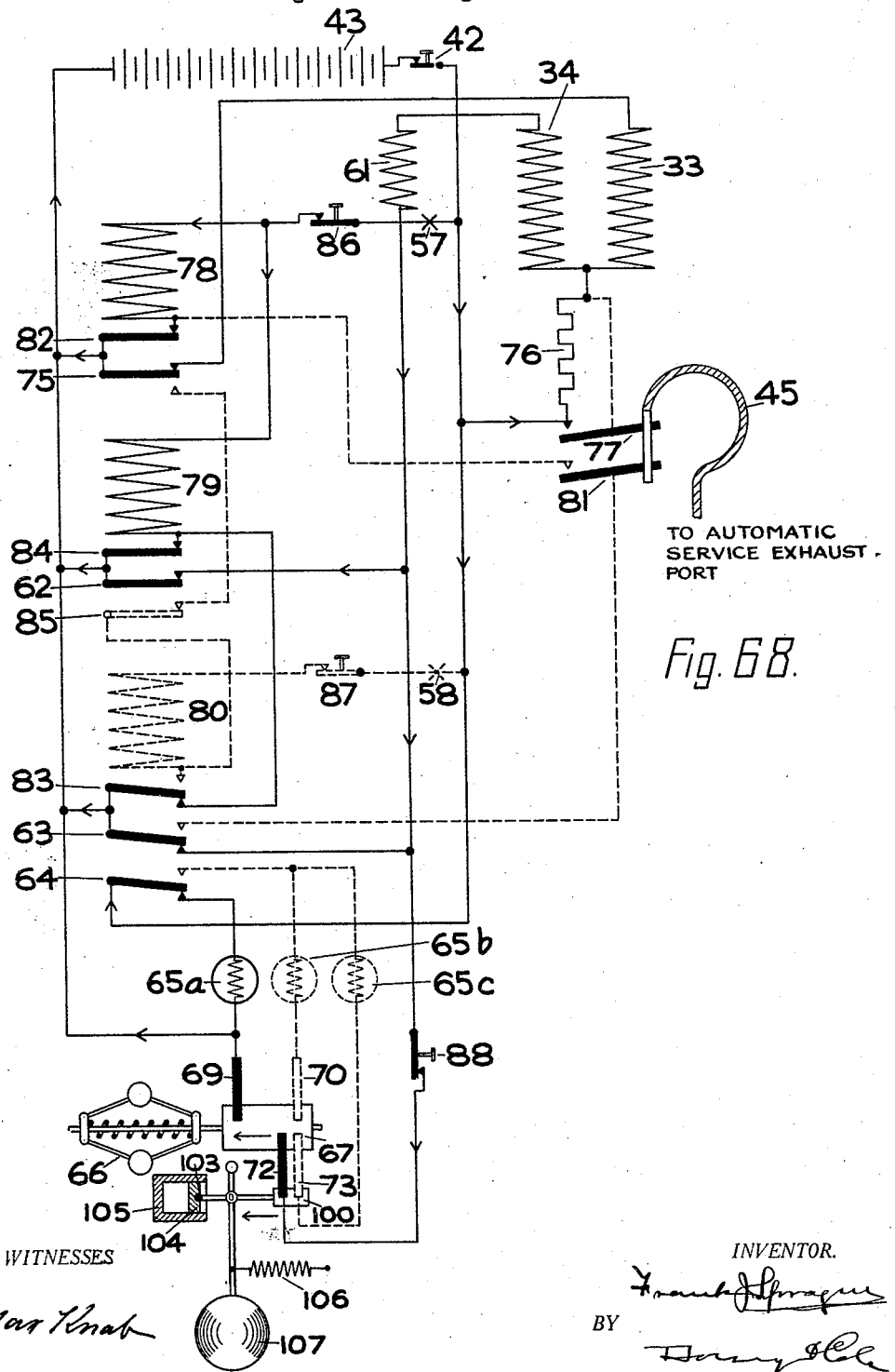

Fig. 68 is a diagrammatic view similar to Fig. 2A, with the device of Figs. 66 and 67 applied thereto.

Fig. 69 is a development of the device shown in Figs. 67 and 68, adapted for reversible operation of engine movement.

Figure 70:
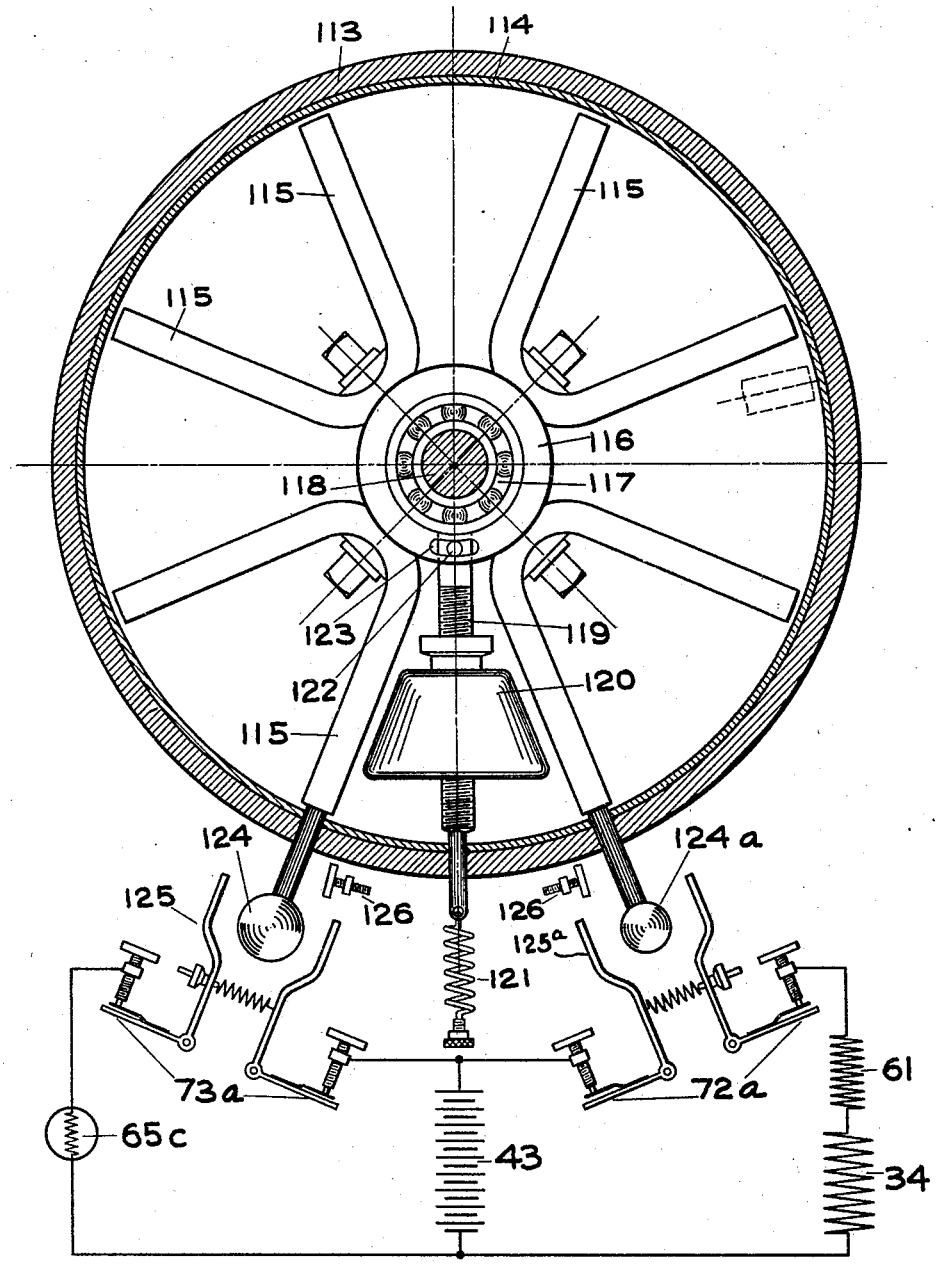

Fig. 70 is an elevation of another device to effect the coordination of speed and retardation control.

Figure 71:
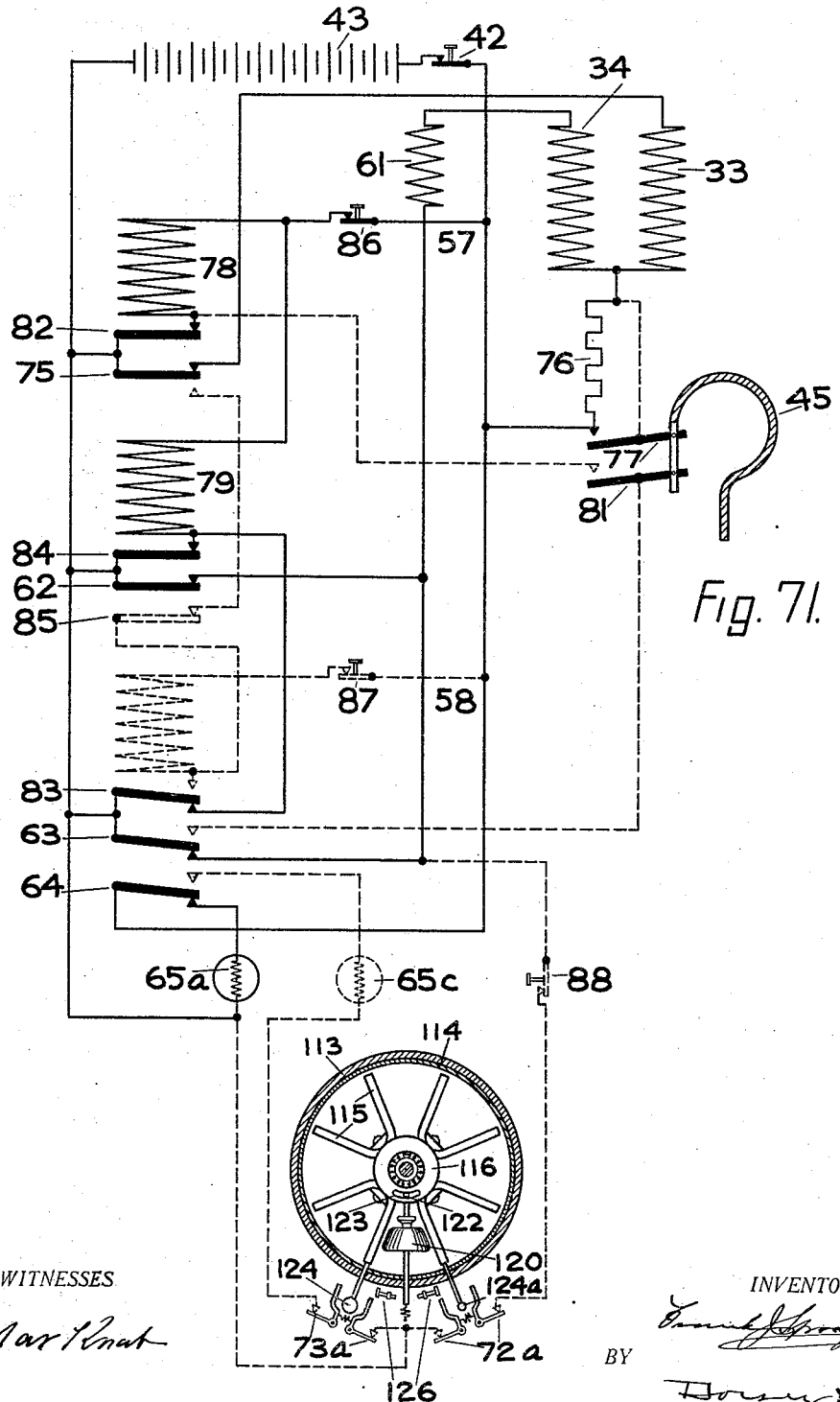

Fig. 71 is a diagrammatic view similar to Fig. 2A with the device of Fig. 70 applied thereto.

Figure 72:
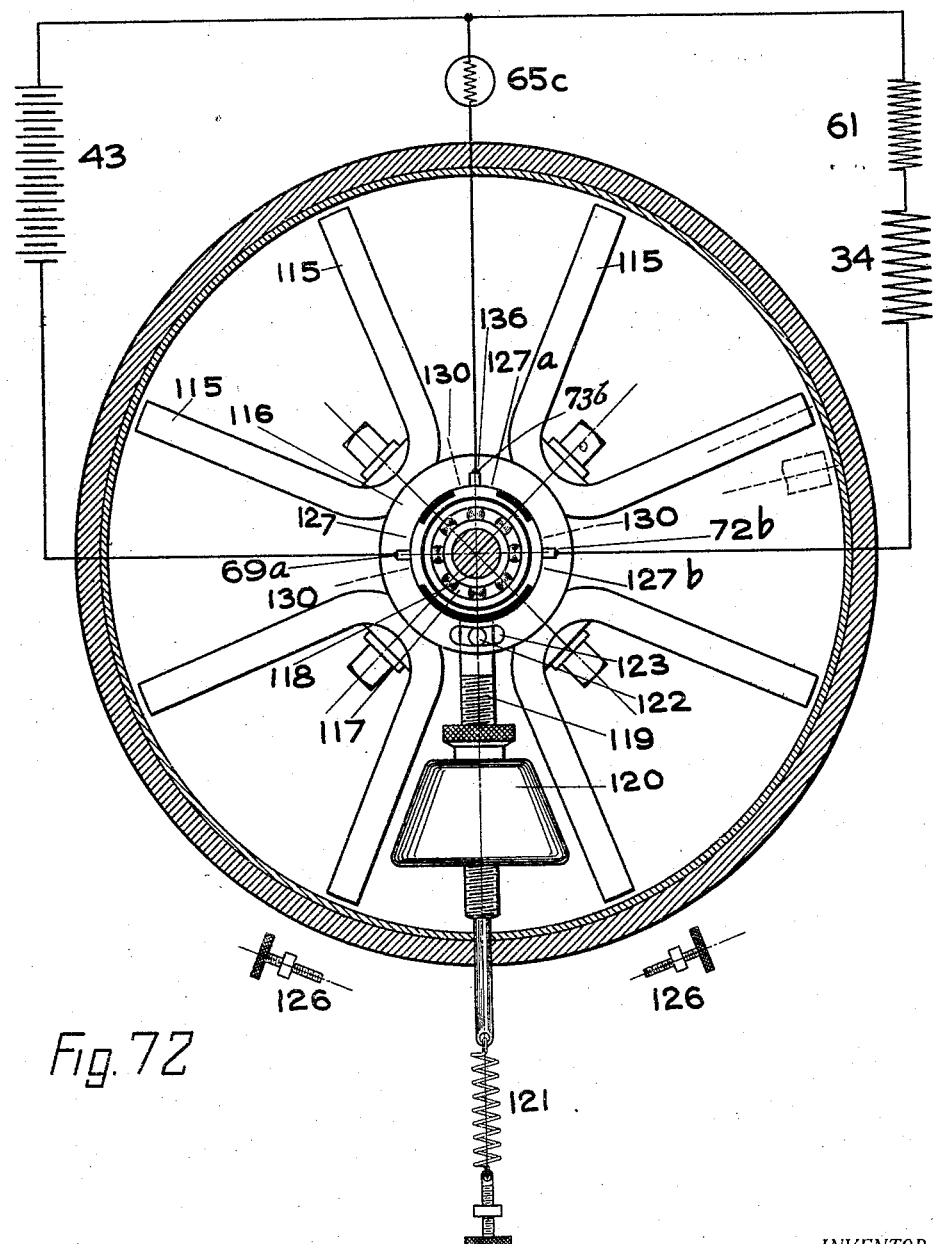

Fig. 72 is an elevation of a device similar to Fig. 70 to effect the coordination of speed and retardation control, but with a different physical arrangement of the circuits.

Figure 73:
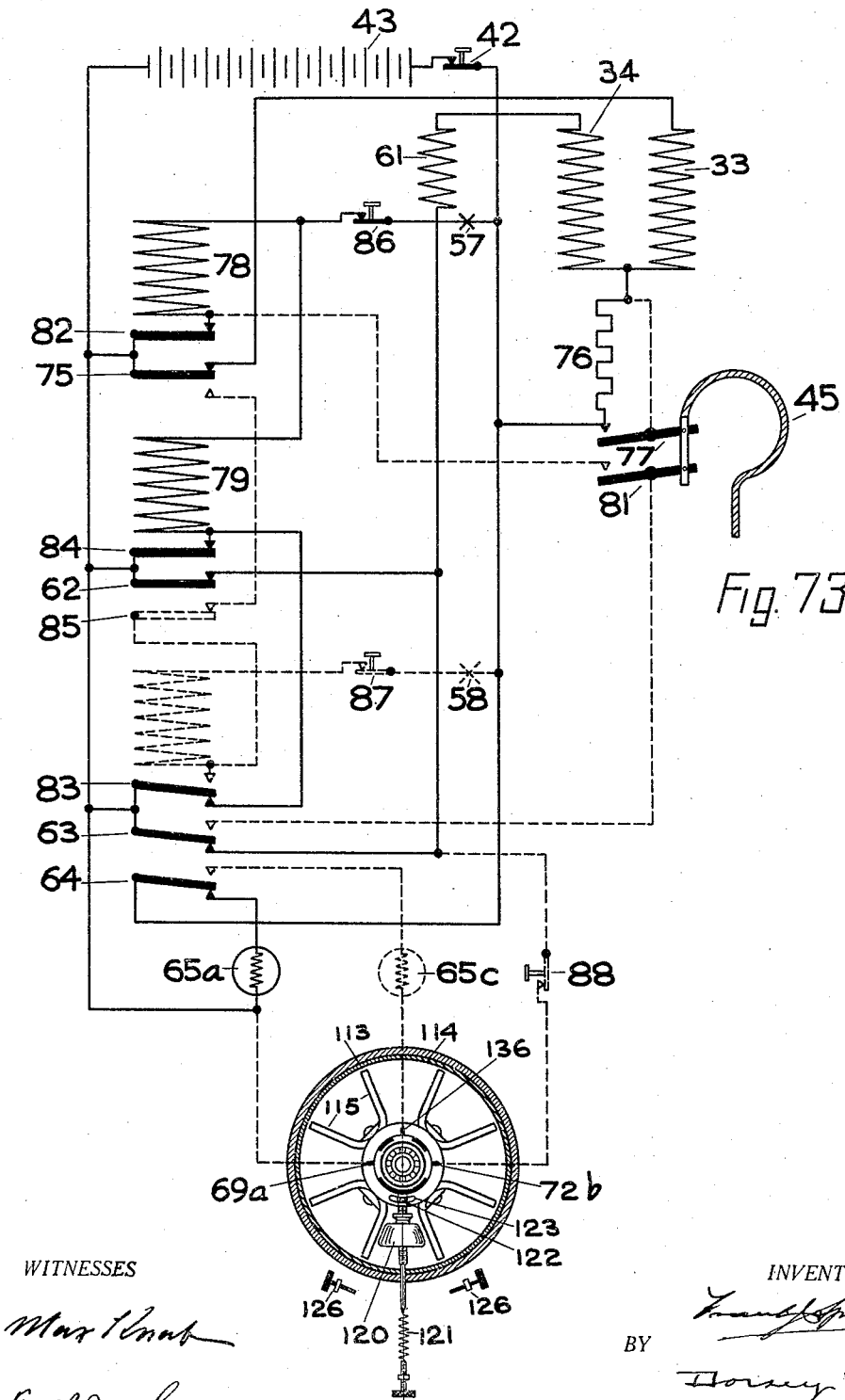

Fig. 73 is a diagrammatic view similar to Fig. 2A, with the device of Fig. 72 applied thereto.

*The Westinghouse E—T equipment*

Although this brake equipment, to which as stated the present invention is herein shown as applied, is well known, the following brief description is given for the purpose of convenience.

As shown in Fig. 1, it is seen to comprise a main reservoir connected by piping to a "distributing valve"; to a "reducing valve" for supply of air at reduced pressure to the engineer's "independent brake valve"; and to a "feed valve" supplying air at a different reduced pressure to the lower part of the engineer's "main brake valve" and thence to the "equalizing reservoir" and the "brake pipe".

The lower bodies of the engineer's "main brake valve" and "independent brake valve" are connected together by two pipes, one of which, RP, is known as the "release pipe", and the other of which, AC, known as the "application cylinder pipe" is also connected to the middle opening in the "distributing valve".

Another pipe DVR (distributing valve release pipe) connects the engineer's "main brake valve" through the "independent valve" and the release pipe RP with the lower outlet of the "distributing valve".

The two engineer's brake valves, i. e. the main valve and the independent valve, have different objects and function differently, with the result that the braking effected by each is quite different. The independent valve acts practically as a straight air controlling valve, and is limited to the application and release of brakes on the locomotive and its tender through the medium of the distributing valve, using at all times air from the main reservoir. The braking of the locomotive unit may be thus independently graduated at will whatever the braking of the rest of the train.

On the other hand, the main brake valve is intended to brake the whole train, engine and equipped trail cars, by a reduction of air pressure in the brake pipe connecting them all, effected by an initial or pilot reduction of pressure in the equalizing reservoir. The necessary air for the brake cylinders on each of the cars is directly provided from a local auxiliary reservoir, normally supplied, while charging and running, from the main reservoir of the engine, through the brake pipe, plus whatever air may be left in the brake pipe after a brake application reduction. The various necessary connections between the brake pipe, the auxiliary reservoirs, the brake cylinders and atmosphere are effected automatically by what is known as the triple valve, whose operation is determined by reduction or increase of pressure in the brake pipe, the former to apply the brakes and the latter to release them and recharge the auxiliary reservoirs.

The main brake valve used in the E—T equipment, as compared with the G—6, has an additional function, in that by moving the handle to what is known as holding position the brakes on the locomotive can be held while the brakes on the cars can be released, and this without manipulation of the independent valve, which is normally spring held in running position. The main brake valve is the one normally used in handling a made-up train, while the independent brake valve is used to handle an engine equipment alone, although also used in connection with the main brake valve to vary the braking on the locomotive.

The distributing valve on the locomotive equipment is an assembly having the functions of a triple valve, an auxiliary reservoir and a brake cylinder of fixed dimensions, so combined that it is possible to supply pressure to the engine and tender brake cylinders from the main reservoir, and yet retain control through the main brake valve of braking action and brake-pressure graduation in said cylinders in harmony with the pressure in the brake cylinders on the triple-valve-operated cars of the train.

These normal characteristics of the locomotive equipment, are well known and form no part of this invention, but in the various brake applications, release of brakes and charging of brake pipe and auxiliary reservoirs, certain air conditions are established in the application cylinder pipe AC, and the distributing-valve release pipe DVR, which in accordance with this invention are made use of in the control of the conditions governing an automatic brake application.

An analysis of the conditions of air pressure which exist in the application cylinder and the distributing valve release pipes for the various positions of the main brake valve and of the independent valve shows that these conditions can be used to accomplish certain desired objects. In this connection attention is called to Figs. 24 to 35B, which show the combination of positions of the main and independent brake valves for various operations incident to train braking, together with the corresponding air conditions existing in the pipes referred to. The first of each horizontal group of figures is a plan view of the upper casing of a motor driven main brake valve such as used in the present invention, with the brake handle in one of the designated various positions along its sector. The second figure of each group shows the independent valve with its brake handle in one of its positions. The third figure of each group shows a Bourdon tube and an enclosing air tight casing with the air conditions existing in the tube and the case if connected, respectively, to the AC and DVR pipes of the E—T equipment, shading indicating active pressure and the absence of shading atmospheric pressure.

The positions of the handles and the conditions corresponding thereto are:—

Figs. 24, 24a, 24b. Charging—main and independent valves in running position.

Figs. 25, 25a, 25b. Running fully charged—same positions of the brake valves.

Figs. 26, 26a, 26b. Automatic service—main valve in service and independent in running.

Figs. 27, 27a, 27b. Automatic lap from service—main valve in lap and independent in running.

Figs. 28, 28a, 28b. Automatic holding—main valve in holding an independent in running.

Figs. 29, 29a, 29b. Automatic release and charging—main valve in release and independent in running.

Figs. 30, 30a, 30b. Emergency—main valve in emergency and independent in running.

Figs. 31, 31a, 31b. Independent quick application—main valve in running and independent in quick application.

Figs. 32, 32a, 32b. Independent lap—main valve in running and independent in lap.

Figs. 33, 33a, 33b. Independent release after service application—main valve in lap and independent in release.

Figs. 34, 34a, 34b. Independent partial release after service application,—main valve in lap and independent in lap.

Figs. 35, 35a, 35b. Independent slow application after service application,—main valve in lap and independent in slow application.

All these movements normally produce in the application cylinder and distributing valve release pipes either one of three conditions, namely:

(a) Pressure in the application cylinder pipe and none in the distributing valve release pipe; or (b) Pressure in both pipes; or (c) Atmosphere in both pipes.

A study of the braking operation shows the general facts, that when the whole train is properly braked by the use of the main brake valve there is pressure in the application cylinder pipe and none in the distributing valve release pipe, but when the brakes are released from the train as a whole, or from one part of the equipment as distinguished from another, or air is applied only to the locomotive through the independent valve, there is practical equality of air conditions in the two pipes, either with active pressure in each or because both have been reduced to atmosphere.

Or, referring to the above listed figures, train braking as a whole occurs in the positions of the figure groups 26, 27, 30, 34 and 35, while localized braking or localized or general release occurs in the positions of the figure groups 24, 25, 28, 29, 31, 32 and 33.

The characteristics thus summarized are made use of in one form of this invention (to be hereinafter described) to meet certain conditions, which are herein laid down and which seem to be important to insure non-interference, either accidental or malicious, with the operation of the automatic train control when the means for, or the cause of, braking is made a function of that control.

These conditions may be briefly stated as follows:

1. That to avoid an automatic secondary braking when or after passing an active home magnet before passing an active reset track magnet the engineer should be required to use his main brake valve and thus to apply suitable braking power to his whole train;

2. The engineer should not be able to nullify this automatic action by applying brakes to the locomotive alone through the independent brake valve; and 3. He should likewise not be able to nullify this automatic action by holding a part and releasing the rest of the brake equipment of the train.

In addition to the above, attention is directed to the fact that in the E—T equipment, the application of service brakes by the engineer's main brake valve when the independent valve is in running position results in braking both the locomotive and train equipments, not to the same amount but with like general variations in degree, this braking being the result of a reduction in the brake pipe pressure initiated by a reduction of air in the equalizing reservoir.

It should be further noted that like varied brake applications are effected on both the locomotive and the train equipments by similar reductions of brake pipe pressure, by using an independent outlet from the equalizing reservoir or even from the brake pipe itself, when the engineer's main brake valve is in lap position.

ADDITIONAL AIR PARTS

*For automatic primary braking*

A special head for the engineer's main brake valve replaces the standard head of the usual E—T valve. This head is, generally speaking, similar to the corresponding head of the aforesaid patent and like it is located above the cavity in which the rotary element of the valve is mounted. It comprises a driving yoke 1 loosely mounted on the spindle of the valve and driven by pistons 2, 2, and a yoke 3 driven in one direction by the driving yoke and rigidly connected to the spindle, the throw effected by the pistons being such that the rotary element of the valve can be thrown to lap position from release or intermediate positions. The pistons move in suitable cylinders which are connected by channels of restricted flow area with the lower end of an oil reservoir 4. Suitable valves will be hereinafter described for admitting pressure air to the space above the oil in the reservoir to actuate these pistons. A suitable baffle plate 4a may be placed in the reservoir to prevent churning of the oil by the pressure air.

The use of oil with a restricted flow area as a driving medium gives a more sluggish and easily controlled movement to the valve to prevent its being thrown by its own inertia on automatic movement beyond lap position, and also tends to hold the valve from returning towards release position when shifted to lap position by the action of the pistons, until pressure is manually applied to positively move it. In the latter case the oil will flow back to the reservoir and the air thus compressed therein will escape through a restricted relief port 7. This relief port also constitutes a whistle and gives audible warning when pressure air is admitted into the oil reservoir. As will later be seen this is co-incident with passing an active distant track magnet.

Pivotally mounted in the valve head is an arm 5 which is adapted to be struck by the driving yoke 1 and, when the latter completes its movement on throwing the main brake valve to lap position, to actuate the stem of a normally closed pilot valve 6, which is generally similar in construction and function to the corresponding valve of the aforesaid patent.

The normally closed automatic service control valve 8 controls the air connection for admitting pressure air from the main reservoir to the oil reservoir. This valve thus generally corresponds with the control valve of the said patent but differs therefrom in not venting to atmosphere the pressure air used in driving the pistons 2, 2.

The supply valve 10 controls the air connection between the brake pipe and the capacity reservoir 11. It is normally held away from its seat by a spring pressed plunger 12 and a diaphragm 13. The diaphragm on its lower side is in open communication with the brake pipe, and on its upper side it is normally in communication with the equalizing reservoir through the automatic service brake valve. Hence the opposing air pressures are normally equal. The chamber above the diaphragm is in open communication with the pilot valve, and upon the opening of the latter is vented to atmosphere, resulting in the instant closing of the supply valve and the imprisoning of air in the capacity reservoir at brake pipe pressure. This supply valve, therefore, corresponds in operation with the supply valve of the aforesaid patent.

The automatic service brake valve 15 is similar to that of the said patent, and is interposed between the equalizing reservoir and the pilot valve 6. It is normally held in open position by a spring 16 and pressure air from the equalizing reservoir acting on the lower side of a diaphragm 17, and is moved to closed position, on the opening of the pilot valve, by an adjusting spring 18 and by pressure air from the capacity reservoir 11 acting upon the upper side of the diaphragm. Its construction is such therefore as to fix the amount of brake pipe reduction on a primary automatic braking. The rate of such braking is determined by a regulating valve 19.

*For automatic secondary braking*

The automatic emergency valve of the aforesaid patent is replaced in the present system by an automatic emergency control valve 20, and an automatic emergency valve 21 both normally closed. The latter valve opens or closes a chamber in open communication with the brake pipe. It is mounted on the lower end of a hollow stem which carries on its upper end a head 22 moving within a suitable cylinder through the bottom of which the stem passes loosely, the opening thus formed being normally closed by a venting valve 23 also carried on the stem. The space below the head 22 is in communication with, and can be vented to atmosphere by the automatic emergency control valve.

Air pressure is normally equalized on both sides of the head 22 by means of the channel through the valve stem and a leak through the head, the control valve 20 being closed, and the emergency brake valve will be held to its seat by a spring 24, thus closing the escape vent of the brake pipe. If, however, the emergency control valve be opened the air pressure in the space below the head 22 will be suddenly released; the automatic emergency brake valve 21 will therefore be opened and the brake pipe vented to atmosphere.

The coincident opening of valve 23 will also vent the space below the head 22, so that independent of what may then be done to the automatic emergency control valve, no pressure can be built up below the head. Thus it will be impossible by closing the emergency control valve 20 to reclose the emergency brake valve, once it has been opened; and the emergency brake valve being once opened the brake pipe will remain open until the pressure above the head 22 is so far reduced by leakage that it is overcome by the spring 24, and the emergency brake valve thereby closed. By properly selecting the strength of spring the drop of pressure necessary to insure emergency operation may be limited so that unnecessary venting of the brake pipe may be prevented.

The automatic service and emergency brake valves and the supply valve are by preference assembled as a small integral and removable unit carried on the capacity reservoir and supported in some convenient place, such as under the running board outside of the engine cab.

A normally closed auxiliary emergency brake valve 25 is located between the main reservoir and the application cylinder pipe AC. This valve is subjected to opposing spring and air pressures. Its stem impinges upon a diaphragm 26, the lower side of which is in open communication with and subjected to such pressure as may exist in the application cylinder pipe, while its upper side is in open communication with and subjected to the pressure existing in the space below the head 22 of the automatic emergency brake valve. When pressure in the last named space is released on an automatic secondary braking as before described the positive pressure which then exists in the application cylinder pipe acts upon the lower surface of the diaphragm and results in unseating of the valve. This opens a direct passage from the main reservoir into the application cylinder pipe and gives an increase of effective pressure on the brakes of the locomotive and tender of the same kind which can be given by throwing the engineer's main brake valve to emergency position but which does not result from an opening of the train pipe alone. The valve is reseated when the space below the head 22 is sealed and air pressure is thus built up above the diaphragm 26.

The system above described provides means by which upon opening the automatic service control valve 8 a primary braking, service in character, can be obtained, and also by which upon opening the automatic emergency control valve 20 a secondary braking, full service or emergency in character, can be obtained, the braking effected under these conditions being comparable in all respects with that effected with the same equipment by the operation of the engineer's valve in service and emergency positions respectively. It is, therefore, obvious that so much of the system as has been described is applicable to any system of automatic control which provides for the proper handling of the automatic service and emergency control valves, and the invention therein is independent of the particular means provided for such control. To effect the control of the valves, however, in the preferred manner, certain additional valve and air features are employed, which will now be described.

*Control valve parts and operation*

The two automatic control valves, service and emergency, 8 and 20 are mounted in a single casing, above which is mounted a double magnetic yoke 30, carrying two sets of magnetic cores, one set for each valve. Each set consists of a lower fixed member 31 and an upper movable member 32, enclosed within a suitable coil. The coil for the service valve is the service coil 33, and that for the emergency valve the emergency coil 34. The upper member of each core is hollow and contains the upper end of a stem 35, the lower end of which impinges upon the stem of a relief valve 36 controlling a vent port from the chamber in which is contained the corresponding controlling valves 8 or 20 before referred to. The stem 35, in each case, is pressed upwardly to close the vent port by a spring 37 around the stem of the vent valve acting against a spring 38 interposed between the head of the stem 35 and the closed end of the movable core member 32, the spring 37 being sufficiently strong in the absence of current in the coil 30 or 34, to unseat the relief valve.

As above indicated the service control valve 8 is subjected on its under side to main reservoir pressure and the emergency control valve 20 is normally subjected on its under side to brake pipe pressure, but both of these valves are provided with leak vents so that their upper sides, when the relief valves 36 36 are closed, are subjected to the same pressure as exists on their lower sides. Under these conditions as long as current is flowing through the coil surrounding the actuating cores of the controlling valves the upper movable core members will be drawn towards the lower fixed core members, and the vent valves will be held upon their seats by the increased tension thus put upon the springs 8, 8. The control valves will be then held to their seats by springs 39 39 interposed between the vent valves and the control valves, and the ports primarily controlled by the latter valves will be closed. If, however, current fails in either coil the corresponding spring 37 will lift its vent valve, thus reducing the pressure upon the upper side of the control valves and permitting the excess of pressure on the lower side of said valve to unseat it and open the port primarily controlled thereby. A controlling valve once lifted, stays open, after its vent valve is closed, until sufficient air passes from its lower to its upper side to reduce the difference of pressure between the two sides to an amount which can be overcome by the spring 39, whereupon the control valve will again close.

From the above it will be understood that the service control valve coil is the element the de-energization of which initiates the primary braking, and the emergency control valve coil is the element the de-energization of which effects a secondary braking.

However, there may be times, as for instance when the locomotive is idle in the roundhouse, when it is desirable to open circuit the battery which normally supplies current to these coils and at the same time maintain the control valves closed. To this end there is mounted above the yoke 30 a shaft 40 carrying thereon above each of the movable core members 32 32 a cam 41, and also carrying an electric switch 42, the parts being so related that in one angular position of the shaft the cams will lock the movable core members 32 32 down, and the switch will break the circuit of the energizing battery 43, as here illustrated the main battery of the entire control system.

*Air parts for control of contacts*

As will later be seen, there are certain contacts in the control system of this invention which are actuated by air under conditions existing or developed in the E—T equipment and in the application of this invention thereto. The Bourdon tube affords a convenient means of taking advantage of certain of these air conditions. This mechanism is well known, and comprises a tube, circular in form, closed at one end and of flattened cross section. It is commonly used in connection with an indicating needle geared to its end to indicate the difference of pressure, above or below the atmosphere, of a source of pressure with which it is connected; but in this invention the peculiarities of this tube are also made use of to function because of the difference of pressure between two sources, one connected with the tube and the other with an enclosing casing, the movement in each case being taken advantage of to open or close certain contacts. The tube straightens as the differential in favor of the inside increases.

Two of these tubes are used; one, 45, is connected with the pipe leading from the pilot valve 6 to the port controlled by the service automatic brake valve 15; the other, 46, enclosed in an air tight casing 47, is connected with the application cylinder pipe AC, the casing 47 being connected with the distributing valve release pipe DVR. The conditions existing in the piping connecting the pilot valve with the port controlled by the automatic service brake valve have been referred to in this section under subtitle "For automatic primary braking"; and the conditions existing in the AC and DVR pipes in the previous section, particularly in the discussion of Figs. 24 to 35b wherein the Bourdon tube and casing bear the reference numerals here applied thereto.

In addition to the above there may be provided a piston 48 for actuation of certain contacts, which piston moves in a cylinder connected at one end to a pipe supplying braking air to the brake cylinder of the engine and tender equipment or directly connected to such cylinders, the tendency of the piston to move under such air pressure being opposed by suitable resilient means such as a spring.

With this understanding of the various air parts, both of this invention and of the E—T equipment, the control thereof in accordance with the preferred form of this invention will now be described, for while the circuits of the service and emergency control coils 33 and 34 may be governed in various ways, the preferred and completed form of this invention contemplates their control by cooperating track and locomotive application parts in accordance with the conditions to be met. Furthermore, cooperating track and locomotive reset parts are provided for restoring the circuits of the coils after the desired results from the operation thereof have been obtained.

Track equipment

For clearness of understanding it will be assumed in the following illustration that the system of this invention is installed on a double track road-divided into signal blocks and equipped with electrically actuated caution and danger, or distant and home, signals. Under these conditions the following track equipment is preferably employed.

For every main line block, long or short, there are two normally active compound brake application magnets 50 and 51, and one electro-reset magnet 52, with an energizing coil, as follows (see Figs. 1 and 12) :—

(a) A "distant" application magnet 50, just to the rear of the "caution" signal at the entrance of every block, and controlled by the "distant relay" D at that point.

(b) A "home" application magnet 51, at a definite distance from the "danger" signal, this distance, under ordinary conditions of traffic, being whatever is necessary for stopping with emergency brakes a passenger train when traveling past that point at its maximum speed, with a reasonable margin for safety. This magnet is controlled by the "home relay" H at the entrance of the next block.

(c) A "reset" magnet 52 placed near the end of the block, a short distance to the rear of the "distant" magnet for the next block, and controlled by the same home relay that controls the home magnet.

It will be understood that under special conditions, as on sidings or in interlocked territory, the location of the several magnets will be varied in accordance with conditions there obtaining. Generally speaking, (but subject to exceptions) distant and home magnets will be placed where caution and danger signals, respectively, should be given, and a reset magnet will be located beyond each home magnet, near the end of the block.

Application magnets

The preferred construction and form of a track application magnet is shown in Figs. 3 and 4. As there indicated, such a magnet consists of a plurality of permanently magnetized bars or plates, assembled in groups into two semi-circular yokes 53 53, disposed in a horizontal plane, the yokes having their like poles attached to and connected together by soft iron pole pieces 53a 53a. Each of these pole pieces has projecting centrally therefrom in the plane of the yokes, a stabilizing pole 53b, and also has projecting from its upper face a working pole surmounted by a flange 53c and surrounded by a neutralizing coil 53d.

The faces of the stabilizing poles are comparatively near to each other and have considerable area, their dimensions and those of the yokes being determined by certain known laws which govern the life of the magnetic assembly. By this arrangement there is established a magneto-motive force which at all times sends magnetic lines of force across the space between the stabilizing poles, as shown in Figs. 7 and 8. Normally, also, a magnetic field exists above the working pole flanges, as shown in Fig. 7, the lines of force in which may be diverted to, or passed through, any other mass of iron in proximity thereto, as, for example, the locomotive receiver shown in that figure.

It will be noted that by using the compound magnet herein described, the creation of a magnetic field above the magnet is inherent in the structure itself; that the coils 53d 53d serve as a means for changing the characteristics of such field to indicate a safe condition; and that the stabilizing poles and the working poles are in the path of the magnetic flux created by the permanently magnetized yokes, and are also in the path of the flux created by the coils themselves.

While many other forms of magnet assembly are possible, the one described is very compact and is of such shallow dimensions that it may be supported on and spiked to the tops of the ties, and when so positioned the top of the working poles will be approximately in the plane of the tops of the traffic rails. They may also be easily protected by a casing of cement or enclosed in a non-magnetic box.

With the construction shown it is possible, by sending a current in the proper direction through the coils surrounding the working poles, to diminish, completely neutralize, or actually reverse the magneto-motive force in such poles without destroying or materially affecting the magnetism of the yokes.

When the magneto-motive force is simply neutralized, the magnetic field above the working poles of an application magnet disappears, as in Figs. 6 and 8, and it is a matter of indifference whether the receiver on the locomotive is above said magnet. In ordinary practice, however, exact neutralization would generally not occur, but with the actual receivers used if the field over the working poles is sufficiently weak it may be normal or reversed without creating a flux through the receiver sufficient to operate certain parts hereafter described. This very fact makes possible practical operation with a considerable variation in the current strength used in the neutralizing coils, whether such variation of current strength results from changes in the condition of the battery supply or in resistance of the lines due to temperature, sag or distance.

Fig. 9 illustrates, from actual tests, the relative density, normal or reverse, of the free field existing above the working poles of an application track magnet in the absence of the locomotive receiver, when various strengths of neutralizing current are used. This density may run from a normal represented by, say, a unit 4 to a maximum of 18½ reversed (indicated by the ordinates), with a variation of current strength from 0 to 17 amperes (indicated by the abscissae) as is shown by the line "Field strength without extra coil", and its transferred continuation.

A peculiar thing of note is that in the limits tested, which cover a much wider variation than can occur in practice the neutralizing and reversing effect appear to be practically a linear function of the strength of the current, and it has also been demonstrated by experiment that it matters little how a given total number of ampere-turns is distributed on the two working poles.

Fig. 9 further indicates by the line "Recovery without extra coil", the density of the field above the working poles after reversal and upon the cessation of the neutralizing current.

It will be seen that up to a reversal represented by about 6 units the recovery of the normal free field is practically undisturbed, but that as the reversal is increased in amount the recovery is not to full value.

By winding a small extra coil (as indicated in dotted lines 53e of Fig. 4) on the magnetized yokes, either distributed along the yokes or localized near their junction with the pole pieces, and including the coil in the circuit of the neutralizing coils, the degree of possible reversal with complete recovery of normal field when the current is broken can be more than doubled. The variation in density above the working poles with such a coil present, is represented in Fig. 9 by the line "Field strength with extra coil". In regular operation it has been found that since the reversal will probably not exceed a quarter or a third of the unit of Fig. 9, the use of the extra coil is not needed, although if for any reason it were desired to reverse the fields to a material degree such a coil might be found advisable. Such a coil can also be used to stiffen a weakened magnet, and may if desired be readily included in the track circuits by itself.

If with a normal working field of a density equal to 4 units the receiver on the locomotive were adjusted so that it would not be operated by either a normal or reversed field of under say 1⅓ units density there could be an extreme variation of neutralizing current of 100 per cent, an amount outside of reasonable probability.

*Reset magnets*

These are preferably electro-magnets, such as diagrammatically illustrated in Fig. 10, and the energizing coil of each is controlled by the top contact of the home relay H which controls the de-energizing coil of the home application magnet located next behind it i. e. the home relay of the block located in advance of the reset magnet. (See Figs. 1 and 12). Thus a reset magnet is normally located between the home magnet of one block and the distant magnet of the advance block, and by reason of the fact that its energizing coil receives current at the same time as the de-energizing coils of the home magnet the two magnets will not simultaneously have a magnetic field above them. In other words either one may have an active field but not the two at the same time.

If the reset magnets are compound magnets, say of the same construction as the application magnets, their de-energizing coils may be connected as shown in Fig. 11, and energized through a bottom contact of the home relay H, the top contact of which controls the associated home magnet, as indicated in Fig. 13. Or, if preferred for any reason, a reset magnet may be a permanent magnet without means for de-energizing it.

*Condition and location of track magnets*

The complete connections of distant and home application compound magnets and reset electro-magnets are shown conventionally in Fig. 12, in which an active magnetic field is indicated by solid shading and a non-existent magnetic field by the absence of shading. The condition of the distant and home relays and of the application and reset magnets is that which exists when the locomotive is located as shown on a road protected by normal danger signals, with a three-position signal blade showing, from left to right in the figures, clear, caution and danger indications.

Fig. 13 shows a like layout of track and track magnets, and similar conditions under like signal indications, the only difference being in the use of compound magnets for reset and in the consequent different connection of their coils, these then being neutralizing coils.

The various characteristics of track magnets with regard to location, purpose and comparative conditions, as shown in the different figures, actual or conventional, and for specific illustration outlined for a normal danger system, may be summarized as follows:—

*Location*

"Distant" About 50 ft. in rear of beginning of block it protects.

"Home" At safe high speed emergency braking distance, say 2,000 ft. or less from end of its block.

"Reset" At from 100 to 150 ft. from end of its block.

*Kind*

"Distant" Compound magnet with neutralizing coils (but sometimes electro-magnet).

"Home" Ditto.

"Reset" Electro-magnet (but sometimes compound magnet).

*Control*

"Distant" By "distant relay", or arm of own block, or both.

"Home" By "home relay", or arm of signal next in advance, or both.

"Reset" By "home relay", although it may be a compound magnet without deenergizing coils.

*Condition*

"Distant" Active when single arm (or upper arm where overlap is used) is not in clear (vertical) position.

"Home" Active when single arm (or upper arm where overlap is used) is in danger (horizontal) position.

"Reset" Active when "home" is clear, and vice versa.

*Indications*

"Distant" and "Home" If clear,  If active, 

"Reset" If active,  If inactive, 

*Sidings*

Equipment varies with requirements.

*Crossovers*

Equipment varies with requirements.

All track magnets are of similar unit strength, and effective to initiate impulses in the locomotive receivers at all train speeds.

With the above governing conditions in mind, inspection is in order of Figs. 14 to 23, illustrating one of the most difficult of signal layouts, that of a normal danger system with long and short blocks and rear overlap. These figures illustrate the condition of the track magnets corresponding to signal indications determined by the presence of locomotives in various positions upon the five blocks. To avoid confusion the signal relays are omitted, but it will be seen that in every case the conditions of application and reset magnets, as indicated in conventional fashion, shaded for active field and non-shaded for inactive field, are as determined by the rules just quoted in relation to the position of the main three-position signal blade, that is, the right-hand or upper one of each pair, as distinguished from two-positioned blade at the left-hand or below.

While the illustrations given in the preceding description have, for definiteness, been determined as they would obtain in a normal danger signal system, they are equally adaptable to a normal clear system, for with either type of signal system the track magnets may be operated, if desired, upon a normal danger system in so far as they themselves are concerned.

Inasmuch as the application and reset magnets act upon devices carried by the train through magnetic fields which they create, and as the action due to magnets of one character must be differentiated in its effect from the action due to a magnet of the other character it is necessary to provide means to accomplish this. While this can be done by placing the application magnets closer to one rail and the reset magnets closer to the other rail, that is, offsetting the two magnets on opposite sides of the track center and by similarly offsetting the receiving devices on the train intended to cooperate therewith, such an arrangement is defective when the locomotive is turned end for end, and therefore it is preferred to accomplish the object above set forth by placing all of the magnets and all of the receiving devices on the longitudinal center of the track and train, and providing a different orientation for the application magnets and application receiver from that given to the reset magnets and reset receiver. This arrangement of track magnets is illustrated in various figures in which application magnets point upwardly and to the left in the line of travel and the reset magnets point upwardly and to the right. The receiving devices intended to cooperate with these several sets of magnets will be likewise disposed in these various angular positions such as indicated in dotted lines in Figs. 10 and 11, as will be hereinafter discussed.

When in position the track magnets should be properly protected and guarded against accidental external injury in such a manner as indicated in the aforesaid patent.

LOCOMOTIVE CONTROL EQUIPMENT

*Magnetic receivers (Figs. 5 to 8)*

An application receiver 55 and a reset receiver 56 are located on every locomotive. These receivers are similar in construction (although, as above stated, different in their direction of mounting) and, therefore, the following description applies to both types.

In its simplest form a receiver consists of two flat pieces 55a 55a of soft iron, slotted to break up eddy currents and so disposed in the same horizontal plane that the two pieces of each receiver will simultaneously cover, respectively, the two working poles of the track magnet with which it is desired that the receiver cooperate when brought thereover by the travel of the locomotive. In Figs. 5 to 8 these two pieces are shown as magnetically separated from each other and supported in any convenient manner, one method of so doing being to attach them to the lower side of an insulating slab 55b, supported by suitable brackets 55c 55c from the frame of the locomotive, in such a position that the pieces are carried at a suitable distance above the top of the working poles of the track magnets. In practice, good results have been obtained with distances up to eight inches, although three and one-half inches afford sufficient clearance. The two pieces, therefore, constitute a collector for the magnetic flux due to an active track magnet.

As shown in Fig. 5, the soft iron pieces have their adjacent sides formed into horns 55d 55d located below a hole formed in the block 55b. The magnetic reluctance of the collector so formed is therefore localized at the gap. In the gap between the horns is a soft iron, non-polarized armature 55e, pivoted to one horn and normally held away from the other horn and against a back contact (marked 57 for the application receiver and 58 for the reset receiver) by a suitable spring 55f. When, however, the two pieces on the same receiver are simultaneously over the opposite poles of an active track magnet the magnetic lines of force existing thereover will be concentrated by the horns, and this will tend to draw the free end of the armature against its corresponding horn and will open the back contact. As will later be seen, it is the opening of normally closed contact 57 which initiates the train of operation for de-energizing both the service control coil 33 and the emergency control coil 34; and it is the opening of normally closed contact 58 which effects the resetting of the control apparatus of the system.

The application and reset track magnets have been previously described as disposed in different angular positions for the purpose of differentiating them in their action on the application and reset receivers, and it was stated that the receivers are arranged in angular positions corresponding to their respective track magnets. This arrangement and the result due to such positional mounting of the receivers may be illustrated by the following example. Assume that an application track magnet is placed in such angular position that it is at an angle of 45° with the center line of the track. To an observer looking along the track towards that magnet one of its poles will be in advance of (i. e. beyond) the other. If the magnet is viewed from the opposite side, the same relative arrangements of poles will exist, although, of course, the right hand pole will now be what was formerly the left hand pole. If the application track magnets are arranged with their left hand poles in advance, as illustrated herein, the application receiver on the locomotive will be similarly disposed (see dotted lines Figs. 10 and 11) i. e. when viewed from the rear of the locomotive will show its left hand soft iron piece in advance. Thus arranged, its two pieces, can in the travel of the locomotive, be simultaneously brought over the poles of the application track magnets, whereas if reversely disposed, (i. e. the right hand piece in advance) this will not occur. It will be noted from the above discussion of the track magnet positions that this registration of a properly disposed receiver with its corresponding track magnet is independent of the heading of the locomotive, for the reversal of the locomotive is comparable with the change in position of the observer before referred to.

Likewise, the reset track magnets and the locomotive reset receiver, if arranged with their right hand poles and soft iron pieces, respectively, in advance will come into registration in the travel of the locomotive, irrespective of the heading thereof.

As long as this rule of reverse positioning of the application and reset track magnets and the corresponding positioning of the locomotive receivers is adhered to it is obvious that many different relative arrangements of these elements may be employed.

Furthermore, many modifications and refinements are possible in the construction and grouping of the receiver parts, and means may be provided to protect the receiver from injury and interference. Illustrations of certain modifications and refinements are given in Figs. 62, 63, 64, 65, 65A and 65B later to be discussed.

LOCOMOTIVE CONTROL CIRCUITS

*Preliminary explanation of combined speed and braking control*

The principles involved in the control current through the emergency coil 34 of the automatic emergency control valve 20, but which, it is readily understood, are not limited in their application to the said coil or the braking effected thereby, are illustrated in Figs. 36 to 41B. Each of these figures has certain elements in common, to wit: The battery 43, the automatic emergency control valve coil 34 connected on the positive side thereof, a suitable recorder coil 61 in series with the coil 34, three contact arms 62, 63 and 64 the first two of which are connected to the negative side of the battery and the third to the positive side in shunt to the coil 34, indicating lamps 65a and 65b, and a speed governor 66 driven in accordance with the speed of the train and shifting a contact cylinder 67. The emergency coil 34 in each of the figures has at least three paths in parallel to the negative side of the battery. Two of these paths are through contact arms 62 and 63 respectively and are represented as broken, and the third path is through a brush contact 68, cylinder 67, and a brush contact 69 connected to the negative side of the battery. The lamp 65a is connected between a lower contact made by contact arm 64, and the negative side of the battery. The lamp 65b is connected between an upper contact made by contact arm 64 and a brush contact 70 adjacent and to the right of contact 68. Both lamps are accordingly in shunt to coil 34.

Fig. 36 is limited in its showing to the paths above described. It is evident that with contact arms 62 and 63 open from any cause, a sufficient movement of the contact cylinder to the left, because of speeding up of the governor due to an increase of train speed, will open the third path of coils 34 and 61 at contact 68. On the above assumption that coil 34 is the emergency control valve coil, this would result in a secondary braking, emergency in character, and a recording thereof. Prior to the de-energization of these coils, however, contact 70 of lamp 65b will have been opened, so that the going out of that lamp indicates the immediate approach of the braking controlled by coil 34 when the latter is de-energized by opening contact 68. This figure, therefore, illustrates a case of simple speed control.

In Figs. 37 and 37A there is shown an additional circuit in series with the coil 34 by way of a contact 71, controlled by the Bourdon tube 46, and a brush contact 72 located at a fixed distance from and to the left of contact 70, that is in the direction of the movement of the cylinder when the governor is speeded up. Associated with the contact 72 and in intermediate position between said contact and contact 70, is a brush contact 73 connected through an additional lamp 65c with the upper contact of contact arm 64. This lamp is therefore also in shunt to the coil 34. It appears in the remaining figures of this series and its going out serves as a warning of the opening of contact 72. If the Bourdon tube is connected with an engine brake cylinder, when sufficient air pressure is delivered to the latter, contact 71, open in Fig. 37, will be closed as in Fig. 37A, by the straightening of the tube, and the final breaking point of the circuit of the coil 34 will be shifted from contact 68 to contact 72. Hence the coil 34 will become de-energized only at high speed, or, when, at some intermediate speed the pressure in the brake cylinder is released and contact 71 opened. As explained in the section devoted to the E—T equipment, the engineer brake cylinder pressure is not necessarily the same as that in the trailing equipment and may be exerted quite independently through the engineer's independent valve. Consequently, if reliance is placed on such a tube so connected alone, the automatic braking controlled by coil 34 could be easily shifted from the low speed limit, as fixed by contact 68, to the high speed limit as fixed by contact 72, without the train as a whole being properly braked. This might be done by making an application on the engine alone, or by holding the engine brakes while releasing the train brakes.

In Figs. 38 and 38A the single pressure control of contact 71 just discussed, is replaced by control by means of differential pressure in the Bourdon tube 46 and its air tight casing 47 connected respectively, as in Figs. 1 and 2, to the application of cylinder pipe AC and the distributing valve release pipe DVR. As before stated the straightening of the tube will, in this structure, be dependent upon an increase of pressure in the tube (and thus in the application cylinder pipe AC) over the pressure in the casing (and thus in the distributing valve release pipe DVR), which condition exists only when the entire train is braked. In Fig. 38, with the contact 71 open, the circuit of the coil 34 is under control of the low limit contact 68 while in Fig. 38A, with the contact 71 closed, it is under control of the high limit contact 72. This structure, therefore, makes the shifting of the speed limit from low to high dependent upon the braking of the entire train.

But there are still further steps necessary to provide brake control such as will meet the requirement of minimum interference with the engineer when properly exercising his functions, which requirements necessitate not simply a shifting from a fixed low to a fixed high limit, even under the conditions described in the preceding paragraph, but rather a progressive shifting according to the amount of braking air pressure applied or to the retardation effected thereby. It, therefore, becomes necessary to replace the fixed high limit contact by a movable one, responding in degree to the amount of braking; that is, to combine in a cooperative function two variables, train speed and braking effort, the increase of one tending to open the circuit of the controlling coil 34, and the increase in the other offsetting this in corrective fashion, and vice versa. This method is illustrated in Figs. 39 and 39A, in which the high limit contact 72, and the corresponding contact 73 for the warning lamp 65c, are moved in the proper direction (to the left) by an application of the brakes to the entire train, through the medium of a spring-opposed piston 48 in a double pressure cylinder, connected to the right of the piston with the application cylinder pipe AC, and to the left of the piston with the distributing valve release pipe DVR. The contacts are shown at the low limit in Fig. 39, the position assumed when the entire train is not braked, and at a higher limit in Fig. 39A, a position assumed when the brakes are applied to the entire train.

There is still a further development to avoid the possibility of leakage at the end of the piston, and that is, while retaining the variable movement of the high limit contacts, to effect such movement directly and solely from an engine brake cylinder in opposition to a fixed pressure, and to reintroduce into the circuit of the high limit contact 72 the contact 71 controlled by the Bourdon tube and casing as shown in Figs. 38 and 38A. Fig. 40 shows this arrangement with the brake pressure off and contact 71 open, thus disconnecting the circuit of the control coil 34 from the variable high limit contact 72; while Fig. 40A shows the brake pressure on and contact 71 closed, thus putting the contact 72 into said circuit. The construction of these figures is the one shown in the ensemble drawings of Figs. 1 and 2.

Figs. 41, 41A and 41B illustrate a construction identical in resultant functioning with that of Figs. 40 and 40A, and embodying the same elements thereof except that instead of controlling the throwing in of the variable high limit contact 72 by the Bourdon tube and casing combination with its single contact, two reversely acting contacts 71a and 71b are used in series, each controlled by an independent Bourdon tube connected to the application cylinder and distributing valve release pipes respectively. In Fig. 41 these contacts are both shown closed due to a brake application, that is, with pressure in the application cylinder pipe alone, while in Figs. 41A and 41B one of the contacts is shown open, because of an equality of pressure in the two tubes, atmospheric pressure being indicated in Fig. 41A and positive pressure in Fig. 41B.

It will be seen, in the diagrams above described, that if either contact arm 62 or 63 is closed, the circuit of the coil 34 is completed independently of the path through the speed control contacts, and that a train equipped with a control system such as indicated in the diagrams is not then subject to the limitations imposed by the speed contacts. If the circuits by way of contact arms 62 and 63 are both destroyed, however, the limitations imposed by the speed contacts come on and will persist until either one of the contact arms 62 or 63 is closed. The change in the conditions of the contact arms can obviously be effected in many ways, as for instance by currents dynamically generated in proper circuits on the train, as is shown in the aforesaid patent. It is preferred, however, in the completed system forming the subject matter of this invention, to use application and reset magnets located along the way and acting through receivers located on the train to open circuits controlling the contacts, and in this manner control the braking of the train in accordance with the track and traffic conditions in advance thereof.

With this preliminary understanding of the combined speed and braking control of the energizing circuits for the controlling coil of the automatic emergency control valve, the actual wiring used to accomplish the coordinated contact of the service and emergency control coils and to provide for restoring the system to its normal condition when it has been moved therefrom by the reception of a braking impulse will now be described.

LOCOMOTIVE CONTROL CIRCUITS

*Preferred wirings.* (*See Figs. 1, 2 and 2A*)

These circuits comprise many parts already referred to and described.

The circuit of the service control coil 33 can be traced as follows: From the positive side of battery 43 through switch 42, a current limiting resistance 76, coil 33, contact of an arm 75, and back to the negative side of battery 43. The current limiting resistance 76 is shunted by a contact arm 77, when the arm is moved by a decrease of pressure in the Bourdon tube 45, which is connected, as before stated, to the pipe connecting the pilot valve 6 with the port of the automatic service brake valve 15.

The circuit of the emergency control coil 34 and of the recorder coil 61 which is in series therewith, has a plurality of branches, all in parallel with each other.

All of these circuits go from battery 43 through switch 42, current limiting resistance 76, emergency coil 34, recorder coil 61 and from there branch as follows: The first branch goes through the upper contact of arm 62 to the negative side of battery 43. The second branch goes through the lower contact of arm 63 to negative battery. The third branch goes through a manual circuit breaker 88, low limit speed contact 68 and brush contact 69 to negative battery. The fourth branch goes through manual circuit breaker 88, Bourdon tube, contact 71, high limit speed contact 72, brush contact 69, back to battery.

The circuits of the three indicating lamps can be traced as follows:

The circuit of the lamp 65—a goes from the battery 43 through switch 42, contact arm 64 and lower contact thereof, through lamp 65—a back to negative battery.

The circuit of lamp 65—b goes from the battery 43 through switch 42, contact arm 64 and upper contact thereof, through lamp 65—b, speed governor brushes 70 and 69 back to negative battery.

The circuit of lamp 65—c goes from the battery 43 through switch 42, contact arm 64 and upper contact thereof, through lamp 65—c, speed governor brushes 73 and 69 back to negative battery.

The lamps 65—a, 65—b and 65—c may be respectively green, purple and red.

The arm 75 forming part in the circuit of the service control coil 33 is governed by a service relay 78; while the arms 62 and 63, forming part of circuits of the emergency control coil 34, are governed by an emergency relay 79 and a reset relay 80 respectively.

The circuit of the service relay 78 can be traced as follows:

From battery 43 through switch 42, application receiver contact 57, manual circuit breaker 86, relay coil 78 from which point it branches in two, one branch going through a contact arm 82 of the relay 78 back to the negative battery, while the other branch goes through a contact arm 81, controlled by the Bourdon tube 45 (closing upon a decrease of pressure in the tube) and through an upper contact of the reset relay arm 63, back to negative battery. The last named branch is the actuating branch through which the relay is energized, while the first named branch is a maintaining branch which is closed when the relay is energized, but is opened when it is de-energized.

The circuit of the emergency relay 79 can be traced as follows: From battery 43 through switch 42, application receiver contact 57 and relay 79 from where it branches in two, one branch going through an arm 84 of relay 79 to the negative battery, while the other branch goes through a lower contact of arm 83 of the emergency relay, back to negative battery. This latter branch is an actuating branch to energize the relay 79, while the first branch is a maintaining branch held closed when the relay is energized but opened when it is de-energized.

The circuit of the reset relay 80 includes the reset receiver contact 58 and can be traced as follows: From battery 43 through switch 42, reset receiver contact 58, manual circuit breaker 87, relay 80 from where it branches into two branches, one being an actuating branch and goes through the contact of an arm 85, closed when the emergency relay 79 is energized and through back contact of arm 75 when the service relay 78 is de-energized back to battery; and the other a maintaining branch through an upper contact of the arm 83, back to battery, the last named branch being open when the relay 80 is de-energized but being held closed when it is energized.

From the above it will be noted that:

(a) The circuits of the service and emergency relays 78 and 79 are broken whenever the application receiver contact 57 is open, causing them to drop their contact arms 82 and 75, and 84, 62 and 85. The dropping of arm 75 by the service relay opens the circuit of the service control coil 33, thereby (on the opening of the service control valve 8) initiating a primary automatic braking. On the other hand, the dropping of the contact arm 62 by the emergency relay will not open the circuit of the emergency control coil 34 unless, while that arm is dropped, the other branches of the circuit are broken, one branch by the energization of the reset relay and the others due to the speed of the train.

(b) The circuit of the service relay 78 once broken cannot be restored unless the reset relay is in an energized condition while the service relay actuating circuit is closed at contact arm 81, but when restored it is independent of the circuit through that contact arm.

(c) The circuit of the emergency relay 79 once broken cannot be restored unless the reset relay is de-energized, but when restored is independent of its actuating circuit controlled by that relay.

(d) The circuit of the reset relay once broken cannot be restored unless the emergency relay is in an energized condition and the service relay is in a de-energized condition simultaneously, but when restored is independent of its acuating circuit controlled by these relays.

From the above statement of the interlocks existing between the several relay circuits, it will be seen that the making of the emergency relay circuit when broken is not dependent on any other relay being energized; that the making of the reset relay circuit is dependent on the simultaneous energization of the emergency relay and the de-energization of the service relay; and that the making of the service relay circuit is dependent upon the energization of the reset relay and the absence of pressure in the Bourdon tube 45. Thus with all of the relays de-energized if the application and reset receiver contacts are closed (as is their normal condition), the emergency relay will be first energized and will be followed by the energization of the reset relay, and thereafter by the energization of the service relay if pressure is absent in the said Bourdon tube.

A manual circuit breaker 86 is interposed in the circuit between the application receiver contact 57 and the service and emergency relays 78 and 79; a similar breaker 87, in the circuit between the reset receiver contact 58 and the reset relay 80; and a similar breaker 88, between the lower contact of arm 63 and the speed limiting contacts. All of these manual circuit breakers are preferably mounted in places accessible to the engineer only from the ground or under other restrictive conditions.

General operation

As has been heretofore described, the present system is similar to that of the aforesaid patent in the primary braking initiated on passing an active distant track magnet, and certain points of departure from the system of that patent reside in the flexibility of control on and after passing an active home track magnet and in effecting a reset of the control apparatus from the track.

The reception of a primary braking impulse creates on the locomotive (whether the primary braking itself be nullified or not) a condition which persists until another active track magnet is passed, and which limits the speed at which the locomotive can be operated on and after passing another active application (distant or home) track magnet prior to passing an active reset magnet, without a secondary automatic braking not subject to defeat by the engineer. The speed which will bring about such secondary braking is controlled by the speed limit branches of the emergency control coil. With the high speed branch open, as is the case when the train is unbraked, the highest speed at which the locomotive can proceed without receiving a secondary braking of an emergency character is determined by the setting of the contact 68 in the low speed branch. Such speed will hereafter be termed "the control speed" and with any given setting of the contact is fixed and does not vary. The high speed branch when closed removes the limitation of speed set by the low speed branch. Its closure, however, is dependent on the train as a whole being braked and upon the braking pressure being so proportioned to the speed of the train as, under normal conditions, to bring it to a stop in a desired distance. Furthermore, by preference, the movements of the cylinder 67 and the contact 72, under the influence of speed and braking pressure, are such that at some selected speed, say for example 45 miles per hour, the cylinder will move away from the contact regardless of the braking pressure and thus open the high speed branch of the emergency control coil. The restrictions so imposed will be hereinafter referred to as "coordinated speed and braking limitations".

Furthermore, from the above description of the circuits embraced in the control system of this invention, it is apparent that the resetting thereof on passing an active reset track magnet is effected whether the apparatus has passed a single active application track magnet or a succession of active application track magnets, but that it is without effect upon the relays in the condition illustrated in Fig. 2A, which may be called the normal condition of the control system.

Figs. 42 to 59 have been prepared with a view of making clear the various conditions of the numerous parts of the control system in placing the same in condition for operation, and of showing the operation thereof under sufficient of the numerous conditions which may arise in practice to illustrate the operation of this invention. It is believed that with a clear understanding of the operations illustrated the invention may be comprehended without a detailed consideration of all of the conditions which may arise in practice, a discussion of which would prolong this specification to undue limits.

In these diagrams active or completed circuits are represented by full lines and inactive or broken circuits by dotted lines.

Starting (Figs. 42 to 46)

The intended condition of the control system of this invention on a locomotive idle in the roundhouse is with the main switch 42 open and the service and emergency control valves 8 and 20 locked in their closed position by cams 41 41, here shown as effected by a manually operated device, although it can be effected automatically. The service and emergency control coils 33 and 34, and the service, emergency and reset relays 78, 79 and 80 are accordingly all de-energized. The application and reset receiver contacts 57 and 58, however, are in their closed positions. Assuming that the brake system of the locomotive is properly supplied with pressure air, the contacts controlled by contact arms 77 and 81 and the contact 71 will probably all be open. With the apparatus in this condition the following steps occur in bringing the same into its normal condition for service.

(a) On closing the main switch 42 the service and emergency control valves are released by the cams and become subject to their respective control coils. The closing of the main switch energizes the emergency relay through the lower contact of arm 83, and the relay is thereupon held energized by the closing of its own maintaining circuit at arm 84. The energization of the emergency relay completes one of the series circuits of the emergency control coil 34 at arm 62, the series circuits through arm 63 and through the speed contact 68 being already closed. The circuit of the service control coil 33, however, is broken at the upper contact of arm 75, so that the service control valve opens. The engineer's main valve will therefore be thrown to lap position, opening the pilot valve 6 and thereby effecting an automatic service application. The consequent release of pressure in the Bourdon tube 45 causes the contact arms 77 and 81 to close on their cooperating contacts: The parts will now have assumed the position shown in Fig. 42.

(b) The circuit of the reset relay 80 being thus closed at arm 85 and the lower contact of arm 75, the reset relay picks up its contact arms, establishing its own maintaining circuit at arm 83 and closing the upper contact of arm 63, as is shown in Fig. 43.

(c) The circuit of the service relay 78 being now closed at contact arm 81 and at the upper contact of arm 63, that relay picks up its maintaining arm 82, and also closes the circuit of the service control coil 33 at arm 75. The parts are now in the position shown in Fig. 44.

(d) The engineer now turns his main valve to a charging position, thereby permitting the pilot valve 6 to close, whereupon pressure air will be admitted to the Bourdon tube 45, and the contacts controlled thereby will be opened. Furthermore, more pressure in the Bourdon tube 46, which has been present in the cycle of Figs. 42 to 44, is released by this movement of the main brake valve and contact 71 is reopened. The parts are now in the position shown in Fig. 45.

(e) The circuit of the reset relay 80 is now manually opened by means of the key 87 (see Figs. 2 and 2A), and the contact arms governed by that relay drop, whereupon the said key is allowed to close and the parts assume the position shown in Fig. 46 and also in Figs. 1, 2 and 2A. This is termed the "normal position" in that it is the one which exists when a locomotive equipped with the preferred and completed form of this invention is ready for service. It is signalized by the steady glow of the green lamp 65a, the circuit of which is completed at the lower contact of arm 64.

With the relays and circuits controlled thereby in normal position several different conditions of the speed control circuits may exist, dependent upon the speed of the train, for it is obvious that with an increase of speed the contact cylinder 67 is moved toward the left by the speed governor and that this movement may continue until the said cylinder has broken contact with both the low and high speed contacts 68 and 72. No braking is effected thereby because the circuit of the service control coil 33 is closed at contact arm 75 and two of the series circuits of the emergency control coil 34 are closed, one at contact arm 62 and the other at the lower contact of arm 63.

As above indicated, with the parts in the condition just described, if the train passes an active application track magnet an automatic primary braking will be initiated, the sequence of operation of which will next be discussed. But it should be here noted that the character of the braking effected by the control system of this invention and the number of automatic brake applications made are dependent both on track and train conditions, i. e., are dependent upon the danger conditions along the right-of-way and the speed of the train and the manner in which the brakes thereon are being applied while such danger conditions exist. It will thus be seen that the system operates differently under different conditions but each of such operations is a proper one to meet the conditions from a view-point of safety. This matter will be further treated after the discussion of the automatic primary braking.

*Primary automatic braking (Figs. 47 to 50)*

If a locomotive with the parts in normal position such as shown in Fig. 46 (except with all speed contacts open by reason of the fact that the unbraked train is running at high speed) passes over an active distant track magnet, the sequence of operation is as follows:—

(a) The application receiver contact 57 is opened, thereby breaking the circuits of the service relay 78 and emergency relay 79, causing them to drop their contact arms. The dropping of the arm 75 by the service relay de-energizes the service control coil 33, but the emergency control coil 34 is not at this time de-energized, as its path through the lower contact of arm 63 is still made. The parts thus assume the position shown in Fig. 47.

(b) Immediately the application receiver passes beyond the application track magnet, contact 57 closes and the emergency relay 79 is again energized by its circuit through the lower contact of arm 63, the parts assuming the position shown in Fig. 48.

(c) The reset relay 80, due to the closure of its circuit thus effected at arm 85, is then energized, and the green light goes out, as is shown in Fig. 49.

(d) The de-energization of the service control coil 33, as shown in Figs. 47, 48 and 49, results in the opening of the service control valve 8 and the admission of air to the oil reservoir 4, with a consequent blast of the whistle 7 and oil pressure on the motor pistons 2 2.

The engineer warned by the going out of the green lamp and the blast of the whistle, may forcibly restrain consequent movement of his main valve and thus prevent automatic braking. If unrestrained, however, the engineer's main valve is moved to lap position and the pilot valve 6 is opened as before described. A primary automatic braking is then effected, the amount of which is dependent upon the setting of the automatic service brake valve 16, and its rate upon the setting of the regulating valve 19. The opening of the pilot valve also releases the pressure in the Bourdon tube 45 so that the contacts controlled thereby are closed. As the actuating branch of the service relay 78 is thus closed at arm 81 and was closed at the upper contact of arm 63 when the reset relay was energized, the service relay becomes active and picks up its contact arms, thereby again closing the circuit of the service control coil 33, the resistance 76 therein being short-circuited by the contact arm 77. The service control valve, therefore, closes.

The automatic braking effected as above described, creates, in accordance with the principles before explained, an excess pressure in the Bourdon tube 46 over that existing in its casing 47, which results in closing the contact 71. The said braking further places pressure upon the piston 48, and thereby shifts the high speed contacts 72 and 73 to the left. Unless the speed of the train is very high, at least one of the speed control branches of the emergency control coil will be closed and at least one of the lamps 65b and 65c will be lighted.

Fig. 50 shows the parts in the position thus assumed on a primary automatic braking with a speed and with a braking such that only the high speed branch of the emergency control coil is closed and the red lamp 65c is lighted.

The train is now subjected to a service braking which, if left undisturbed, so reduces the speed that it will be slowing down under control when it reaches a home track magnet in advance of the distant track magnet by which the cycle shown in Figs. 47, 48, 49 and 50 was initiated. Such a primary braking having been initiated at the distant track magnet the further action of the system depends upon whether the train next passes an active reset track magnet or an active application track magnet. If the latter, the action varies with different conditions existing on passing the same and with the manner in which the engineer handles his train both at the time of passing the said magnet and thereafter until an active reset track magnet is reached. Several of the possible cycles will now be considered.

*The train speed having been properly reduced in response to an impulse received from an active distant track magnet, the engineer releases his brakes. (Fig. 51)*

When the train speed has been properly reduced to a safe limit, i. e., to the control speed or thereunder, by application of the brakes effected as shown in Figs. 47 to 50, or supplemented by manual operation, the low speed limit contacts 68 and 69 are again made, lighting the purple lamp 65b. Being thus informed that the speed has been properly reduced, the engineer may release his brakes by returning his main valve to a charging position. This permits the pilot valve 6 to close, restores pressure in the Bourdon tube 45, opens contact 71 of the high speed circuit of the emergency control coil and effects a movement of the high speed contacts 72 and 73 to their right hand positions, the parts being now in the position shown in Fig. 51.

*Reset. (Fig. 52)*

If the engineer has handled his train properly when releasing the brakes, as shown in Fig. 51, it is probable that the home track magnet in advance of the distant track magnet by which the cycle shown in Figs. 47 to 50 was initiated, will be de-energized, and that the reset track magnet cooperating therewith will be energized when the locomotive passes thereover.

(a) Under these conditions no braking impulse will be received at the home track magnet, but on passing over the active reset track magnet the circuit of the reset relay will be broken at the reset receiver contact 58, thereby causing that relay to drop its arms 83, 63 and 64, with the consequent cutting off of the purple and red lamps and the lighting of the green lamp, and the closing of the series circuit of the emergency coil 34 at arm 63. The condition at the instant of passing over the reset track magnet is shown in Fig. 52.

(b) Immediately upon passing beyond the reset track magnet the contact 58 is again made but as the actuating circuit for the reset relay is now broken at the lower contact of arm 75 the relay will not pick up and all of the relays and circuits controlled thereby will again be in their normal position. If thereafter another application impulse is received, the cycle illustrated in Figs. 47 to 50 will be repeated.

It will be noticed in comparing Figs. 46 and 50 (or 46 and 51) that the impulse received in passing over an active application track magnet, with the relays and circuits controlled thereby in the condition of Fig. 46, ultimately results in closing the circuit of the reset relay and thus opens the branch of the emergency control coil circuit through arm 63. The emergency control coil is left, therefore, under the control of the branch governed by the emergency relay and the speed control branches. An opening of the application receiver contact 57 while the parts are in the position shown in Figs. 50 or 51 will accordingly shift the entire control of the emergency control coil to the speed branches of the circuit thereof, so that if both of said speed branches be then broken before either of the branches through arms 62 and 63 are again completed a secondary brake application will be effected by the emergency control valve. From this it follows that a secondary braking effected at an active home track magnet will be dependent on the factors (i. e. the speed of the train and the braking effected thereon) which determine the condition of the speed branches of the emergency control coil.

*Repetition of primary automatic braking on passing an active home track at or under control speed, the brakes having been released after primary automatic braking. (Figs. 51 and 53)*

If, following the release of the brakes as shown in Fig. 51, the locomotive before passing an active reset track magnet passes an active application track magnet at the control speed or thereunder, the opening of the application receiver contact 57 will de-energize the service and emergency relays, placing the parts in the position shown in Fig. 53, which assumes that the speed is just below the control speed so that both the purple and red lights 65b and 65c have gone out. Immediately on passing beyond the said active application track magnet the application receiver contact 57 closes. The closing of this contact, however, does not restore the circuits of the service or emergency relays, the actuating circuit of the service relay being open due to pressure in the Bourdon tube 45, and that of the emergency relay being open at the lower contact of arm 83. The circuit of the service control coil 33 having been opened at the upper contact of arm 75 a repetition of the primary automatic braking takes place. This releases pressure in the said Bourdon tube and results in re-energizing the service relay and hence the service control coil. The series circuit of the emergency control coil 34 through the low limit speed contact 68 has throughout been complete so that no automatic secondary braking is effected.

*Secondary automatic braking on passing an active home magnet within the coordinated speed and braking limitations above control speed, the brakes having been released after primary automatic braking. (Figs. 51 and 54)*

If after primary automatic braking at the distant track magnet, instead of passing a subsequent active application track magnet at or under the control speed, as in the case last considered, the train with brakes released passes the second track magnet above control speed, the condition illustrated in Fig. 54 will occur. Under such conditions the low limit speed branch of the emergency control coil will have been broken by the shifting of the contact cylinder 67 to the left and the high speed branch will at least be broken at contact 71. The dropping of the arms of the service and emergency relays will, therefore, de-energize both the service and emergency control coils, their valves will lift and an emergency brake application will be effected. A record thereof will be effected due to the de-energizing of the recorder coil 61 simultaneously with the de-energizing of the control coil 34.

*No secondary automatic braking on passing an active home track magnet within the coordinated speed and braking limitations above the control speed, the brakes not having been released after primary automatic braking. (Figs. 50 and 55)*

If the locomotive passes an active application track magnet at the speed assumed in considering Fig. 54, but with the brakes applied at the distant track magnet still on, as in Fig. 50, the conditions illustrated in Fig. 55 will occur. As there shown, the high speed circuit of the emergency control coil (which was broken under the conditions illustrated in Fig. 54 at contacts 71 and 72) will be completed by the air conditions created by the braking, the red light will be lighted as in Fig. 51 and no secondary automatic braking occurs. Although the service control coil is de-energized and the pilot valve opened no repetition of the primary automatic braking is effected because the automatic service valve 15 is closed by the continuance of the braking effected at the distant track magnet. For this same reason there will be on change of air conditions in the Bourdon tube 45, and the service relay will accordingly pick up its contact arms to close its own maintaining circuit and the circuit of the service control coil immediately on the closure of contact 57 on passing beyond the aforesaid track magnet. The emergency relay remains de-energized because its actuating circuit is open at the lower contact of arm 83.

*Secondary automatic braking on passing an active home track magnet above the coordinated speed and braking limitations, the brakes not having been released after primary automatic braking. (Figs. 50 and 56)*

If the locomotive with the brakes applied at the distant track magnet still on as in Fig. 50, passes a subsequent active application track magnet above the maximum speed provided for by the coordinated speed and braking control contact 72, the conditions illustrated in Fig. 56 will occur. All branches of the emergency control coil circuit will be open and a secondary automatic braking will be effected through the automatic emergency brake valves, the automatic service brake valve not cooperating in the braking for reasons stated in the discussion of Figs. 50 and 55. It will be noted, however, that a signal is given to the engineer by the going out of the red light 65c prior to exceeding the maximum speed limit, so that he is warned of the oncoming of this secondary automatic application and may reduce the speed of his train to avoid the same if desired. It will be further noted the secondary automatic braking is recorded by the deenergizing of the coil 61 simultaneously with coil 34, as in the case of Fig. 54.

*The zone between an active home track magnet and an active reset track magnet*

In the cases before considered, it has been assumed that the locomotive has passed the second active application track magnet at the speeds indicated by the contact cylinder 67 and with or without brakes applied as indicated by the air condition in the two Bourdon tubes 45 and 46 and the position of the piston 48. Automatic braking under these conditions has been discussed as of the time of passing the said second active application track magnet. Illustration will now be given of conditions arising in the zone between the said active track magnet and an active reset track magnet and of the reset of the control apparatus on passing the later.

*A primary braking impulse having been received at a distant track magnet, the engineer prevents a braking application on passing an active home track magnet and then attempts to resume speed. (Figs. 53 and 57)*

Suppose a condition such as shown in Fig. 53 has been established on passing an active home track magnet with the initiation of automatic braking as described in the discussion of that figure and that the engineer holds his main valve handle at a charging position, thereby preventing the application of the brakes. Under such a supposition, the application receiver contact 57 may close without effecting a closure of the service relay circuit, for the actuating circuit thereof will be held open at arm 81 by pressure in the Bourdon tube 45. The emergency relay also remains de-energized as its actuating circuit is held open at arm 83. No braking application will be effected so long as the speed of the train remains at or under control speed, for the emergency control coil circuit will have a completed branch through the low limit contact 68, and although the service control coil is de-energized, no braking will be effected thereby because the engineer has prevented the opening of the pilot valve by holding his main brake valve handle in a charging position. If, however, the engineer who is thus proceeding, after passing the said active home magnet with his brakes intentionally held off, should attempt, prior to the reception on the locomotive of a clearing impulse at an active reset track magnet, to run above control speed, the low speed branch of the emergency control coil circuit will open as shown in Fig. 57, de-energizing the coil and thereby effecting an emergency braking, recorded for reasons heretofore stated.

*Primary automatic braking undisturbed on passing an active home track magnet within the coordinated speed and braking limitations above control speed, the engineer thereafter releases his brakes. (Figs. 55 and 57)*

If, under the conditions assumed in the discussion of Fig. 55, the engineer after passing the active home track magnet and before passing an active reset track magnet releases his primary automatic braking the condition shown in Fig. 57 ensues, i. e., the red light goes out, the high speed branch of the emergency control coil is broken at least at contact 71, and a recorded secondary automatic braking is effected.

*Primary automatic braking undisturbed on passing an active home track magnet within the coordinated speed and braking limitations above control speed, the engineer thereafter releases his locomotive brakes only. (Figs. 55 and 58)*

As has been pointed out in connection with Fig. 55, a locomotive under certain conditions can pass an active home track magnet within the coordinated speed and braking limitations without an automatic braking being effected. It has also been pointed out in the discussion of that figure that while on passing beyond such track magnet the service relay will be energized, the emergency relay will remain de-energized. As long as either of the speed branches of the emergency control coil remain closed no secondary automatic braking will be effected and the train will slow down under the braking previously effected by the service control coil. If, however, the engineer attempts to speed up, not by releasing the brakes on the entire train by the main valve, as was discussed in connection with Fig. 57, but by entirely or partially releasing the engine brakes solely by movement of his independent valve, he will destroy the inequality of pressure in the Bourdon tube 46 and its casing 47, thereby opening the high speed branch of the speed control circuit. With this branch open, if the speed is then, or thereafter goes, above the control speed, as set by the low limit contact 68, the emergency control coil 34 and the recorder coil 61 will be deenergized and a recorded secondary automatic braking will be effected, as illustrated in Fig. 58.

*Release of secondary automatic braking between an active home track magnet and an active reset track magnet*

The de-energization of the emergency control coil, effected as above described, cannot be defeated in its action, and a secondary automatic braking will inevitably result therefrom, which under ordinary conditions of practice will result in stopping the train. When, as a result of that braking, the speed has been reduced to the control speed so that the low speed branch of the emergency control coil is closed at contact 68, the emergency control coil will be re-energized. When the reduction of pressure attendant upon the braking has been completed the automatic emergency brake valve will close. The engineer by throwing his main brake valve into a charging position may then release the brakes and the train can proceed at or under control speed. Under these conditions the emergency relay will remain de-energized, and any attempt to go above control speed prior to passing an active reset track magnet will result in a repeated de-energization of the emergency control coil, with the resultant secondary automatic braking. Thus the engineer is, after a secondary automatic braking, permitted to proceed with his train under control to the succeeding active reset track magnet.

*Reset after passing consecutively two active application track magnets. (Fig. 59)*

As has been previously indicated the purpose of the reset effected from the track is to restore the service, emergency, and reset relays and the circuits controlled thereby to normal position, illustrated e. g. in Figs. 2A and 46. It has been seen that the reset relay, normally de-energized is energized on passing over an active application track magnet and remains energized until an active reset track magnet is passed. Furthermore, that the emergency relay, normally energized, is not affected on passing over the first of a plurality of consecutive active application track magnets, but on passing over the second thereof is de-energized and remains so until the reset relay is energized. Furthermore, that the service relay, normally energized, is de-energized on passing over the first of the said application track magnets, and that whether or not it subsequently becomes energized depends on release of pressure in the Bourdon tube 45 to effect closure of its actuating circuit at contact arm 81. If it has been reenergized by reason of an application of the brakes between the two consecutive application track magnets, with the consequent release of pressure in the said Bourdon tube, it will be again de-energized on passing the second of the said application track magnets, and its subsequent energization depends upon release of pressure in the said Bourdon tube as before.

From the above discussion of the numerous positional views it is apparent that under ordinary conditions of practice the service relay will be reenergized at the time the locomotive reaches the active reset track magnet. On passing the latter the reset receiver contact 58 is momentarily opened, as shown in Fig. 59, de-energizing the reset relay and completing the actuating circuit of the emergency relay at the lower contact of arm 83. This causes the emergency relay to pick up its contacts and restore its own maintaining circuit. The de-energization of the reset relay also completes the circuit of the green light 65a at the lower contact of arm 64, so that the three relays and the circuits controlled thereby are now all in normal position.

The only circumstances under which the service relay is de-energized on passing the active reset track magnet under the conditions now considered are those obtaining when the locomotive passes a second consecutive active application track magnet and continues thereafter unbraked. These circumstances occur only when the engineer has purposely taken the control of the train away from the automatic system and is handling the train properly. It will be seen that so long as the service relay is de-energized the service control coil 33 is also de-energized, and the path is open from the main reservoir to the oil reservoir 4 and thence to atmosphere through the whistle 7. Obviously, no engineer who is handling his train according to the demands of this system will willingly permit his main reservoir to run down as just indicated. Accordingly, while it is possible to forestall primary automatic braking by preventing a movement of the engineer's main valve handle to lap position, inasmuch as the said handle can be moved at once from that position to a charging position after an insignificant braking, the latter course will be followed, for, by permitting such a braking or by manually effecting such a braking after the receipt of the braking impulse the pressure is relieved in the Bourdon tube 45 while the reset relay is active and the service relay picks up, closing the circuit of the service control coil and causing its valve to close the passage between the main reservoir and the whistle 7, and the pressure on the engineer's brake handle is also released.

While it will be understood from the above that it is very unusual that the service relay be de-energized on passing the active reset track magnet, if so the reset is effected in the following manner: Upon passing the said active reset track magnet the reset receiver contact 58 is opened de-energizing the reset relay and closing the actuating circuit of the emergency relay at the lower contact of arm 83. The emergency relay on picking up its contact arms closes the energizing circuit of the reset relay at arm 85 and thus completes the said circuit as the lower contact of arm 75 is made. The reset relay being thus energized closes the actuating circuit of the service relay at the upper contact of arm 63 and opens the circuit of the green lamp at the lower contact of arm 64. The engineer being thus advised of the condition of his control system may at any time thereafter make a slight application of the brakes, relieving pressure in the Bourdon tube 45 and completing the circuit of the service relay at contact arm 81. All relays are thus energized, the parts being in the position illustrated in Fig. 44 (except possibly as to the speed contacts which do not enter into the resetting). The engineer at once moves the handle of his main brake valve to a charging position, as is indicated in Fig. 45 and opens the switch 87, whereupon the parts assume the normal position indicated in Fig. 46.

While the resetting of the air parts has been referred to in the section of this specification devoted to a discussion thereof, it will now be briefly referred to.

The service control valve 8 reseats and assumes normal position as a result of the energization of the service control coil 33. With the control valve thus reseated, the motor pistons may be moved to their rearward position, and there remain, by a manual movement of the handle of the main brake valve to release position.

The pilot valve 6 closes on release of pressure on its actuating arm 5, which release of pressure is effected on the said movement of the handle of the engineer's main valve from lap toward a charging position.

The automatic service brake valve 15 automatically reopens on recharging the brake pipe by reason of pressure air thus admitted to the lower side of its diaphragm, the pilot valve having been previously closed to prevent the escape of said pressure air.

The supply valve 10 opens by reason of the admission of pressure air to the upper side of its diaphragm on recharging the brake pipe after the pilot valve 6 has been closed and the automatic service brake valve has been opened.

The emergency control valve 20 automatically closes as a result of energizing the emergency control coil 34.

The automatic emergency brake valve 21 automatically closes, subsequent to the closing of the emergency control valve 20, under action of the spring 24, which, it will be remembered, is so adjusted as not to effect closure until with the brake pipe fully charged, an emergency application has been effected.

The auxiliary emergency brake valve 25 is automatically closed, after the closing of the emergency control valve 20 and the automatic closing of the automatic emergency valve 21, on recharging the brake pipe by pressure air admitted through the hollow stem of the last named valve and the vent in the piston 22.

It is thought that the operation of the remaining air parts i. e., the Bourdon tube 45, the Bourdon tube 46 and its enclosing casing 47 and the piston 48 has been sufficiently presented in the discussion of the control system and need not be repeated.

*General methods of operation and Fig. 61*

From the above description of the circuits as a whole and the discussion of special cases, it will be seen that this system is characterized by the following features:

(a) When a locomotive equipped therewith passes an active distant track magnet just before entering a home block, an unrecorded service brake application is initiated and indicated by the disappearance of the normal green light, the blowing of a whistle and the operation or an attempt at operation of the engineer's main brake valve. If the engineer is attending to his duty, he may forestall actual braking of the train by releasing his brakes in response to a change in signal indications. The primary automatic braking, which is service in character, may be augmented or diminished manually at will. The initiation of primary automatic braking will, when the speed of the train is at or below control speed, be accompanied by the lighting of both the purple and red lamps; if above the control speed, but within the coordinated speed and braking limitations, by the lighting of the red lamp only; if above the coordinated speed and braking limitations, all lights will be out. These speeds indications give affirmative warning of the manner in which the train must be handled to avoid automatic braking on passing an active home track magnet.

(b) If, when getting a second impulse at an active home track magnet, the locomotive is running unbraked below the control speed, say 20 miles an hour, as indicated by the purple lamp, and so continues until it reaches an active reset track magnet, there will be no secondary automatic braking, although a repetition of the primary automatic braking will be initiated on passing the said home track magnet, which primary braking may likewise be promptly released by the engineer; the conditions will also be automatically set for a possible secondary automatic braking, emergency in character.

(c) If, when getting the second impulse at an active home track magnet, the locomotive is running above control speed but within the coordinated speed and braking limitations, say at or under 45 miles an hour, and the train as a whole is being properly braked under a service application meeting its speed requirements, the secondary automatic braking will not then take place, but if the brakes are released locally or as a whole before the train has been reduced to control speed, a recorded secondary automatic braking, full service or emergency in character, will take place. Such secondary braking cannot be released, however, until it has completed its function no matter how short the initial impulse or what the engineer attempts to do with his brake handles. When the speed of the train has been reduced by service braking to control speed the brakes may be released, but if the speed is again increased above control speed before passing an active reset track magnet a secondary automatic braking will take place. If on the other hand the train is not being properly braked on passing the active home track magnet above control speed an uncontrolled secondary automatic braking will come on which cannot be released until its function has been completed.

(d) When passing over an active reset track magnet the locomotive control relays will be restored to normal position ready for response to the next active application track magnet, no matter whether there have been one or two application impulses received; but if none has been received the reset impulse will have no effect on the apparatus. The reset restores only the control relays and circuits controlled thereby to normal and has no effect on the brakes.

(e) If, however, after passing over two successive active application track magnets an inactive reset track magnet is passed, which has not been energized by the clearing of the danger signals, the reset will not act and the conditions set forth in paragraph (c) under this heading will persist so that the train may proceed into the next block at a speed held down to the combined speed and braking limitation or to the control speed.

(f) If, however, in passing through any block only a single application impulse is received (as would be the case if only one of the application track magnets of the block be energized upon the passage of the train thereover) and the train then passes an active application track magnet of a following block without the reception of a resetting impulse there will be initiated, if the train runs unbraked, or if running braked at greater than coordinated speed and braking control, a brake application sufficient to stop the train in case the engineer is disabled.

(g) The emergency relay when de-energized on passing the second of two consecutive active application track magnets remains de-energized until an active reset track magnet is passed, or until it is intentionally re-energized, if allowed, by the engineer. The contacts controlled by the emergency relay thus not only respond to the secondary automatic braking impulse received at such second active application track magnet, but as they move, on the de-energization of the relay, to a stable position also serve to prolong the effect of such impulse.

(h) The response to the impulses for primary automatic braking and to the impulses for secondary automatic braking, when exceeding the speed limitations, as well as to the reset impulses, is exceedingly rapid; and both brake controls are operated on closed circuits.

Fig. 61 represents diagrammatically certain interesting features of operation when a train equipped with the most complete form of the system, as before described, moves over a single block at different speeds, it being assumed that both the distant and home track magnets of the block are active when the train passes thereover and in certain cases that the reset track magnet is inactive, as is indicated at the bottom of the figure. The block is laid out as about 4000 feet in length, as indicated by the abscissæ, the ordinates of the drawing representing train speeds in miles per hour. It is further assumed that the low limit contact on the locomotive is so adjusted as to set the control speed at 20 miles per hour or slightly thereover, as indicated by the horizontal line marked "Arbitrary control speed"; and that the highest speed within the coordinated speed and braking limitations, as determined by the setting of the parts on the locomotive is, as indicated by the inscription "High limit for service", 45 miles per hour, this being assumed, for this particular illustration, as about the maximum at which under the varying conditions of operation it is safe to assume that a train with service application at the home track magnet can be pulled down to control speed a safe distance from the end of the block. Speeds above this high limit are such that if an active home track magnet is passed at such excess speeds a secondary automatic braking will occur. The heavy full lines indicate train speeds at different points in the block under various braking conditions.

If, for example, a train entering a block at a speed above 45 miles per hour, and receiving a primary automatic braking on passing the distant track magnet has its braking nullified by the engineer, it may reach and pass the home track magnet without substantial loss of speed. In that case, the train at the last named magnet will receive a secondary automatic braking, emergency in character, which cannot be interrupted or nullified by the engineer. The curve of the train speed will be as indicated by the lines A—B—C.

If the primary automatic braking of the train entering the block, as aforesaid, above 45 miles an hour, is not released, the train will slow down and may pass the home track magnet at or under 45 miles an hour. In that case no secondary automatic braking will be effected at the home track magnet, but the train will continue to slow down until it reaches control speed or under as represented by the line D—E—F. Similar conditions but with different speeds are represented by the lines G—F, I—F, M—F and N—F.

When the control speed has been reached as just stated the engineer can release his brakes and proceed at or less than such speed unbraked. If then, however, he attempts, before reaching an active reset track magnet, to increase his speed above the control speed, a secondary automatic braking, emergency in character, will take place and the train will be stopped, as indicated by the line Q—R—S if the acceleration takes place before passing an inactive reset track magnet, and by the line D', R', S' if after passing such reset track magnet. If, however, the train passes the inactive reset magnet at control speed and then passes an active application magnet without increase of speed, a second primary automatic braking will be initiated, sufficient, unless nullified, to stop the train in a short distance, as is represented by the curve T—V. If, however, the reset track magnet is energized when the train passes thereover the engineer can accerate his train as indicated by the line Q' R' X.

On the other hand, if, subsequent to passing the home magnet with the brakes automatically applied and prior to reduction to control speed, the engineer releases the primary automatic braking, a secondary automatic braking, full service or emergency in character, will take place and the train will be stopped as indicated by the line I—J—K.

If the train, however, receiving a primary automatic braking at the distant track magnet, passes the home track magnet with this braking nullified or with brakes released within the coordinated speed and braking limitations, as indicated by the line H—I, a secondary automatic braking, emergency in character, will be effected as indicated by the line I—L.

If the train, after receiving a primary automatic braking at the distant track magnet, passes the home track magnet with the brakes still applied at or under control speed, as indicated by the line H—O, no secondary automatic braking will take place at the home track magnet and the brakes can then the released and the train proceed at control speed as described in connection with the line D—E—F.

A special although rare condition may arise in practice. For example, suppose that a train enters a block which is clear and gets, therefore, at the distant track magnet no primary automatic braking, and that before reaching the home track magnet, a train backs into the far end of the next block or onto the track from a siding, or a rail breaks, or something else, such as a spreading wreck, takes place which sets the danger signal for that block. In such a case when the train passes the now active home track magnet of its own block a primary automatic braking will come on; and if the danger conditions continue, a secondary automatic braking will or will not come on at the distant track magnet (assumed to be active) for the next block depending upon the speed and braking of the train in passing the same, as will be understood from the preceding. That is to say, the conditions previously discussed as obtaining at the home track magnet now obtain at the advance distant track magnet and proper braking is assured.

*Operation without the coordinated speed and braking limitations but with a fixed high speed limit. (Fig. 60)*

Fig. 60 is a view generally similar to Fig. 61, but indicating certain features of operation, if the train, instead of being equipped with the complete system above described, has a system in which the high speed contact is fixed, as in Figs. 38 and 38A, so that the high speed branch of the emergency control coil will be broken at a fixed high limit. This is indicated in Fig. 60 as 40 miles per hour, the control speed being shown as 20 miles per hour as before.

If a train entering the block and passing over the distant track magnet at say 55 miles an hour gets a primary automatic braking of about 15 pounds it will, if this application is undisturbed, follow the curve a—b and will reach control speed at about the time it passes the home magnet. Even if the latter be active the train may continue at the control speed without a secondary automatic braking, as was before described in connection with lines H—O and D—E—F of Fig. 61.

If, however, the engineer while thus running at or under control speed should attempt to accelerate his train and go above control speed before reaching an active reset track magnet, a secondary automatic braking, emergency in character, will be effected as indicated by the lines c—d—e. If the danger signal is not cleared when the reset track magnet is reached by running at or under the limitations imposed by the low limit speed control, but if his apparatus is cleared by the reset track magnet being active, he can accelerate his train, as indicated by the lines f—g. It may be desirable in certain cases, in order to speed train movements, to locate the reset track magnet at some distance back of the end of the block, as indicated at 89 by dotted lines in Fig. 60. In such case the engineer can resume speed after passing such reset magnet if active, as indicated by the line c—d—h.

If, before reaching the active home track magnet, the engineer should release the primary automatic braking effected at the distant track magnet and the train should pass the home track magnet at a speed exceeding 20 miles an hour, a secondary automatic braking, emergency in character, would be effected and the train stopped as indicated by the line i—j—k.

Again, in entering a block, say at 60 miles an hour with a primary automatic braking of 15 pounds and this braking continued undisturbed, the train, while passing the home track magnet below the high limit speed, will be brought, by the primary automatic braking alone, to the control speed some distance beyond the home track magnet, as indicated by the curve m—c, and it may then continue under control as before described. If, however, the engineer attempts after passing the active home track magnet and before passing an active reset track magnet, to release his brakes before reaching control speed, he will then get a secondary automatic braking, full service or emergency in character, as indicated by the curve m—n.

If the primary automatic braking is released before reaching the active home track magnet and the latter is passed at a speed exceeding the high limit set for safe braking under service application at this point, then a secondary automatic braking will be effected as indicated by the curve o—p—q.

*Combination application and reset receiver.*
*(Figs. 62 and 63)*

In the previous section devoted to the locomotive control system, sub-section "Magnetic receivers", it was stated that the receivers were subject to many modifications and refinements in construction and grouping of parts and further that means may be provided to protect the receivers from injury and interference. In practice, it is desirable to have the contact devices of the receivers permanently adjusted, enclosed free from dust or disturbance, and proof against vibration or shock. Figs. 62 and 63 illustrate a combined application and reset receiver illustrative of the modifications suggested and providing the features desirable in practice just enumerated. Such a receiver is diagrammatically shown in dotted lines also in Figs. 10 and 11.

In the construction of these figures but three flux collector pieces 55a 55a are employed, one of these serving as a common flux collector for both application and reset impulses. The flux collectors themselves are similar in construction to those already described, being of thin soft iron and slotted to break up eddy currents. As illustrated these are suitably mounted below a non-magnetic casing 90 having extension arms 90a 90a to support the flux collectors and having a removable cover, the flux collectors being arranged at the corners of a triangle adapted for the relative angular position of application and reset track magnets illustrated throughout the drawings hereof, the right hand flux collector of Fig. 62 cooperating with the flux collector at the bottom thereof to receive application impulses and the left hand flux collector cooperating with the bottom flux collector to receive reset impulses. The horns 55d 55d extend vertically through the bottom of the non-magnetic casing 90, are quite substantial in construction and have their upper faces preferably lying in a horizontal plane.

The remaining parts are designed to be removable from the construction just described and are mounted on or assembled in connection with a removable insulating base or support 91, which fits loosely in the casing 90 and which may, if desired, be provided with cushioning means 92 92, such as springs or cork, to avoid jarring.

Upon and separate from the upper extensions of the horns 55d 55d are seated soft iron cores 93 93, one for each horn extension. These are symmetrical in shape, being illustrated as circular in cross-section, and extend upwardly through apertures in the insulating base making a loose fit therein. The bottoms of the cores are flanged and overlap the upward extensions of the horns. If desired, cushioning means such as felt gaskets 94 94 can be interposed between the said flanges and the bottom of the insulating base. It will be seen that the cores 93 93 are shiftable horizontally over the horns without affecting their magnetic relations.

The flux path is continued by means of soft iron conductor members 95 95, preferably laminated, which are firmly attached to the top of the insulating base and which are suitably apertured to surround the upper portion of the cores 93 93, making a comparatively loose sliding fit in connection therewith. The symmetrical shape of the cores and of the said apertures makes possible a relative shift of positions without material change of reluctance of the gap at such point. A relative vertical movement between the members 95 95 and the cores 93 93 does not affect their magnetic relation.

Armatures 55e 55e are pivoted intermediate of their ends and carried by the base, the right hand armature in Fig. 62 being held normally by a spring 55f to maintain closed contact 57 in the circuits of the service and emergency relays and the left hand armature by a corresponding spring normally to maintain closed contact 58 in the circuit of the reset relay. Each armature is magnetically moved to open its contact on passing the cooperating active application or reset track magnet. A refinement is introduced in the armatures illustrated comprising small leaf-springs 96 96 attached one to each of the armatures and serving as contact members thereof. This refinement is optional and tends further to avoid accidental opening of the circuits.

The complete unit above described is intended to be mounted upon the lower part of the frame of the locomotive rigidly or otherwise, as minor changes in the clearance above the track magnets are immaterial. As previously stated, an air-gap of about 3½ inches between the flux collector pieces of the receivers and the tops of the working poles of the track magnets gives satisfactory results.

From the above described arrangement, it will be noted that there is provided a continuous magnetic contact or a constant condition of the magnetic circuit between magnetic masses in variable physical but constant magnetic relation to each other and having freedom of mechanical movement, low local magnetic resistances, means for cushioning the movement en masse, balanced armature contacts, a removable unit, and protection from dust, moisture and physical interference. The utmost flexibility of construction is provided to avoid accidental operation due to jars or blows. The parts are readily adjusted but once adjusted are so constructed as to maintain the adjustment absolute and constant. Obviously, if desired, certain of the movable relations of the parts may be dispensed with, for example, the contact leaf-springs 96 96, as has already been stated, are not absolutely essential. As another example, it may be noted that it is not essential that the cores 93 93 be physically separate from the upper extensions of the horns 55d 55d, but in such case the apertures in the base through which they extend must be large enough to permit free movement.

*Modified receivers.* (*Figs. 64, 65, 65A and 65B*)

In the foregoing and in Fig. 64, which is a slight modification in form, the two flux collector pieces of the magnetic impulse receivers have been described as being entirely magnetically insulated from each other. This, however, is not essential as is seen by a comparison of Fig. 64, with Figs. 65, 65A and 65B. As shown in Fig. 65, the pieces may be connected by a restricted neck 55g, which owing to its reluctance will not carry all the lines of force collected by the ends of the receiver, and hence there will be created poles at points 55d 55d on opposite sides of the restricted portion. An armature 55e pivoted in proximity to these latter poles will be attracted on the passage of a receiver over an active track magnet and will break the circuit controlled thereby at, for example, contact 57.

If desired, a closed circuit coil may be wound around the restricted neck and include a magnetizable core in proximity to the armature, and the current set up by the electro-motive force induced therein when passing an active track magnet may be used to help move the armature. One form of such a device is illustrated in Fig. 65A in which a generating coil 97 wound on the restricted neck is in series with a motor coil 98, exerting, when energized by the current generated in the coil 97, a pull on the armature 55e to move the armature in the same direction as it is moved by the magnetic field between the poles 55d 55d. In such a construction the generating coil tends to increase the reluctance of the restricted portion and thus to increase the free field of force acting on the armature. Moreover, as the electromotive force generated in the coil 97 will lag in respect to the magneto-motive force by which it is induced, this construction will prolong the pull of the armature produced by passing over an active track magnet and thus permits the armature to be made less sensitive.

It is not, however, essential that the current generated in the generating coil 97 be utilized as a motive force for the armature 55e in order to secure the results of increased reluctance in the restricted neck. If it be desired to utilize such generating current as a source of power it may, for instance as illustrated in Fig. 65B, be used as the motive power for an armature 55h connected in series with the armature 55e.

*Speed and retardation control.* (*Figs. 66 to 73*)

In the foregoing, coordinated speed and braking control has been described as effected by contacts whose relative positions are determined by the speed of the train and the braking pressure applied to effect its retardation. While this is effective, and will insure proper control of a train, the same retardation will not always follow from a like reduction of air, or drop of pressure in the equalizing reservoir, because of many variables, such as make-up of train, efficiency of brakes, conditions of brake rigging, air leakages, conditions of track, degrees of gradient and direction of wind. It may, therefore, be desirable to use the effect secured rather than the means or cause, that is, the retardation of the train, however gotten, as the function to cooperate with that of train speed.

Thus, in lieu of the corrective apparatus, responsive to air pressures, which is intended to produce certain braking results, the desired control may be obtained by using means which shall be the summation of all causes affecting the retardation of a train, in other words, means which integrate or sum up in proper fashion all the forces, positive or negative, however, they may vary in character and degree, which are brought into play—be they brake pressure, grade, wind, make-up of train, condition of brake rigging or of tracks.

Figs. 66, 67 and 68 represent one type of such means, and include a showing of the contacts 69 and 70 and of the speed governor actuated cylinder 67 as before described. In these figures, the low speed branch of the emergency control coil including contact 68, and contact 71 in the high speed branch thereof are omitted. Contact 72 in one branch of the emergency control coil circuit and the associated lamp contact 73 are mounted on an insulating block 100 fixed to a rod 101 which is suitably mounted for fore and aft movement in respect to the locomotive, the rod having its rear end guided in a bearing 102 and its forward end articulated by a universal joint 103 with a piston 104 moving in a fixed dashpot cylinder 105. The piston 104, and with it the contacts 72 and 73, are normally held at their rear limit of movement by a suitable spring 106, shown as connected to a pendulum 107, which in turn is connected, below its point of suspension 108, to the rod 101. The remainder of the control system is similar to that previously described in connection with Figs. 1, 2 and 2A as will be readily understood from Fig. 68.

Retardation of the train causes the pendulum to swing forwardly (as indicated by the dotted lines) by virtue of its inertia of motion, the amplitude of the swing increasing with an increase of the rate of retardation. As the rate of retardation is reduced the pendulum resumes its vertical position under the influence of gravity and the pull of the spring 106.

The piston has a fairly tight fit in the dashpot cylinder, no escape for air from the cylinder on the forward movement of the pendulum being provided except leakage between the walls of the cylinder and piston. The dashpot thus serves to dampen the vibrations of the pendulum on the swaying and lurching of the locomotive due to the irregularities in the road-bed, etc. It also serves to delay the return of the pendulum to vertical when swung therefrom by retardation of the train.

By the described construction the weight necessary to obtain proper movements of the contacts 72 and 73 on retardation is provided in the pendulum 107, and as that member is hung on the pivot 108, the rod 101 is not called upon to carry such weight although subject in its movements to the inertia arising therefrom. Therefore, friction in the bearing 102 is reduced. It will likewise be noted that in the construction shown the forward end of the rod 101 is carried directly by the piston 104. As the weight of the rod is relatively small this is permissible. This construction together with the universal joint tends to reduce the necessity of carefully aligned bearings for the rod.

Under normal conditions, i. e. with the locomotive stopped or running at a uniform speed, the pendulum hangs vertical, as has been before stated, and the contact 72 is in the position shown. The cylinder 67, however, will have its position fore and aft of the locomotive, determined by the speed of the train. The parts are so adjusted that when the train is moving with a uniform velocity above control speed, the branch of the emergency control coil circuit through contact 72 will be broken. It will be seen, therefore, that in this system the control speed is determined by the adjustment of contact 72 in its normal or at set position. Hence a train equipped which has received a primary automatic braking impulse on passing an active application track magnet will, on passing with uniform velocity (i. e., unbraked) above control speed another active application track magnet prior to passing an active reset track magnet, receive a secondary automatic braking as has been discussed in connection with Figs. 54 and 56. If, however, the train movement is being retarded (as is the case when it is being braked), the pendulum swings forwardly due to its inertia of motion, causing corresponding movement of the contact 72, so that the branch of the emergency control coil circuit therethrough will no longer be broken on exceeding control speed but at some higher speed dependent on the amplitude of the forward swing of the pendulum, which in turn increases with the rate at which the train is being retarded.

It will be noted that after the reception of a primary braking impulse at a distant track magnet in order to avoid, with the train moving above control speed, the opening of the branch of the emergency control coil circuit through contact 72, not only will the train movement have to be retarded in passing the home track magnet but suitable retardation must continue until control speed is reached or until an active reset track magnet is passed, the rate of retardation necessary to prevent the opening of such branch decreasing as the speed decreases.

In this manner of control, therefore, the upper limit of speed imposed by the branch of the emergency control coil circuit through contact 72 is not fixed, as discussed in the preceding subsection hereof dealing with Fig. 60, but is a shifting one effecting the results indicated in Fig. 61, though not determined directly by coordinated variations of speed and braking pressure. The upper and variable speed limit provided for in the manner of control now under discussion is determined directly by a differential of the speed of the train and the rate of retardation thereof, the limit determined by this conjoint action varying inversely with the speed factor and directly with the retardation factor, so that the critical speed permitted by such a structure increases as the braking efficiency increases.

Obviously in this manner of control, as well as in those previously discussed, the train may reach the second active application track magnet, although being retarded, at such a speed that under service braking it will not be stopped in time to avoid accident. Consequently means should be provided whereby, regardless of the rate of retardation, if the speed is above said safe speed the branch of the emergency control coil through contact 72 will be broken, or a secondary automatic braking otherwise effected. In the particular structure illustrated this is provided for by so arranging the dashpot and the positional mounting thereof that the possible movement of the contact 72 is limited. Thus when the cylinder 67 is moved by excessive train speed past the contact 72 when in such extreme position the brake application is no longer dependent on coordinated speed and braking but on speed alone.

In the device of Figs. 66 and 67, the insulating block 100 and the contacts 72 and 73 respond in corrective fashion to the braking effort or train retardation when the pendulum 107 moves to the left, which in this case corresponds to forward train movement. The device as shown is single acting only. But locomotives are at times run tender first in direction of traffic, and it is therefore desirable that the brake control device should respond to movement in either direction with equal facility and with like ultimate effect.

In Fig. 69 is shown the device described in connection with Figs. 66 and 67 so modified as to give similar results for both directions of train movement. The various parts similarly numbered are the same and have like functions, but in the device of Fig. 69, instead of a rigid rod 101 connecting the insulating block 100 and the ball of the ball and socket joint 103, there is provided a pinion 109 mounted on a suitable bearing and connected with the stem 101a of the insulating block 100 and with the said ball by links 110 and 111 respectively. The connection is such that when the pinion is rotated in either direction from normal position through like angles the insulating block 100 and the piston head 104 are moved by equal amounts, this motion being reversed when the pinion is rotated back to its normal position.

The pinion 109 is operated by a sector gear 112 mounted upon the upper end of the pendulum 107, which is pivoted below the pinion at 108a. It is evident that equal swings of the pendulum in either direction will produce like movement, in direction and amount, of contacts 72 and 73. The movement of the pendulum is opposed by regulating springs 106a 106a on either side, as well as by the dashpot.

Obviously the device of Fig. 69 may be used in connection with the circuits shown in Fig. 68 in lieu of the device of Figs. 66 and 67 shown therein.

To limit the motion of parts as much as possible, to avoid the wear of moving contacts, and to reduce and largely eliminate gravity effect the control apparatus shown in Fig. 70 has been devised.

In the apparatus of Fig. 70 an iron ring 113 with an inner copper lining 114 is reversibly rotated according to the direction of train movement by any suitable drive, belt, gear or other means by which the speed of rotation of the ring will vary with the train speed. Carried inside of the shell is an assembly of magnets 115 115, whose yokes are fastened to a cylinder 116 carried by ball bearings 117 upon a fixed spindle 118, the outer ends of the magnets being in close proximity to the copper lining.

Sleeved upon the spindle is a carrier having a stem 119 on which is adjustably carried a weight 120 by which, and by resilient means, such as a spring 121, the stem is normally held vertically dependent from the spindle. The carrier interlocks with the cylinder 116 by a pin 122 in a slot 123, in such manner that if the magnet assembly is rotated a short distance in either direction the cylinder engages, after a limited free movement, with the spring-resisted stem 119 carrying the weight 120, and thereafter further rotation in the same direction moves the said stem and weight along with it.

Two of the magnet arms have extensions terminating in balls 124 124a of unequal sizes, ball 124 being the larger. These balls are freely interpolated between the arms of double contact circuit breakers 125 and 125a respectively, controlling contacts 73a 73a in the circuit of the warning lamp 65c and 72a 72a in one of the branches of the circuit of the emergency control valve coil 34 and recorder coil 61. Neither ball is in normal engagement with the contact arms of its circuit breaker until a rotative torque of the magnet assembly is established by the rotation of the ring.

Under the normal condition of inaction, that is when the train is at rest, the apparatus takes the position shown in Fig. 70, but with this combination of ring and magnets if the ring is driven in either direction there will be set up, by reason of the eddy currents generated in the copper ring, a tortional effort of the magnet assembly, which if not opposed would rotate it with a certain slip but which if opposed will be a function of the speed of the rotation of the ring.

As shown in the figure there is at first no opposition to the movement of the magnetic assembly except such as would be provided by the gravity effect of the magnet extensions and balls 124 and 124a; and if these are counterbalanced there would be no retarding force except that of friction. But when the magnet assembly has been rotated slightly one way or the other, say clockwise, as indicated by dotted lines in Fig. 70, this rotation is opposed by movement of the weight 120 out of the vertical position but principally by the resistance of the spring 121. As soon as the speed is sufficiently high the ball 124 will be moved so that the circuit of the warning lamp will be opened by the circuit breaker 125. A further angular movement will cause the ball 124a to actuate the circuit breaker 125a and open the branch circuit of the emergency and recorder coils controlled by contact 72a 72a. The movement of the pendulum is limited by stops 126 126 shown on either side thereof.

The structure as above described is reversibly responsive to train speed. To adapt it to combined speed and retardation control the plane of rotation of the ring 113 and of oscillation of the pendulum formed by the weight 120 and its carrier must be substantially in the direction of movement of the vehicle, and the direction of rotation of the ring due to such movement of the vehicle in one direction should be opposed to the direction in which the pendulum tends to swing on the slowing down of the vehicle when so moving. Thus when the vehicle on which the parts shown in Fig. 70 are mounted is moving to the right of that figure the direction of rotation of the ring should be clockwise.

Fig. 71 illustrates an embodiment of the structure under discussion into the general system of wiring control preferred in this invention. See previous discussion of Figs. 2A, 42 to 59 and 61, in view of which only a brief reference is here made.

It will be observed that as in the case of Fig. 68 the fixed low speed branch of the emergency control coil is omitted. Control speed is a matter of predetermined adjustment of the weight 120 and the spring 121 in the relation thereof to the tortional effort of the ring 113. That is to say adjustment is provided for determining a critical train speed above which if constant one of the contacts 72a 72a will be opened and below which said contacts will remain closed.

The permissible speeds above this critical speed at which the train without secondary automatic braking may pass the second of two consecutive active application track magnets, or may travel in the zone heretofore referred to as existing between an active home track magnet and an active reset track magnet, are determined by the relation of the tortional effort of the ring 113 to the forces opposed thereto and tending to set up counter rotation of the magnet assembly, which forces bear a direct relation to the rate of retardation of the train.

On retardation the weight 120 tends to move forwardly in the line of travel, i. e. under the conditions above assumed, tends to swing in a counterclockwise direction due to its inertia of motion. This tendency will in turn be communicated to the magnet assembly, and if the rate of retardation is sufficient will overcome the tortional effort of the ring 113 upon the magnet assembly and move the ball 124a out of actuating contact with the circuit breaker 125a, thus closing the branch circuit of the emergency coil controlled by contacts 72a 72a and preventing secondary automatic braking. If the rate of retardation is insufficient for this purpose, and the train is moving above control speed, the said circuit will remain open and secondary automatic braking will come on. As in the case of apparatus previously discussed, therefore, secondary automatic braking is dependent upon the proper handling of a train.

As the train slows down under braking the torque of the magnet assembly is reduced, and normally the engineer would release his brakes before stopping, but if he keeps the brakes applied there would be a further forward swing of the weight 120 anti-clockwise (under the condition above assumed) which, if no provision were made to prevent it, might cause an opening in the emergency circuit in spite of the fact that the train has been braked by manual action. The slack movement connection afforded by the slot 123 and pin 122, with proper limitation of motion and adjustment of the springs on the circuit breaker, provide against this possibility.

Fig. 72 illustrates a simplification of the device shown in Fig. 70 in that, instead of using external switches operated by arms projecting from the magnet assembly, a contact member is mounted on the cylinder 116 and brush contacts connected with the battery, with the warning lamp and with the emergency and recorder coils respectively are employed in contact therewith.

In this form there is the same iron ring 113 and copper lining 114 which can be rotated in either direction and will give a torque on the magnet assembly which will be a function of the speed of the train. There are also provided in this form the adjustable weight 120 carried by the stem 119 supported by the spindle 118 and having attached thereto the regulating spring 121, the pin and slot connection 122 and 123, and the stops 126, 126. The contact member has three conducting sections 127, 127a, 127b with insulating blocks interposed between them, the conducting sections being electrically connected. The battery 43 is connected with a contact 69a which is normally in contact centrally with section 127; the warning lamp 65c is connected with a contact 73b which is normally in contact centrally with section 127a; and the emergency coil 34 and the recorder coil 61 are connected with the contact 72b which is normally in contact centrally with section 127b and which controls one of the branch circuits of the said coils. Sections 127 and 127b are conveniently of the same length but section 127a is shorter than section 127b. Thus the normal position of the apparatus, that is when it is at rest, is shown in Fig. 72.

The embodiment of this apparatus into the general system of wiring control preferred in this invention is illustrated in Fig. 73. That figure corresponds with Fig. 71, and in view of the discussion of Fig. 71 and its relation to previous figures hereof should be readily understood without further comment. It will be understood that to provide for combined speed and retardation control the directional mounting of the device in respect to the vehicle and the direction of rotation of its magnet assembly in respect to the movement of the weight 120 should be the same as in the case of the device of Fig. 70. It is further believed that the general operation of the apparatus now under discussion, its provision for a control speed and for speeds in excess thereof without secondary automatic braking on passing the second of two consecutive active application track magnets, and in traveling in the zone between an active home track magnet and an active reset track magnet, if the train is being properly handled should be readily comprehended without elaboration.

When the train gets under way there is at first practically no resistance to the rotation of the magnet assembly and it moves according to the direction of train movement, either clockwise or anti-clockwise until the slot and pin are interlocked. If for example the assembly moves clockwise as shown by dotted position of one of the magnets, the contact member is moved so that the three contacts rest on the segments at the points indicated by dotted lines 130 130. Under this condition the end of the slot in cylinder 116 just engages the pin of the pendant weight carrier.

Increase of speed tends further to turn the magnet assembly, the tendency being resisted partially by the effort to displace the weight 120, but principally by the regulating spring 121, the torque tending to turn the assembly increasing with the speed, and the resistance to turning increasing with the angular displacement of stem 119. As the speed increases the circuit of the warning lamp 65c will be broken at contact 73b, indicating the possibility of emergency braking. When the speed unopposed by braking of the train, exceeds control speed the branch of the emergency circuit containing contact 72b will be opened.

If now the brakes are applied the weight 120 will tend to move in the opposite direction (anti-clockwise) against the torque set up by the speed of the train, thereby correcting the tendency to break the warning lamp circuit and the said branch of the emergency circuit. So long as this braking remains effective the said branch of the emergency circuit will not be broken, but if from lack of proper braking the magnet assembly is rotated far enough the said branch will again be broken at contact 72b.

In the method described under this section there is a speed-responsive device which opens or tends to open a control circuit, and a device responding to the braking effort or rate of retardation of the train which closes or tends to close the circuit, these two devices being so coordinated that any tendency of action of the one is opposed or corrected by a corresponding tendency in the other, so that the actual opening or closing of the circuit is determined by the resultant of a differential condition set up in response to train speed and train braking.

In the structure of Figs. 66, 67 and 69, the differential condition is due to relative movement of cooperating speed and retardation control parts, whereby the effect of movement of one of the parts is partially nullified by the movement of the other part, while in the construction of Figs. 70 and 72 the condition is principally due to forces proportionate to speed and retardation acting on a single member in such a manner that the one force tends to oppose the other and the result of the forces tends to determine the position of the member.

It will also be noted that in the structure shown in Figs. 69, 70 and 72 the coordinating action is such as to take care of both directions of engine movement.

From the foregoing discussion it will be seen that an important feature herein described is the application of a differential resulting from the opposing action of an element responsive to train speed and an element responsive to the manner in which the train is being controlled, i. e. braked (and that such last named element may be responsive either to the braking pressure or to the rate of retardation of the train, however such retardation may be effected) to the end of controlling the movement of the train, and this irrespective of the precise manner in which the differential action may be obtained or the manner in which the control of the train movements may be effected.

For convenience in presentation, this invention has been described as applied to a train drawn by a locomotive, but no limitation is intended thereby for it should be apparent that many features of the invention are applicable to a single car or vehicle or to a group of cars or vehicles and this independent of the character of the motive power and of whether such power be localized on the locomotive or distributed on the several units forming the train. For convenience of expression in the following claims, the term "train control" is employed in the broad sense just explained and the term "vehicle" is used as covering any unit of which the train may be composed.

Secondary automatic braking has been described as a function of the emergency control coil and parts governed thereby. The manner in which, or the mechanism whereby a secondary automatic braking is effected following a primary automatic braking is, however, immaterial so far as concerns many features of this invention and accordingly such of the following claims as include secondary automatic braking are not to be taken as limited to the showing herein made unless such limitations are otherwise called for in said claims.

The foregoing detailed description has been given for clearness of understanding, and no undue limitation should be deduced therefrom, but the appended claims should be construed as broadly as permissible in view of the prior art.

What I claim as new and desire to secure by Letters Patent of the United States is:—

1. In a train control system the combination with a braking system on the train, of means for imparting impulses thereto from the right of way, comprising a compound magnet located along the track for causing a brake application, said compound magnet consisting of a permanently magnetized yoke, stabilizing poles therefor, working poles for causing a brake application and neutralizing coils on said working poles, an electro-magnet also located along the right of way and in advance of the permanent magnet for resetting parts on the train, and a common control for simultaneously energizing the coils on the compound and electro-magnets.

2. In a train control system, the combination with an application track magnet and a reset track magnet, the poles which are disposed in different angular positions in respect to the center line of the track, of an application receiver and a reset receiver on the train cooperating respectively with the two track magnets, each of said receivers being disposed in an angular position corresponding with the angular position of the cooperating track magnet.

3. In a train control system, the combination with a track magnet, of a collector on the train having localized magnetic reluctance to receive the magnetic flux from the track magnet, a coil in which current is generated by the magnetic flux created in the collector when in registration with the track magnet, and an armature adapted to be moved by the current so created and by the free magnetic field around the localized reluctance.

4. In a magnetic flux receiver for a vehicle, the combination with flux collecting pieces mounted on the vehicle, of extension members therefor and an armature actuated by the flux through the members, the extension members being movable in respect to the flux collecting pieces.

5. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means, and for prolonging the effect of the impulse, and means actuated by the speed of the vehicle for determining the transmission of the impulse so prolonged to the brake applying means.

6. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means actuated by the speed of the vehicle for determining the transmission of the impulse so prolonged to the brake applying means, and cooperating track impulse creating and vehicle impulse receiving means to restore the shifted transmitting means to normal position after having been moved therefrom.

7. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means responsive to the braking of the vehicle for determining the transmission of the impulse so prolonged to the brake applying means.

8. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means responsive to the braking of the vehicle for determining the transmission of the impulse so prolonged to the brake applying means, and cooperating track impulse creating and vehicle impulse receiving means to restore the shifted transmitting means to normal position after having been moved therefrom.

9. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby for transmitting the impulse to the brake applying means, means responsive to the pressure applied to brake the vehicle for determining the transmission of the impulse to the brake applying means, and cooperating track impulse creating and vehicle impulse receiving means to restore the shifted transmitting means to normal position after having been moved therefrom.

10. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means responsive to the pressure applied to brake the vehicle for determining the transmission of the impulse so prolonged to the brake applying means, and cooperating track impulse creating and vehicle impulse receiving means to restore the shifted transmitting means to normal position after having been moved therefrom.

11. The combination with a track and a vehicle moving thereon, of cooperating track impulse creating and vehicle impulse receiving means, means responsive to the impulse received by the vehicle for effecting a brake application, and means responsive to the rate of retardation of the vehicle for determining the transmission of the impulse to the brake applying means.

12. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby for transmitting the impulse to the brake applying means, means responsive to the rate of retardation of the vehicle for determining the transmission of the impulse to the brake applying means, and cooperating track impulse creating and vehicle impulse receiving means to restore the shifted transmitting means to normal position after having been moved therefrom.

13. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means responsive to the rate of retardation of the vehicle for determining the transmission of the impulse so prolonged to the brake applying means.

14. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means responsive to the rate of retardation of the vehicle for determining the transmission of the impulse so prolonged to the brake applying means, and cooperating track impulse creating and vehicle impulse receiving means to restore the shifted transmitting means to normal position after having been moved therefrom.

15. The hereinbefore described method of train control, which consists in creating a differential condition by means oppositely responsive to the speed of the train and the braking thereof, and controlling the movements of the train in accordance with the differential condition so created.

16. The hereinbefore described method of train control, which consists in creating a differential condition by means responsive to the speed of the train and means responsive to the braking of the train, and controlling the movement of the train in accordance with the differential condition thus created.

17. The combination with a vehicle and brakes thereon, of means for applying the brakes at a speed limit varying inversely with the speed of the vehicle and directly with the braking being effected thereon.

18. The combination with a track and a vehicle moving thereon, of cooperating track impulse creating and vehicle impulse receiving means, means responsive to the impulse received by the vehicle for effecting a brake application, and means varyingly responsive to the differentials of the speed of the vehicle and the brakings being effected thereon for determining the transmission of the impulse to the brake applying means.

19. The combination with a track and a vehicle moving thereon, of cooperating track impulse creating and vehicle impulse receiving means, means responsive to the impulse received by the vehicle for effecting a brake application, means varyingly responsive to the differentials of the speeds of the vehicle and the brakings being effected thereon for determining the transmission of the impulse to the brake applying means, and cooperating track impulse creating means and vehicle impulse receiving means to restore the shifted transmitting means to normal position after having been moved therefrom.

20. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means responsive to the speed of the vehicle and the braking being effected thereon for determining the transmission of the impulse so prolonged to the brake applying means.

21. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means varyingly responsive to the speed of the vehicle and the braking being effected thereon for determining the transmission of the impulse so prolonged to the brake applying means, and cooperating track impulse creating and vehicle impulse receiving means to restore the shifted transmitting means to normal position after having been moved therefrom.

22. The hereinbefore described method of train control, which consists in creating a differential condition by means responsive to the speed of the train and means responsive to the braking pressure applied to brake the train, and controlling the movement of the train in accordance with the differential condition thus created.

23. In a train braking system, the combination with power brakes, of means for initiating a brake application impulse, and means for controlling the transmission of the impulse to the brakes, dependent in their action on the speed of the train exceeding a given speed and a braking pressure below a given amount tending to reduce the speed of the train, these factors varying inversely with each other.

24. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means responsive to the speed of the vehicle and to the pressure tending to retard the same for determining the transmission of the impulse so prolonged to the brake applying means.

25. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means varyingly responsive to the speed of the vehicle and the pressure tending to retard the same for determining the transmission of the impulse so prolonged to the brake applying means, and cooperating track impulse creating and vehicle impulse receiving means to restore the shifted transmitting means to normal position after having been moved therefrom.

26. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means varyingly responsive to the differentials of the speeds of the vehicle and the pressures tending to retard the same for determining the transmission of the impulse so prolonged to the brake applying means.

27. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means varyingly responsive to the differentials of the speeds of the vehicle and the pressures tending to retard the same for determining the transmission of the impulse so prolonged to the brake applying means, and cooperating track impulse creating and vehicle receiving means to restore the shifted transmitting means to normal position after having been moved therefrom.

28. The hereinbefore described method of train control, which consists in creating a differential condition by means responsive to the speed of the train and means responsive to the rate of retardation thereof, and controlling the movement of the train in accordance with the differential condition thus created.

29. In a train control system, the combination of cooperating movable elements, one of which is subjected to a force varying with the speed of the train and the other of which is subjected to a force varying with the rate of retardation of the train, and means for controlling the movement of the train governed by the relative value of the two forces.

30. In a train control system, the combination with brakes, of means for effecting a brake application governed by inertia controlled means responsive to the rate of retardation of the train.

31. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, and means responsive to the speed of the vehicle and the rate of retardation thereof for determining the transmission of the impulse so prolonged to the brake applying means.

32. The combination with a track and a vehicle moving thereon, of impulse creating means located at successive points along the track, receiving means upon the vehicle for the impulses created thereby, means on the vehicle for effecting a brake application, and means on the vehicle responsive to an impulse from the first track impulse creating means passed by the vehicle for causing the transmission to the brake applying means of an actuating impulse from a subsequent track impulse creating means.

33. The combination with a track and a vehicle moving thereon, of impulse creating means located at successive points along the track, means upon the vehicle for effecting a brake application, receiving means upon the vehicle for the impulses created by the track means, means shifted by the reception of an impulse to place the brake applying means under the control of a succeeding impulse if the shiftable means are in a shifted position, and means for restoring the shifted means to normal position.

34. The combination with a track and a vehicle moving thereon, of brake application impulse creating means located at successive points along the track, resetting impulse creating means along the track, means upon the vehicle for effecting a brake application, receiving means upon the vehicle for the impulses created by the track means, means shifted by the reception upon the vehicle of an application impulse to place the brake applying means under the control of a succeeding application impulse if the shiftable means are in a shifted position, and means under the control of the resetting impulse to restore the shifted means to normal position.

35. The combination with a track and a vehicle moving thereon, of brake application impulse creating means located at successive points along the track, a motor coil for effecting a brake application, receiving means upon the vehicle for the impulses and means controlled by the reception of an impulse to place the coil under the control of a succeeding impulse.

36. The combination with a track and a vehicle moving thereon, of brake application impulse creating means located at successive points along the track, a motor coil for effecting a brake application, common receiving means upon the vehicle for the impulses, means shifted by the reception of an impulse to place the coil under the control of a succeeding impulse if the shiftable means are in a shifted position, and separate means for restoring the shifted means to normal position.

37. The combination with a track and a vehicle moving thereon, of brake application impulse creating means located at successive points along the track, resetting impulse creating means along the track, a motor coil for effecting a brake application, common receiving means upon the vehicle for the impulses, means shifted by the reception upon the vehicle of an application impulse to place the coil under the control of a succeeding application impulse if the shiftable means are in a shifted position, and separate means under the control of a resetting impulse to restore the shifted means to normal position.

38. The combination with a track and a vehicle moving thereon, if impulse creating means located at successive points along the track, means upon the vehicle for effecting a brake application, common receiving means upon the vehicle for the impulses created by the track means, means shifted by the reception of an impulse to place the brake applying means under the control of a succeeding impulse if the shifted means are in a shiftable position, and means for restoring the shifted means to normal position.

39. The combination with a track and a vehicle moving thereon, of impulse creating means located at successive points along the track, means upon the vehicle for effecting a brake application, common receiving means upon the vehicle for the impulses created by the track means, means shifted by the reception of an impulse to place the brake applying means under the control of a succeeding impulse if the shiftable means are in a shifted position, and means actuated from the track for restoring the shifted means to normal position.

40. The combination with a track and a vehicle moving thereon, of brake application impulse creating means located at successive points along the track, a motor coil for effecting a brake application, common receiving means upon the vehicle for the impulses, means shifted by the reception of an impulse to place the coil under the control of a succeeding impulse if the shiftable means are in a shifted position, and means for restoring the shifted means to normal position.

41. The combination with a track and a vehicle moving thereon, of brake application impulse creating means located at successive points along the track, a motor coil for effecting a brake application, common receiving means upon the vehicle for the application impulses, means shifted by the reception of an impulse to place the coil under the control of a succeeding impulse if the shiftable means are in a shifted position, and means actuated from the track for restoring the shifted means to normal position.

42. The combination with a track and vehicle moving thereon, of means located along the track for imparting a succession of braking impulses to the vehicle, means controlled by the first of such impulses to effect a primary braking of the vehicle and conjointly controlled by such impulse and a following impulse to effect a secondary braking.

43. The combination with a track and a vehicle moving thereon, of means located along the track for imparting a succession of braking impulses to the vehicle, means on the vehicle shifted by one of such impulses to effect a primary braking of the vehicle, and means controlled by the reception of a following impulse by the vehicle while the shiftable means are in shifted position for effecting a secondary braking of the vehicle.

44. The combination with a track and a vehicle moving thereon, of means located along the track for imparting a succession of braking impulses to the vehicle, means on the vehicle shifted by one of such impulses to effect a primary braking of the vehicle, and means controlled by the reception of a following impulse by the vehicle while the shiftable means are in shifted position for effecting a secondary braking of the vehicle, and means for restoring the shiftable means to normal position.

45. The combination with a track and a vehicle moving thereon, of means located along the track for imparting successive brake application impulses and a resetting impulse to the vehicle, means controlled by the first of the application impulses for effecting a primary braking, and means controlled by a succeeding braking impulse prior to the reception of the resetting impulse for effecting a secondary braking.

46. In a train braking system, the combination with successive track magnets, of a receiver on the train for impulses created by the track magnets, means for effecting a primary braking when the receiver is energized by a track magnet, means for effecting a secondary brake application, and means actuated on the operation of the primary braking application means for putting the secondary braking application means under the control of the receiver to be actuated thereby upon the reception of an impulse from a succeeding track magnet.

47. In a train braking system, the combination of means for effecting a primary brake application, means for effecting an increased brake application, and means operative irrespective of the speed of the train to actuate the primary brake application means and operative when the speed of the train exceeds a predetermined limit for actuating the increased brake application means.

48. The combination with a vehicle having a braking system thereon and a track along which the vehicle moves, of means located along the track for imparting a primary braking impulse to the vehicle, means located along the track for imparting a secondary impulse to the vehicle, and means for nullifying the application of the last named braking impulse unless the train is exceeding a safe speed at the time of receiving the impulse.

49. The combination with a vehicle having a braking system thereon and a track along which the vehicle moves, of means located along the track for imparting a primary braking impulse to the vehicle, means located along the track for imparting a secondary braking impulse to the vehicle, and means for nullifying the application of the last named braking impulse unless the train exceeds a predetermined speed after the reception of such impulses.

50. The combination with a vehicle having a braking system thereon, of means for effecting a primary brake application, track actuated reset mechanism, and means controlled by the speed of the vehicle after the primary brake application and prior to the action of the reset mechanism for effecting a secondary brake application.

51. The combination with a track and with a vehicle moving thereon, of means for effecting, when actuated, a primary brake application, means for effecting a secondary brake application, reset means located along the track, and means located along the track and controlling the initiation of brake applications, the actuation of the secondary brake application means being also controlled by the speed of the train prior to its passage over the reset means.

52. In a control system for effecting automatic braking on a vehicle, the combination of common means for receiving similar successive external impulses, means responsive to the speed of the vehicle, means for effecting a brake application, and means actuated by the reception of an external impulse to render the brake applying means responsive to a subsequent external impulse and to the speed responsive means conjointly.

53. In a control system for effecting automatic braking on a vehicle, the combination of means for receiving external impulses, means responsive to the braking of the vehicle, means for effecting a brake application, and means actuated by the reception of an external impulse to render the brake applying means responsive to a subsequent external impulse and to the braking responsive means conjointly.

54. In a control system for effecting automatic braking on a vehicle, the combination of means for receiving external impulses, means responsive to the pressure applied to brake the vehicle, means for applying additional pressure to brake the vehicle, and means actuated by the reception of an external impulse to render the brake applying means responsive to a subsequent external impulse and to the pressure responsive means conjointly.

55. In a control system for effecting automatic braking on a vehicle, the combination of common means for receiving similar external braking impulses, means for receiving an external reset impulse, means responsive to the pressure applied to brake the vehicle, means for applying additional pressure to brake the vehicle normally unresponsive to an external impulse and to the pressure responsive means, means actuated by the reception of a braking impulse to render the brake applying means responsive to a subsequent braking impulse and to the pressure responsive means conjointly, and means actuated by the reception of a reset impulse for nullifying the effect of the first braking impulse upon the responsiveness of the brake applying means to the subsequent braking impulse.

56. In a control system for effecting automatic braking on a vehicle, the combination of means for receiving external impulses, means responsive to the rate of retardation of the vehicle, means for effecting a brake application, and means actuated by the reception of an external impulse to render the brake applying means responsive to a subsequent external impulse and to the retardation responsive means conjointly.

57. In a control system for effecting automatic braking on a vehicle, the combination of means for receiving external braking and reset impulses, means responsive to the pressure applied to brake the vehicle, means for applying additional pressure to brake the vehicle normally unresponsive to an external impulse and to the retardation responsive means, means actuated by the reception of a braking impulse to render the brake applying means responsive to a subsequent braking impulse and to the retardation responsive means conjointly, and means actuated by the reception of a reset impulse for nullifying the effect of the first braking impulse upon the responsiveness of the brake applying means to the subsequent braking impulse.

58. In a control system for effecting automatic braking on a vehicle, the combination of means for receiving external impulses, means responsive to a differential of the speed of the vehicle and the braking being effected thereon, means for effecting a brake application, and means actuated by the reception of an external impulse to render the brake applying means responsive to a subsequent external impulse and to the differential means conjointly.

59. In a control system for effecting automatic braking on a vehicle, the combination of common means for receiving similar successive external impulses, means responsive to a differential of the speed of the vehicle and the braking being effected thereon, means for effecting a brake application, and means actuated by the reception of an external impulse to render the brake applying means responsive to a subsequent external impulse and to the differential means conjointly.

60. In a control system for effecting automatic braking on a vehicle, the combination of means for receiving external impulses, means responsive to a differential of the speed of the vehicle and the braking pressure tending to retard the same, means for effecting a brake application, and means actuated by the reception of an external impulse to render the brake applying means responsive to a subsequent external impulse and to the differential means conjointly.

61. In a train control system, the combination of means for effecting a brake application, a circuit for controlling the brake applying means having two shunts, means responsive to the speed of the train for controlling one of the shunts and means oppositely responsive to the speed of the train and to the braking thereof for controlling the other shunt.

62. A track element for train control systems comprising a permanently magnetized yoke disposed crosswise of the track and having horizontally disposed pole pieces near the level of the track rails, said yoke having projections in the plane of said yoke affording a leakage path of lower reluctance than between said pole pieces, coils between the pole pieces and said projections, and traffic controlled means for energizing said coils whereby the permanent flux of the yoke is diverted through the leakage path and the external field above the pole pieces is neutralized when said coils are energized under clear traffic conditions.

63. In a system of train control, the combination with braking mechanism, of a succession of track magnets controllable by traffic conditions and each operating to establish a local magnet field, brake-controlling means influenced by the field of one magnet for initiating the action of the braking mechanism, additional brake-controlling means influenced by the field of another of said magnets for effecting a further brake application subsequent to the initial brake application, and wayside means for restoring to normal parts on the vehicle affected by the track magnet or magnets.

64. Railway traffic controlling apparatus comprising means on a train controlled from the trackway for imposing a continuously effective speed limit under one given condition of traffic in advance of the train, means for automatically applying the brakes of the train if such speed limit is exceeded, and apparatus under the control of the engineer effective if operated previous to the initiation of such automatic brake application to prevent an automatic application when such speed limit is exceeded.

65. The method of controlling railway traffic which consists in establishing a continuously effective speed limit on a train determined by traffic conditions in advance of the train, applying the brakes automatically if the established speed limit is exceeded at any moment, and preventing such automatic application of the engineer takes suitable action prior to exceeding the established speed limit.

66. The method of controlling railway traffic which consists in establishing a continuously effective speed limit on a train determined by traffic conditions in advance of the train, applying the brakes automatically if the established speed limit is exceeded at any moment, and preventing such automatic application of the engineer applies the brakes manually prior to exceeding the established speed limit and keeps them applied as long as the speed limit is exceeded.

In testimony whereof I have hereunto signed my name.

FRANK J. SPRAGUE.